(12) United States Patent
Hardt

(10) Patent No.: US 12,314,430 B1
(45) Date of Patent: May 27, 2025

(54) SYSTEM AND METHODS FOR PROTECTING USER PRIVACY AND PROVIDING SECURE ACCESS TO USER DATA

(71) Applicant: DHARDT RD LLC, Seattle, WA (US)

(72) Inventor: Dick Clarence Hardt, Seattle, WA (US)

(73) Assignee: DHARDT RD LLC, Seattle, WA (US)

(*) Notice: Subject to any disclaimer, the term of this patent is extended or adjusted under 35 U.S.C. 154(b) by 456 days.

(21) Appl. No.: 17/829,770

(22) Filed: Jun. 1, 2022

Related U.S. Application Data

(60) Provisional application No. 63/208,752, filed on Jun. 9, 2021.

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01); *G06F 21/6227* (2013.01)

(58) Field of Classification Search
CPC . G06F 21/6245; G06F 21/602; G06F 21/6227
See application file for complete search history.

(56) References Cited

U.S. PATENT DOCUMENTS

| | | | | |
|---|---|---|---|---|
| 11,582,211 B1* | 2/2023 | Moritz | ............ | H04L 63/062 |
| 2003/0051129 A1* | 3/2003 | Razdan | ............ | H04L 9/083 |
| | | | | 713/151 |
| 2007/0245414 A1* | 10/2007 | Chan | ............ | H04L 9/3234 |
| | | | | 726/12 |
| 2010/0154041 A1* | 6/2010 | Dalzell | ............ | H04L 9/3213 |
| | | | | 726/6 |
| 2013/0124525 A1* | 5/2013 | Anderson | ............ | G06F 16/278 |
| | | | | 707/737 |
| 2014/0230028 A1* | 8/2014 | Petty | ............ | G06F 21/46 |
| | | | | 726/6 |
| 2015/0006890 A1* | 1/2015 | Roth | ............ | G06F 21/602 |
| | | | | 713/165 |
| 2020/0068018 A1* | 2/2020 | Chan | ............ | G06F 16/2453 |
| 2020/0162252 A1* | 5/2020 | Davis | ............ | H04L 9/0872 |
| 2020/0401718 A1* | 12/2020 | Hennig | ............ | G06F 21/6281 |
| 2022/0272537 A1* | 8/2022 | Aggarwal | ............ | H04L 63/101 |

OTHER PUBLICATIONS

Sakimura et al, OpenID Connect Core 1.0 incorporating errata set 1, 2014, the OpenID Foundation, pp. 1-86. (Year: 2014).*

* cited by examiner

*Primary Examiner* — Jeffrey C Pwu
*Assistant Examiner* — Edgar W Xie
(74) *Attorney, Agent, or Firm* — FisherBroyles LLP; Alan D. Minsk

(57) ABSTRACT

Systems, devices, apparatuses, and methods for more effectively protecting a user's private data and information regarding their browsing and other on-line activities. Embodiments remove constraints on an application developer by not requiring them to specify an authentication service provider as part of their application, and instead permit a user to make that choice in a protected and anonymous manner.

15 Claims, 30 Drawing Sheets

SYSTEM AND METHODS FOR PROTECTING USER PRIVACY AND PROVIDING SECURE ACCESS TO USER DATA

CROSS REFERENCE TO RELATED APPLICATION

This application claims the benefit of U.S. Provisional Application No. 63/208,752, entitled "System and Methods for Protecting User Privacy and Providing Secure Access to User Data," filed Jun. 9, 2021, the disclosure of which is incorporated, in its entirety (including the Appendices) by this reference.

BACKGROUND

Security of user information is of paramount importance to users, application developers, and web-site operators (such as search or social network platform providers). Large providers (such as Google and Facebook) have hundreds of people working to prevent a malicious attacker from obtaining access to a user's account and its related data. Using social sign-in services such as Sign-in with Facebook or Sign-in with Google is believed to have made the Internet safer, as a user has fewer passwords to contend with, and the large providers are typically better at user authentication and account recovery processes than most application developers. Additionally, using a social sign-in service reduces the burden on a user to create a new account for each application they use. Further, using a social sign-in service may increase the difficulty in creating fake accounts to access an application or user data, as providers generally impose added layers of security (such as two-factor authentication) when a user attempts to create an account with a provider.

However, a disadvantage with using a social sign-in process is that it is based on a tightly coupled relationship between the user, an application developer, and the provider of the social sign-in functionality. For example, the developer must create a relationship with each provider, and have confidence that relationship will continue, or lose (or risk losing) the application users that had used that provider. To minimize user confusion regarding which provider to choose, and to simplify development, developers typically implement their application so that it is compatible with only a small number of providers. As a result, a user is forced to choose between the set of providers the developer offers compatibility with if they want to use the developer's application.

In some cases, a user's preferred provider may not be one made available by a developer, and the user may not have an account or want to use an account associated with one of the offered providers. Further, if a user's account at a provider is suspended, then the user no longer has access to the applications they used that were linked to that provider. And, as mentioned, if a developer no longer wants to work with a provider because of the provider's terms or policies, or if the provider revokes the developer's access, then the developer will lose (or at least risk losing) the application users that have used the provider to access the developer's application.

Another disadvantage for users of the conventional approach of using social sign-ins to access applications is that different developers offer different providers, and a user may therefore need to have accounts at multiple providers. As a result, a user must remember which provider they used for each application, as well as the account names and passwords for each provider. If they recall this information incorrectly, then they will have "fractured" their identity for that application, where this refers to a situation in which the data associated with the previous provider is missing, and any new data is associated with the most recently selected provider.

In addition to these disadvantages for users and developers, there are also privacy implications with social sign-in approaches. This is because the developer sees which provider(s) a user has an account with, and the provider sees which applications the user is signing into. Both situations represent a loss of privacy for the end-user of the application and are undesired results of the conventional social sign-in model.

As might be expected, user privacy and the protection of user-related data is of great concern not only to users, but also to social sign-in and other service providers (such as Google or Facebook) who may be exposed to risk by their access to, use, and storage of such data. The user data involved may include not only credentials (e.g., login name and password) but also data regarding a user's web-browsing activities, the sites they visit and the services they use, the applications they access, or the purchases they make within an application, as examples, any of which may be subject to misuse for malicious purposes.

Because of the importance of protecting user data and information about user behaviors, it is desirable that the number of systems that have access to such data and information be limited, and that they utilize the most effective data protection and user authentication methods available. Unfortunately, this is often not the case due to human error, system weaknesses, and security flaws in software being used by users and service providers. These factors have resulted in multiple large-scale instances of unauthorized access to sensitive user data in the form of data breaches and other malicious activities.

A related issue is that of how users verify their identity. Government issued identity credentials will usually have a user's name, address, date of birth, as well as other information. This is often the case whether the identity information is in a physical form such as a driver's license, passport, identity card, or is in the form of a digital credential. This can lead to unnecessary disclosure of some of that information.

As an example, when a user needs to prove they are above a certain age to access adult oriented services, they typically share all the information associated with a credential, when all they really need to provide (in this example) is confirmation that they are over a certain age. This potential for over sharing information may make users hesitant to access certain products or services. Conventional approaches to social sign-in or other forms of accessing a set of applications or services have disadvantages for both users and application developers, and create risks for users, developers, and providers of social sign-in functionality.

Embodiments of the disclosure are directed toward solving these and other problems individually and collectively.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As noted, conventional approaches to the protection of user data and information regarding user behaviors have not proven to be sufficiently effective at preventing unauthorized access to and misuse of the data and information. Further, the conventional approaches limit user choices and developer options in selecting an authentication or log-in provider for an application to use. These and other disadvantages of conventional approaches are overcome by one or more embodiments of the system and methods disclosed herein.

Embodiments of the disclosure are directed to systems, devices, apparatuses, and methods for more effectively protecting a user's private data and information regarding their browsing and other on-line activities. In addition, embodiments remove constraints on an application developer by not requiring them to specify an authentication service provider as part of their application, and instead permit a user to make that choice in a protected and anonymous manner.

In some embodiments, the disclosed systems, apparatuses, and methods may provide one or more of the following features, capabilities, operations, functionality, or advantages:
- a user can configure multiple backup providers so that if they lose access to their preferred provider, they can recover their "Interchange" account (where this is the name given to an account associated with the authentication system disclosed herein);
- a user can delegate to other users the ability to access their information and control its use if the user is incapacitated, so that someone they trust can act on their behalf;
- the disclosed Interchange operates under algorithmic control rather than administrative control—one implication of this form of control is that the Interchange cannot revoke access to either users or developers;
- access and control of the Interchange system and platforms are distributed across 4 "Trustees" that are in geopolitically independent regions, and no single Trustee can access user data;
- if they can demonstrate a need, law enforcement may be able to access certain user data if they acquire subpoenas in at least two of the jurisdictions of the Trustees;
- a user can choose to reveal only the information requested by an application. The Interchange is configured to transform a trusted "claim" (where this term and its usage herein are further defined below) from a provider to contain only the information needed by a specific application. For example, a claim with the user's date of birth can be transformed into a claim that the user is over 18 if that will satisfy the request;
- the interchange can pass a claim from a provider and mask the identity of the application and the application's identifier when presented to the user, while allowing the application to know the claim was intended for them and knowing which user the claim refers to, thereby minimizing the information shared with a claims provider.

Embodiments of the system and methods disclosed herein are directed to simplifying and providing enhanced security and data privacy protections for account and application sign-in and sign-up processes executed online. Embodiments offer, among other functions and benefits, a single layer identity verification service that allows consumers/users to choose their preferred provider to manage sign-in for websites, applications, and other service providers. In some embodiments, the disclosed service may optionally provide verification of a consumer's phone number and email address so that information can be more easily and safely used online.

Advantageously, one or more of the embodiments disclosed herein do not require the development or promotion of new technical standards and instead focus on creating an online environment where identity can be shared and verified securely, removing many of the obstacles and disadvantages that currently exist in the conventional social sign-in processes.

In one example, to use an embodiment of the disclosed service, a consumer creates one account with a single organization (e.g., referred to as a Hellō account herein). They can optionally provide their phone number and email address for purposes of verification. The consumer then uses their account credentials to sign-in to websites, applications, and services that implement the organization's protocol. They are then prompted to choose their preferred provider (i.e., Facebook, Google, etc.) to sign-in to the provider's service platform. User privacy is protected because website and application owners do not know which provider a consumer has selected, and providers do not know which sites and applications a consumer is using. This approach also benefits website and application developers as they do not have to manage sign-in and verification functions in their applications.

In some embodiments of the disclosed system or platform, the single organization (also referred to as an "Interchange" herein) may provide a set of services, where the functionality provided by the services is spread or distributed across at least three independent (in terms of jurisdictional or centralized control) organizations. Each organization independently manages data, presentation, and tokens separately, thereby ensuring no one entity can have unauthorized access to consumers' data. This distributed and independent architecture enables both data security and privacy, but also provides other benefits and advantages.

For example, the Interchange is a neutral service that makes no decisions on users or developers with regards to their qualifications to access an application or service. A user can use the Interchange service if they have a provider. To be a provider, a service needs to operate a standard federation protocol that mints tokens representing the user. A developer can use the Interchange service if they have a reseller willing to work with them. In some embodiments or implementations, an entity may be required to meet operational and/or financial requirements to be a reseller.

Note that conventional approaches using a central service creates a single point of failure that may be subverted or used for surveillance. Thus, one advantage of the system and methods disclosed herein is that the Interchange is constructed of multiple components that have a required interdependency in order to make changes to the system, or access user data. In this regard, no one component can make a change in the data, or arbitrarily view user information. Components are operated by independent operators in a transparent manner. As a result, multiple failures and/or collusion must occur for a security issue to arise or for unauthorized access to occur.

In some embodiments, the disclosed system provides the following forms of data protection:

Confidentiality—data at rest is encrypted, and the index identifier correlates to no other data (and is therefore meaningless). No arbitrary access to user information is allowed. An external event is required for data access;

Integrity—all records are "signed". Records and tokens related to user information are signed by one component (the token service or TS) and verified by another (the orchestration service or OS);

As another form of ensuring data integrity, the executable image for each component is verified by multiple "trustees" before being enabled to run, thereby ensuring that the code running is the code that all trustees can "see" in the repository; and Availability—A set of the four primary components disclosed herein is termed a "pod", and there are expected to be multiple pods in each major region in the world. Each pod is independent of all other pods. New versions of components are deployed gradually to ensure the new version operates properly.

Other features and benefits of the disclosed architecture and allocation of services, include but are not limited to:

Application developers would like to be able to acquire and process claims from users such as "user is above a certain age", but different users will have different social (or other) sign-in providers. For a developer to serve the largest set of possible users, the developer needs to have a relationship with each likely provider, and conversely, each provider needs to have a relationship with each likely developer. This is a significant burden on both developers and providers. The disclosed Interchange architecture provides a solution that overcomes this disadvantage;

When an application directly requests a claim from a provider for a user (e.g., "Is the user 21 years of age or older?" or "Is the user a US resident?"), the provider learns which applications a user is using, and when. This reduces the user's privacy and may disclose protected data. The disclosed abstraction layer in the form of the distributed Interchange architecture provides a solution that overcomes this disadvantage; and As mentioned, a conventional centralized sign-in service providing an abstraction layer and services has several weaknesses:

the service can observe all transactions, resulting in a potential for unauthorized access to private user data;
the service can modify claims by a provider about a user; and
the service operator is able to decide which applications, which users, and which providers are allowed to use the sign-in service.

The disclosed Interchange architecture provides a system or platform which implements a set of distributed and functionally isolated services to decompose a sign-in operation and access to an application into a set of operations that protect user data from unauthorized access, while facilitating application development and ease of use.

Embodiments of the disclosure are directed to systems, devices, apparatuses, and methods for more effectively protecting a user's private data and information regarding their browsing and other on-line activities. In one embodiment, a method may include the following steps, stages, functions, or operations (where, as disclosed, some of these functions or operations may be executed on (or by) distinct and independent platforms or servers):

A user opens an application or navigates to a website (the app) that uses the Interchange. The user clicks on a button, or indicates in some way that they would like to sign-in to the app. The user is redirected to the Interchange with a request URL containing parameters of the app's request. The Interchange interacts with the user as either an application or a website. The orchestration service (OS) receives the request URL and starts processing the request;

The OS requests the signed app metadata from the Storage Service (SS). The OS presents the app request (which may be signed by the app) and the app metadata to the Token Service (TS). The TS creates a session token that contains a nonce, the request, and the app metadata. The TS returns the session token to the OS;

The OS presents the user with a page showing the app being signed into, and login provider selection;

The user selects their preferred login provider, sending the request to the OS. The OS generates a login request for the selected provider. How the user interacts with the selected provider may be provider specific. The user may be redirected to the selected provider if the provider supports a redirection-based federation protocol. The user may be prompted to sign a request if using a crypto wallet. The user may be required to enter a confirmation code communicated out of band to the user;

The OS receives the results of authentication from the preferred provider and presents the authentication results and the session token to the TS. The TS examines the authentication, updates the session token with the authentication results, and returns to the OS a read subject record storage access token (SAT) for the hashed subject identifier in the authentication results;

The OS presents the SAT to the encryption service (ES) that presents the SAT to the SS. The SS retrieves the encrypted subject record if it exists identified by the storage access token and returns it to the ES that decrypts the subject record and returns the subject record to the OS;

The OS presents the session token and the subject record to the TS. The TS updates the session token, retrieves the user id from the subject record, and returns a read user record storage access token (SAT) for the hashed user id to the OS;

The OS presents the ES with the SAT, and the ES passes the SAT to the SS. The SS retrieves the encrypted user record, and returns it to the ES, which decrypts the record and returns it to the OS;

The OS harvests any additional profile information provided by the selected provider from the authentication results. This could include (as non-limiting examples) name, picture, email, verified email, or Ethereum address. If there is new information for the user that is not already in the user record, then the OS will update the user record and pass the updated user record, session token, and authentication results to the TS. The TS will update the user record and sign it and generate an update user record SAT to update the user record;

The OS then passes the SAT and user record to the ES, the ES encrypts the user record and passes them to the SS. The SS then updates the encrypted user record per the SAT;

The OS reviews the app request and presents the user with the claims the app has requested. The user selects which claims to release to the app, and the user may also acquire additional, new claims that are being requested by the app that the Interchange does not already have about the user. The OS will update the user's records with these new claims, which is similar to harvesting date from an authentication result;

Once the user has decided which claims they would like to release to the app, the claims are sent to the OS that creates an ID Token payload with the claims and presents the payload and the session token to the TS. The TS signs the ID Token payload, creating an ID Token, and returns it and the updated session token to the OS. The OS redirects the user back to the app with the ID Token. The app verifies the ID Token, creates, or updates the user's profile at the app, and presents the user with a logged in experience;

If there was no subject record, then the user is likely a new user to interact with the Interchange and the SS will return a signed token that there was no user for the hashed subject identifier. The OS will harvest profile information, and then present a user record, authentication results, the session token, and the no user token to the TS which will sign the user record and generate a create user record SAT and return them to the OS. The OS will pass these to the ES, which will encrypt the user record and pass it and the SAT to the SS, which will store the encrypted user record.

In one embodiment, the disclosure is directed to a system for more effectively protecting a user's private data and information regarding their browsing and other on-line activities. The system may include a set of computer-executable instructions and an electronic processor or co-processors. When executed by the processor or co-processors, the instructions cause the processor or co-processors (or a device or server of which they are part) to perform a set of operations that implement an embodiment of the disclosed method or methods (where, as disclosed, some of these functions or operations may be executed on (or by) distinct and independent platforms or servers).

In one embodiment, the disclosure is directed to a set of computer-executable instructions, wherein when the set of instructions are executed by an electronic processor or co-processors, the processor or co-processors (or a device or server of which they are part) performs a set of operations that implement an embodiment of the disclosed method or methods (where, as disclosed, some of these functions or operations may be executed on (or by) distinct and independent platforms or servers).

In some embodiments, the systems and methods disclosed herein may provide services through a SaaS or multi-tenant platform. The platform provides access to multiple entities, each with a separate account and associated data storage. Each account may correspond to a user, a set of users, an entity, a set or category of entities, a set or category of users, a developer, a reseller, an application, a set or category of data, an industry, or an organization, for example. Each account may access one or more services, a set of which are instantiated in their account, and which implement one or more of the methods or functions described herein.

Other objects and advantages of the systems, apparatuses, and methods disclosed will be apparent to one of ordinary skill in the art upon review of the detailed description and the included figures. Throughout the drawings, identical reference characters and descriptions indicate similar, but not necessarily identical elements. While the embodiments disclosed or described herein are susceptible to various modifications and alternative forms, specific embodiments are shown by way of example in the drawings and will be described in detail herein. However, the exemplary or specific embodiments are not intended to be limited to the forms described. Rather, the present disclosure covers all modifications, equivalents, and alternatives falling within the scope of the appended claims.

BRIEF DESCRIPTION OF THE DRAWINGS

Embodiments of the disclosure are described with reference to the drawings, in which.

Note that the same numbers are used throughout the disclosure and figures to reference like components and features.

DETAILED DESCRIPTION

Figure 1:
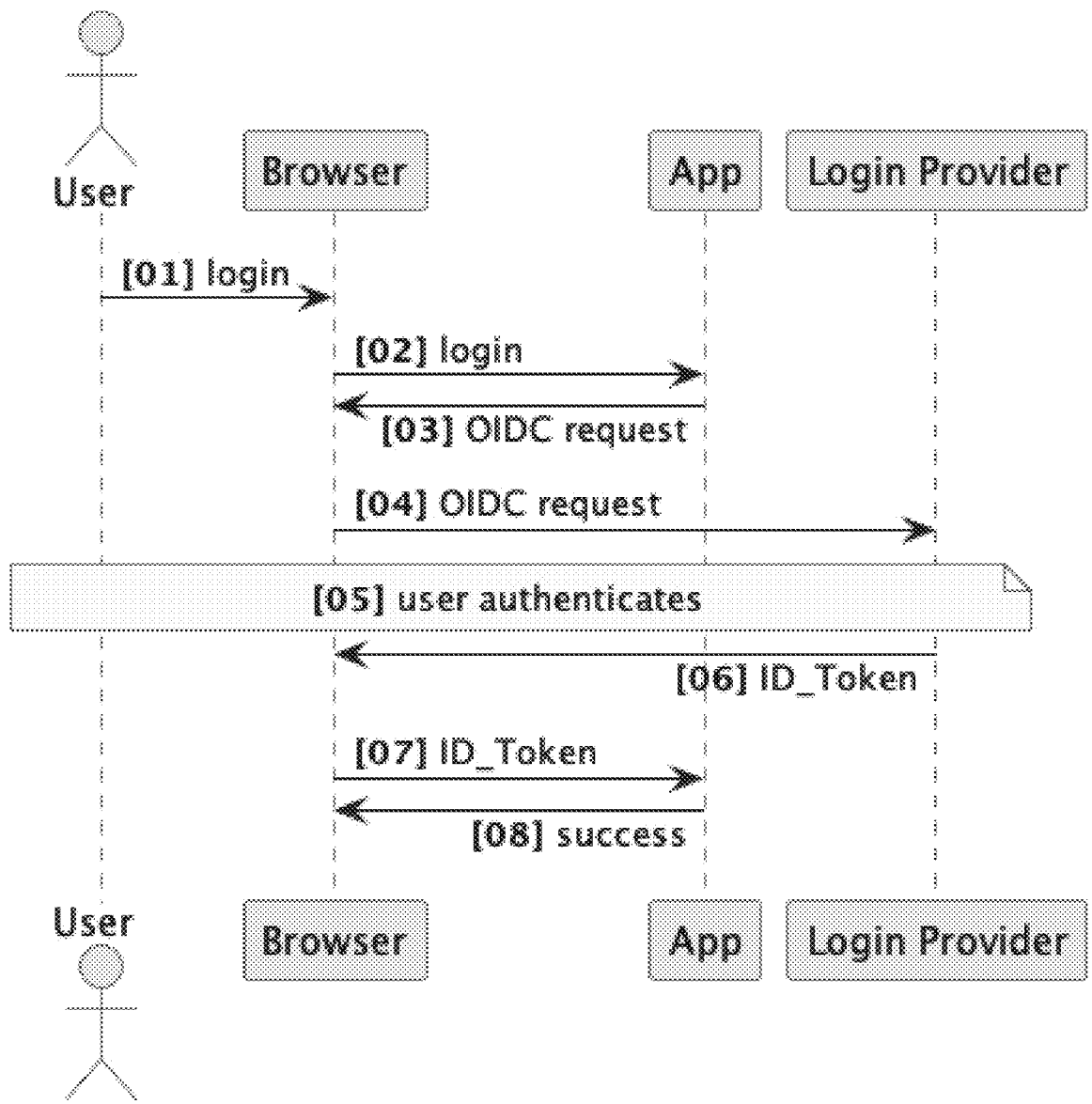
FIG. 1 is a flow diagram illustrating an example process or method for an OpenID Connect login flow, and illustrates a typical sequence involved in a user logging into an application with an OpenID Connect login provider.

The subject matter of the disclosure is described herein with specificity to meet statutory requirements, but the description is not intended to limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, a platform, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods disclosed herein may be implemented by one or more suitable processing elements (such as a processor, microprocessor, CPU, GPU, TPU, QPU, state machine, or controller, as examples) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or transfer of an application that executes a set of instructions over a network (e.g., the Internet). In some embodiments, a set of instructions or an application may be utilized by an end-user through access to a SaaS platform or a service provided through such a platform. Further, as disclosed, some of the disclosed functions or data processing operations may be executed on (or by) distinct and independent platforms or servers.

In some embodiments, the systems and methods disclosed herein may provide services through a SaaS or multi-tenant platform. The platform provides access to multiple entities, each with a separate account and associated data storage. Each account may correspond to a user, a set of users, an entity, a set or category of entities, a set or category of users, a developer, a reseller, an application, a set or category of data, an industry, or an organization, for example. Each account may access one or more services, a set of which are instantiated in their account, and which implement one or more of the methods or functions described herein.

In some embodiments, one or more of the operations, functions, processes, or methods disclosed herein may be implemented by a specialized form of hardware, such as a programmable gate array, application specific integrated circuit (ASIC), or the like. Note that an embodiment of the disclosed subject matter may be implemented in the form of an application, a sub-routine that is part of a larger application, a "plug-in", an extension to the functionality of a data processing system or platform, or other suitable form. The following detailed description is, therefore, not to be taken in a limiting sense.

Over time more and more of people's interactions are moving from the physical world to the online world, yet the Internet still lacks a single identity system that serves the same purpose as a passport or driver's license. As consumers conduct more of their daily tasks online, frustration over maintaining multiple usernames and passwords grows, as well as concern over data privacy and security risks. Many consumers express annoyance over having to create new accounts for multiple websites and applications, with some even abandoning the process altogether. When asked what their main concern was when it came to online registration and account set-up, consumers often cite worries over privacy and security, which is a valid concern with cybercriminals using more sophisticated methods to obtain unauthorized access to personal information.

These concerns indicate the need for a more secure and tamper-proof method of providing user data to establish an account and to obtain access and use of an application, and one which simplifies the effort required by users. As disclosed herein, in one or more embodiments of the Interchange, user information is inaccessible to the Interchange until a user provides a token from their chosen login provider, or tokens from two of their backup providers. These represent illustrative examples of how the operation of the Interchange enables a secure and efficient control of user information.

Embodiments of the system and methods disclosed herein are directed to a system, a platform, an architecture, and methods for protecting the privacy of users and the security of their personal data, including information regarding their on-line behavior. In some embodiments, these goals are achieved by inserting a proxy acting as an abstraction layer between the user and the elements or processes that may desire to access and use the user's data. Further, the disclosed architecture separates and isolates certain of the authentication and data storage and access functions across independently acting (and in some cases independently regulated) components, thereby further reducing the possibility of unauthorized access to user data or information.

Among others, the embodiments disclosed herein may have the following benefits and advantages:

Security of user data (and hence user privacy) is enhanced over conventional architectures and systems because of the separation/isolation of specific data between data stores controlled by independent entities. Further, the functions involved in authenticating and using a user's data are similarly separated/isolated (such as login, selection of a service provider, or use of search terms, as examples) in a manner so that no single entity can misuse a user's credentials or data;

As a result of this architecture, collusion or cooperation between different entities/actors/components is required to access a user's information when they are not present or to impersonate a user and obtain unauthorized access to user data;

Since each functional element or component is operated by an independent operator, some form of collusion is required between operators to allow an instance of unauthorized access. If the operators are in different geopolitical jurisdictions (i.e., countries, and in some cases, even different States or local jurisdictions), then information about a user is more difficult to obtain and is expected to be more resistant to improper discovery via subpoena or other legal process;

The separated and independent entities/actors/components each have access to only partial data or information concerning a user, and this partial data or information is of a type and amount that is insufficient to provide meaningful information about user identity, credentials, or behavior;

A client device or process can request authentication, and trust that the resulting ID token was derived from an ID Token representing the same user, and from a Provider the User selected;

A user can authorize a selective disclosure, thereby disclosing a minimal amount of information (such as being over 18, instead of providing a birthdate);

A user can add multiple backup sign-in providers to reclaim their account if they lose access to their preferred provider;

A user can enable device authentication with the Interchange for certain classes of operations; for example, the user may allow only device authentication when installing a mobile game, but require authentication with their preferred provider to install a financial application;

A user can delegate to two or more users to be able to access the user's account in case the user becomes incapacitated; and A user can define policies for authentication that are required for "critical" or important configuration changes to the user's profile at the Interchange. For example, signing in can be done with device authentication, but changing a profile requires authentication with the preferred provider.

Embodiments of the disclosed system and methods solve many of the problems inherent in conventional approaches to securing user credentials and data by providing an abstraction layer (in the form of a global interface) between a developer and a provider. Developers integrate with the system (Interchange) platform, which appears to a developer like a standard, OpenID Connect provider. The organization operating the system platform (referred to as Hellō in one example) integrates with all providers that a user may want to utilize. The platform appears to the providers as an application. The platform's processes or functions map the provider identifier to a platform identifier and send a directed version of the platform identifier to the developer.

A user may decide to change their preferred provider. If a user adds one or more backup or secondary providers, they can use them if their preferred provider is not available. A user is able to use the same provider for all applications available through the platform. As mentioned, user privacy is protected as the developer does not see who their provider is, and the provider does not see which applications a user is accessing.

As a practical matter, application developers may be concerned about confusing users by showing a button or activatable element for the system platform organization or operator (e.g., Hellō) to users who do not have an associated account. To address this problem, developers can discover if there is a cookie belonging to the system platform organization in the browser instance and/or check if the user has verified their phone or email address with the organization. The developer can then cause the application to display the organization button to only those users that have an associated account.

Figure 6:
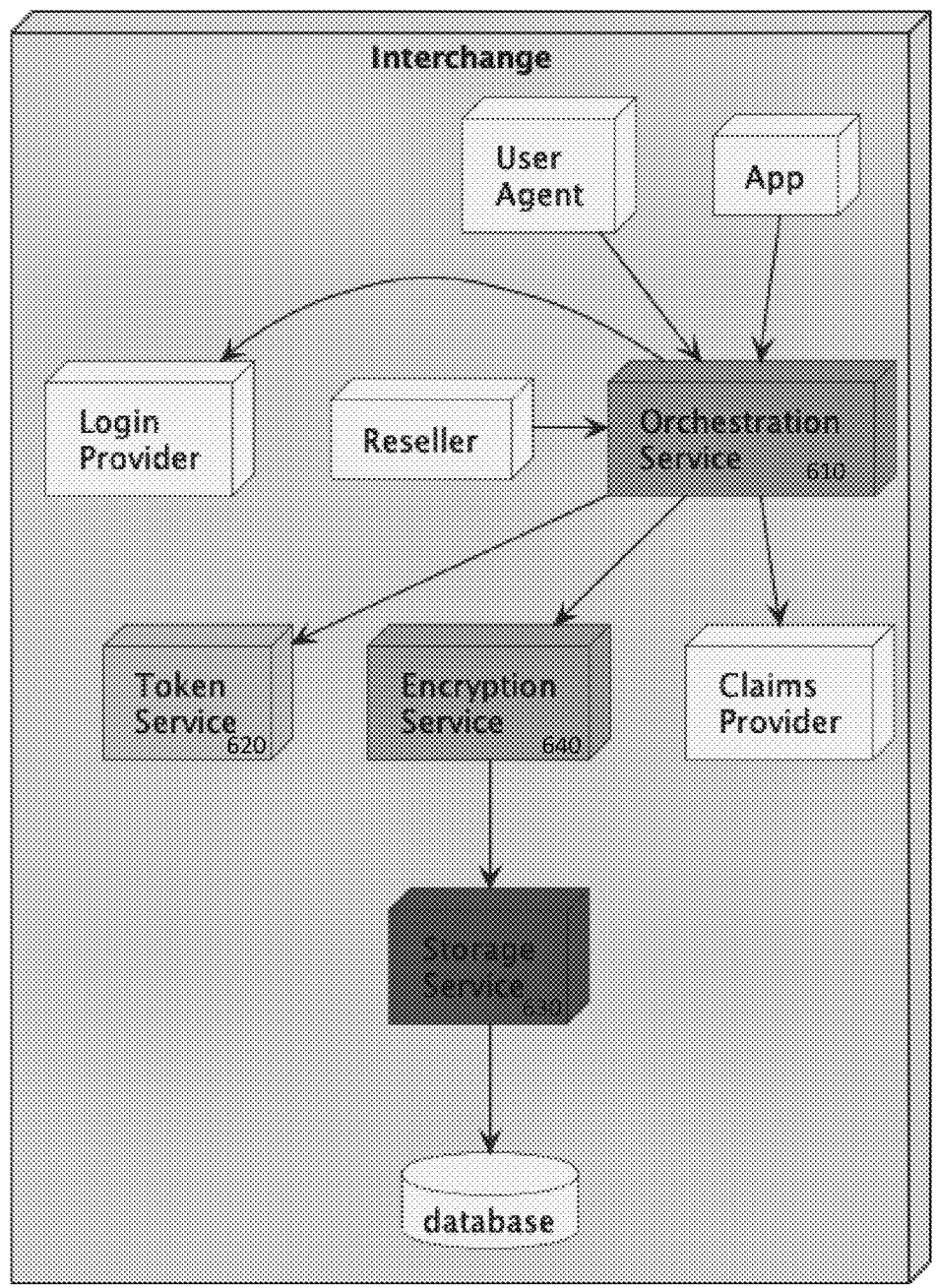
FIG. 6 is a diagram illustrating the services and components that may be used as part of an implementation of an embodiment of the systems and methods disclosed herein.

The organization platform or Interchange can be viewed as a centralized store of user information and activity records. This may create a concern regarding privacy and user data security. Embodiments of the system, platform, processes, and methods disclosed herein address this concern by partitioning the overall service platform and its functions into four primary components or elements (as illustrated in FIG. 6):

An Orchestration Service (OS);
A Token Service (TS);
An Encryption Service (ES); and
A Storage Service (SS).

In one embodiment, the organization operating the Interchange system may contract with independent entities to operate each of the four components/services. Note that in some embodiments, at least two entities among the four must cooperate to impersonate a user or be able to access user information. This provides a layer of protection lacking in conventional approaches. For example, if one of the components is breached, or an operator receives an information request, it will not have access to user information or a record of a user's historical activity.

In some embodiments, each of the entities responsible for operating one of the four services may be subject to the jurisdiction of independent (in a legal or geopolitical sense) entities or governments. This provides a layer of protection as a request for user records or information would need to be justified in more than a single jurisdiction to be executed. As an example, each of the four primary services (OS, TS, ES, or SS) may be operated by an organization that is subject to different laws or regulations.

In some embodiments, this may be achieved by locating each of the four services in a different country. In some cases, this may be achieved by locating each of the four services in a different state or municipality. Further, in some cases this may be achieved by each of the four primary services being operated by an organization that is not subject to the same laws or regulations as any of the other organizations.

In addition, and to provide another layer of privacy and data protection, each service operating entity may be located in a geopolitical jurisdiction having no formal or informal information sharing arrangements with other of the jurisdictions, at least with regards to the type of information that may be accessed or processed by the Interchange. For example, at present South Korea and Switzerland are independent geopolitical jurisdictions in this sense, but Australia, Canada, New Zealand, the United Kingdom, and the United States are all part of the Five Eyes intelligence alliance and are not geopolitically independent. It is also desirable that the jurisdiction of each of the four service operators be one that has a clear rule of law, relatively strong privacy laws, and is regarded as a trustable jurisdiction.

In the context of this disclosure and the description of the systems and methods provided herein, the following terms have at least the following meaning(s):

Claim—an assertion of the truth of something or a fact about a user, typically something which is disputed, in doubt, or needed to allow access to an application or functionality;

Example claims are an identifier, such as a student number or passport number, a user's name, date of birth, whether a user is over 18, a user's address, or citizenship;

Claims may also be related to an affiliation, such as student, teacher, medical professional, first responded, veteran, or AARP member. Self-asserted claims are claims stated by the user. Verified claims are claims that are made by a trusted party about the user;

Client—a developer's application communicating with the Interchange to sign-up or sign-in a user. Other terms sometimes used for a client are a Service Provider (SP) or Relying Party (RP);

Developer—the party creating an application or website (the client) that uses the Interchange for user account sign-up or sign-in;

OpenID Connect (OIDC)—a popular identity federation protocol built on top of OAuth 2.0 and standardized by the OpenID Foundation;

Provider—the user authentication service or provider a user has selected to authenticate them to the Interchange, for example Google, Microsoft, or Apple;

Preferred provider—the provider a user has chosen to be the provider they authenticate to the Interchange with;

Backup provider—a provider a user has chosen to be used to regain access to the Interchange. In some embodiments, a user will need to use two or more backup providers to regain access;

User—the person wanting to use an application, and who uses the Interchange to login or setup an account;

JSON Web Token (JWT)—a standardized token format using JSON to represent the payload;

Assertion—a cryptographically signed object;

Assertion Chaining—a situation where the contents of a new assertion are based on one or more other assertions. A process used as part of the Interchange;

Token—an assertion that can exist outside the Interchange. As examples, tokens may be consumed, emitted, or presented by the Interchange. Further, tokens may be JWTs;

Access Token—a token used to access a service;

Storage Access Token (SAT)—an access token internal to the Interchange and required by the storage service for storage operations such as creating, reading, updating, and deleting records;

ID Token—a standardized OpenID Connect token for representing the user, issued and signed by the provider;

Record—an assertion signed by the token service that is stored or retrieved from the storage service, and optionally encrypted by the encryption service. Records are not exposed outside the Interchange;

aud—a token attribute representing the audience the token is intended for;

iss—a token attribute representing the party that issued the token (the issuer);

sub—a token attribute representing the identifier the provider has for the user, the subject of the token; The sub identifier is unique to the issuer;

nbf—a token attribute representing the time at which a token becomes valid;

exp—a token attribute representing the time at which a token expires;

Subject—a globally unique identifier for a user. May be a concatenation of the iss and sub token attributes;

JWK—JSON Web Key, an attribute of a JWT that is a standardized way to represent a public key in asymmetric cryptography using JSON;

Id—an identifier in a record; and

App—an application, or a record representing an application.

FIG. 1 is a flow diagram illustrating an example process or method for an OpenID Connect login flow, and illustrates a typical sequence involved in a user logging into an application with an OpenID Connect login provider. As shown in the figure, a user may follow the numbered sequence described below:

The user selects the login provider they want to use with the application (app);

The browser sends the selection to the app;

The app creates an OpenID Connect (OIDC) request and sends to the browser as a redirect;

The browser sends the OIDC request to the login provider;

The login provider authenticates the user in any suitable manner;

The login provider sends an OIDC ID_Token to the browser in a redirect;

The browser sends the ID_Token to the app; and

The app verifies the ID_Token is from the login provider and changes the user's status to authenticated, and then the app presents a success message to the user.

While effective, this conventional approach has several disadvantages. Among others, these may include:

The user can only choose from the login providers presented by the application;

The app knows which login provider the user chooses;

The login provider knows which apps the user is accessing, and when;

The login provider controls the relationship between the user and the app. If the login provider terminates its relationship with the user or the app, the user and app no longer have a relationship; and The application can only ask for claims supported by the login provider, and each login provider decides which claims it supports—therefore, an application must be prepared to acquire claims directly from the user. For example, if the application wants a verified email address, some providers will provide that as a claim, but not always. The application should have an email verification system even though it may not need to use it.

Figure 2:
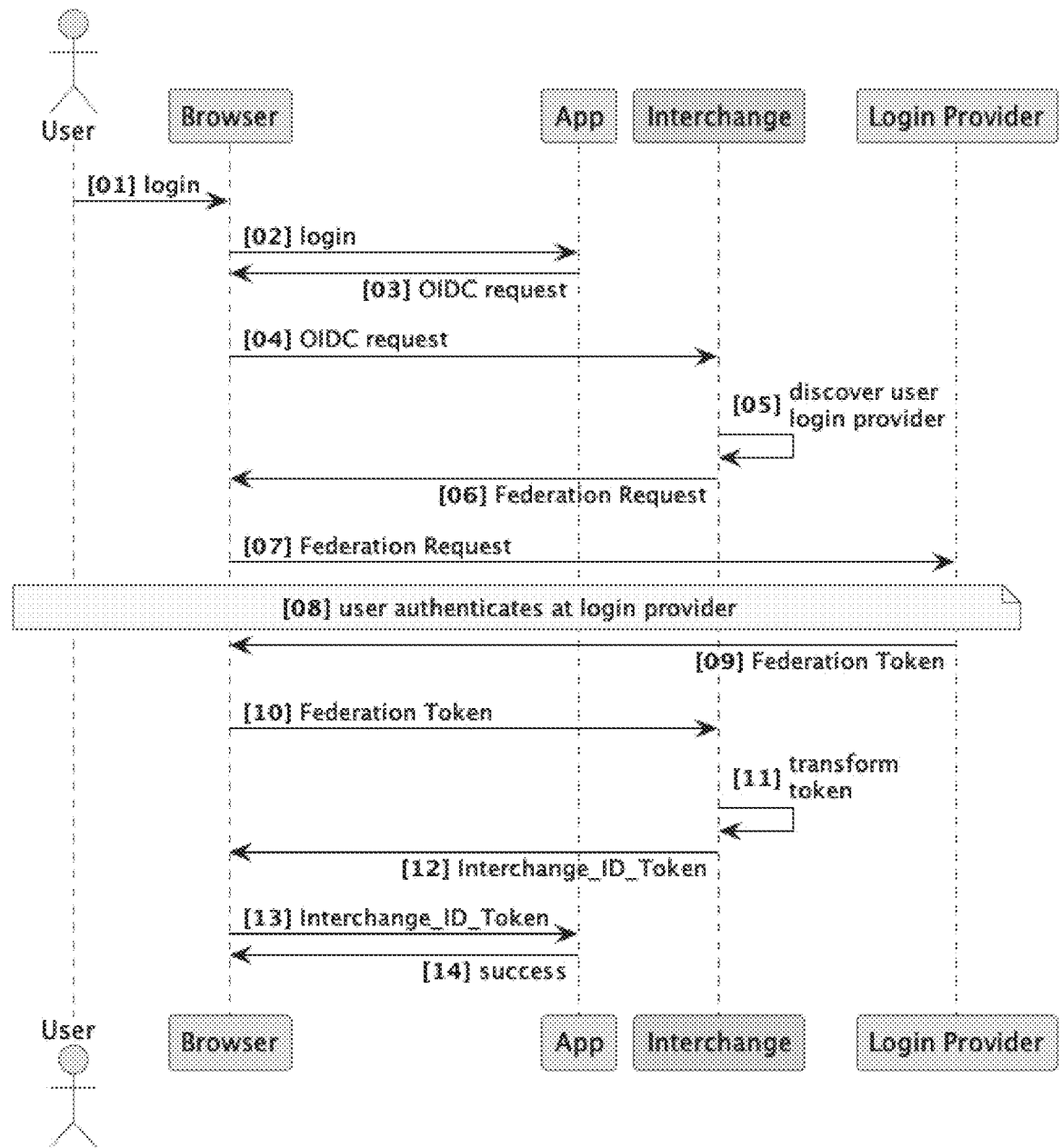
FIG. 2 is a flow diagram illustrating an example process or method for a typical login flow with the disclosed Interchange as part of an implementation of an embodiment of the systems and methods disclosed herein.

To an application or service developer, the Interchange is similar to an OpenID Connect Provider. To a sign-in or user authentication Provider, the Interchange is similar to a client/relying party, although this may depend on the Provider protocol. In general, the Interchange is a proxy for the authentication signal from the user's selected Provider. FIG. 2 is a flow diagram illustrating an example process or method for a typical login flow with the disclosed Interchange as part of an implementation of an embodiment of the systems and methods disclosed herein. The sequence diagram in FIG. 2 shows a modification to the standard OpenID Connect Flow that is implemented for an embodiment of the system architecture of the Interchange. In one embodiment, the process or protocol implemented may be as follows:

[01] The user selects the Interchange to authenticate;

[02] The browser sends the selection to the app;

[06] The app creates an OpenID Connect (OIDC) request and sends it to the browser as a redirect;

[04] The browser sends the OIDC request to the Interchange;

[05] The Interchange determines who the user's login provider is in some manner;

[06] The Interchange sends a redirect federation request (using the federation protocol supported by the login provider);

[07] The browser sends the federation request to the login provider;

[08] The login provider authenticates the user in any suitable manner;

[09] The login provider sends an OIDC ID_Token to the browser in a redirect;

[10] The browser sends the ID_Token to the Interchange;

[11] The Interchange maps the login provider user identity to the Interchange user identity, and creates its own ID Token;

[12] The Interchange sends the Interchange_ID_Token to the browser in a redirect;

[13] The browser sends the Interchange_ID_Token to the app; and

[14] The app verifies the Interchage_ID_Token is from the Interchange and changes the user's status to authenticated, and the app presents a success message to the user.

The following sections describe some of the user-facing aspects of an embodiment of the disclosed system and methods.

Figure 23:
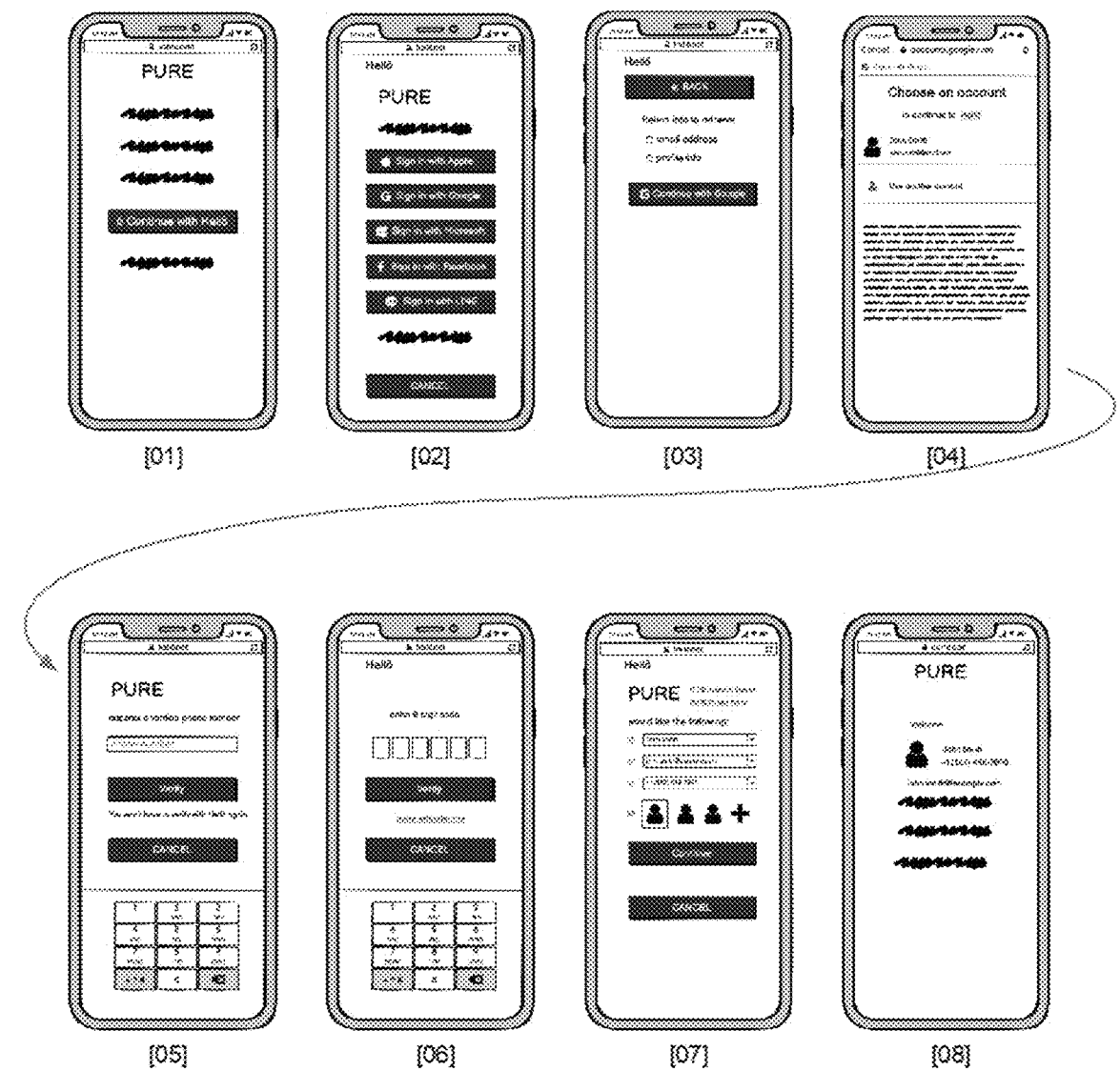
FIG. 23 is a diagram illustrating an example process or method for a user to sign up to use an application that only uses the Interchange and creates an Interchange account, as viewed on a set of mobile phone screen displays, as part of an implementation of an embodiment of the systems and methods disclosed herein.

FIG. 23 is a diagram illustrating an example process or method for a user to sign up to use an application that only uses the Interchange and creates an Interchange account, as viewed on a set of mobile phone screen displays, as part of an implementation of an embodiment of the systems and methods disclosed herein. More specifically, FIG. 23 illustrates a set of user interface screens or displays that may be presented to a user as part of a process, function, method, or operation to assist the user to set up an account for a specific application that requires a verified phone number. The corresponding internal process flow for verifying contact information is illustrated by the flow diagram or flowchart of FIG. 17, which illustrates an example process or method for a user to verify a contact with the Interchange as part of an implementation of an embodiment of the systems and methods disclosed herein.

Figure 24:
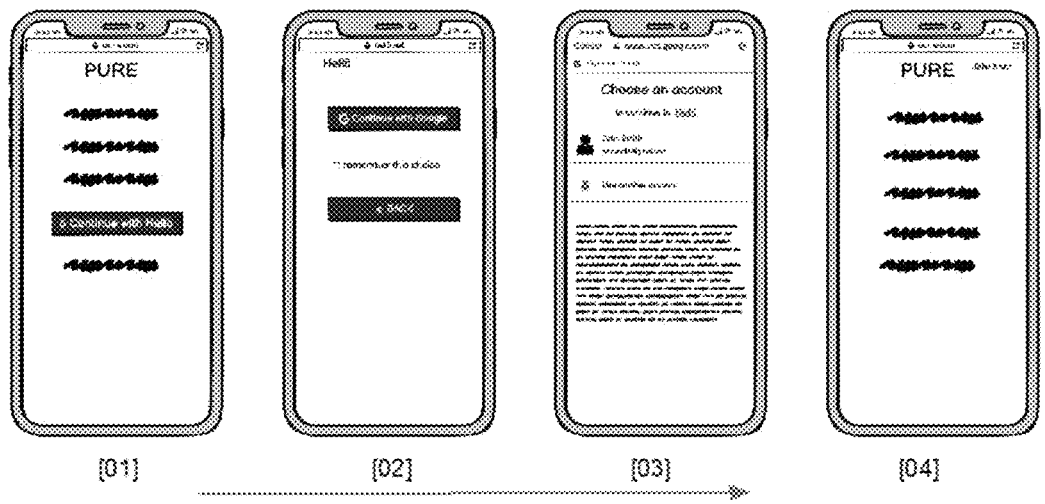
FIG. 24 is a diagram illustrating an example processor method for a user to sign-in to an application that only uses the Interchange when the user already has an account, as viewed on a set of mobile phone screen displays, as part of an implementation of an embodiment of the systems and methods disclosed herein.

FIG. 24 is a diagram illustrating a set of user interface screens or displays that may be presented to a user as part of a process, function, method, or operation to assist a user to access a specific application with an existing account at the Interchange using the user's preferred login provider. The corresponding internal process flow is illustrated by the flow diagram or flowchart of FIG. 9, which illustrates an example process or method for a user login to an application using the Interchange as part of an implementation of an embodiment of the systems and methods disclosed herein.

Figure 25:
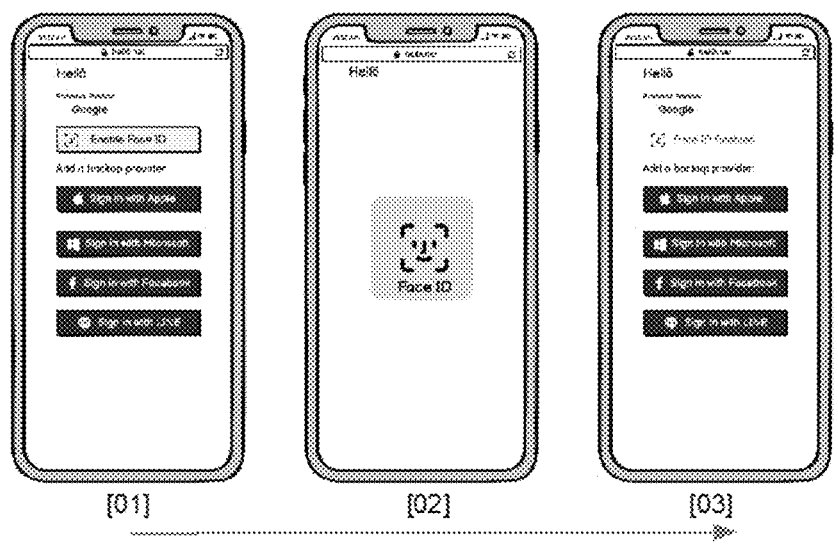
FIG. 25 is a diagram illustrating an example process or method for a user to add a device authentication method to the Interchange, as viewed on a set of mobile phone screen displays, as part of an implementation of an embodiment of the systems and methods disclosed herein.

FIG. 25 is a diagram illustrating a set of user interface screens or displays that may be presented to a user as part of a process, function, method, or operation to assist a user to add using a device authentication mechanism (FIDO in this case) to an existing account with the Interchange. The corresponding internal process flow is illustrated by the flow diagram or flowchart in FIG. 20.

Figure 26:
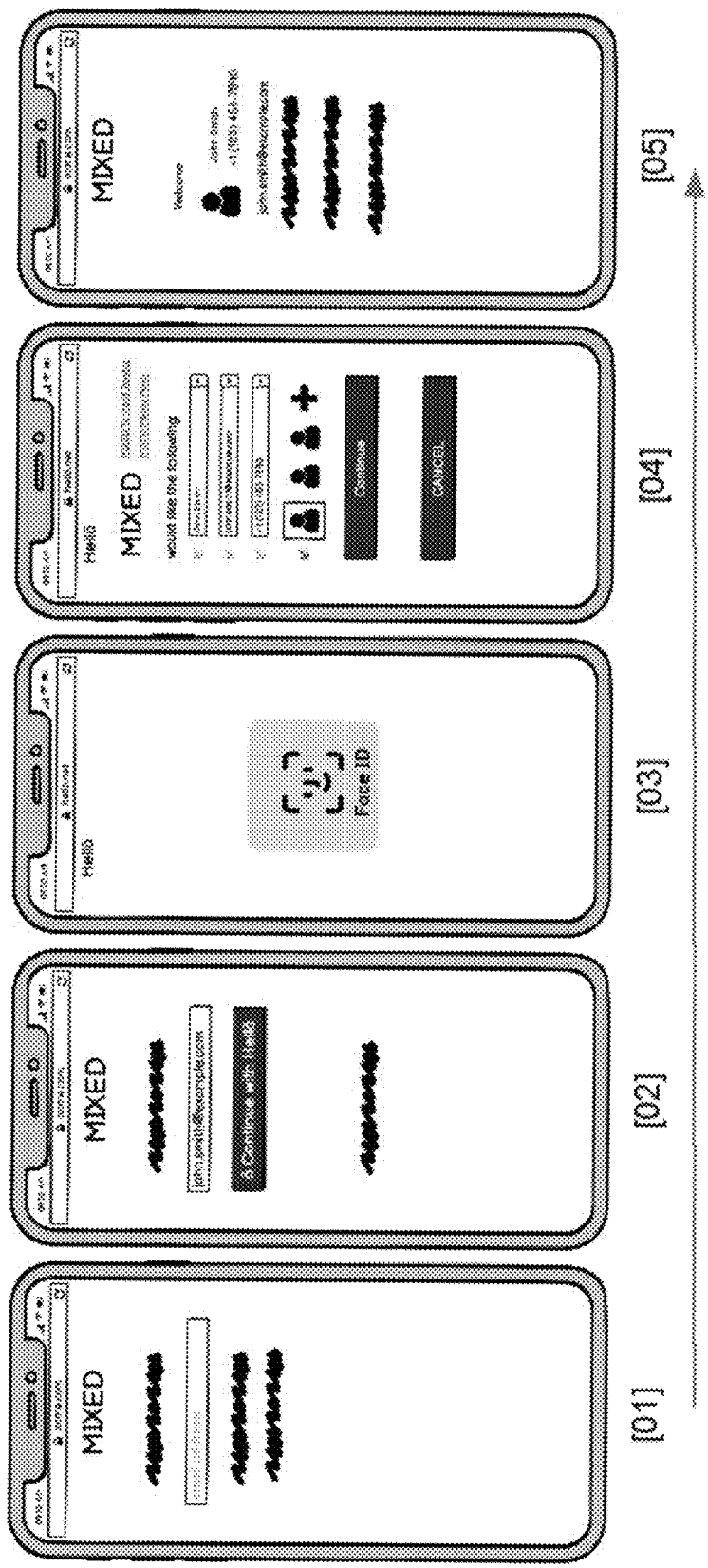
FIG. 26 is a diagram illustrating an example process or method for a user to sign up to use an application by discovering if the user has an account at the Interchange, as viewed on a set of mobile phone screen displays, as part of an implementation of an embodiment of the systems and methods disclosed herein.

FIG. 26 is a diagram illustrating a set of user interface screens or displays that may be presented to a user as part of a process, function, method, or operation to assist a user to access a specific application with an existing account with the Interchange using device authentication. The corresponding internal process flow is illustrated by the flow diagram or flowchart in FIG. 10.

Figure 27:
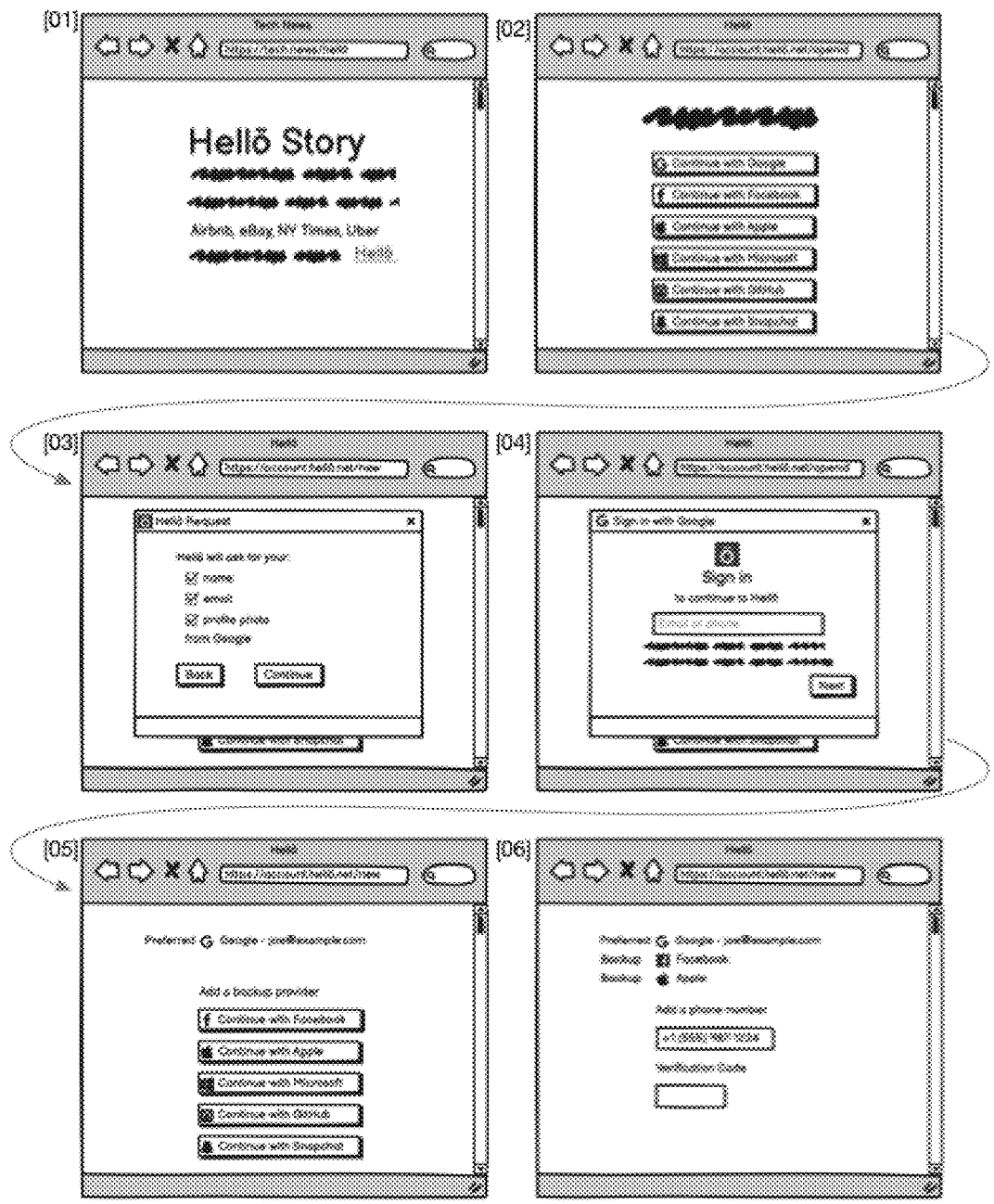
FIG. 27 is a diagram illustrating an example process or method for a user to sign up to the Interchange from an earned media as viewed externally as part of an implementation of an embodiment of the systems and methods disclosed herein.

FIG. 27 is a diagram illustrating an example process or method for a user to sign up to the Interchange from an earned media as viewed externally as part of an implementation of an embodiment of the systems and methods disclosed herein. In this context, earned media is an article or document that someone has written about the Interchange in contrast to a paid advertisement. In this example, a user reads the story, and then navigates to a sign up process rather than using the processes described with reference to FIG. 26 or 28. In this sense, FIG. 27 is a diagram illustrating a set of user interface screens or displays that may be presented to a user after reading about the Interchange as part of a process, function, method, or operation to assist a user to create an account with the organization that operates the system platform. The corresponding internal process flow is illustrated by the flow diagram or flowchart in FIG. 14.

Figure 28:
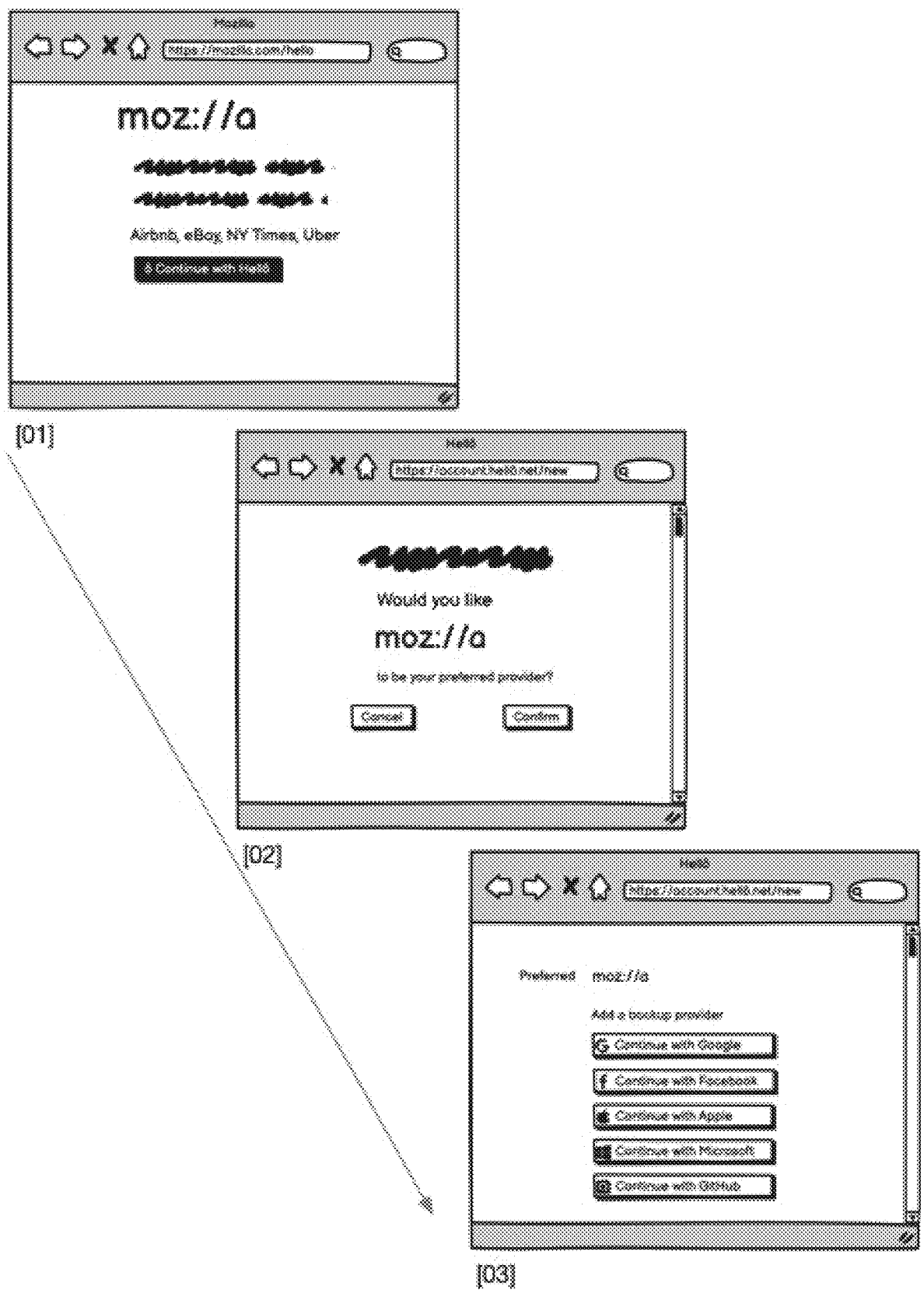
FIG. 28 is a diagram illustrating an example process or method for a user to sign up to the Interchange from a login service provider as viewed externally as part of an implementation of an embodiment of the systems and methods disclosed herein.

FIG. 28 is a diagram illustrating a set of user interface screens or displays that may be presented to a user after being prompted about the Interchange from a login provider as part of a process, function, method, or operation to assist a user to create an account with the organization that operates the system platform disclosed herein (the Interchange).

The following sections describe aspects of the system architecture that may be implemented as part of an embodiment of the disclosed system and methods.

FIG. 6 is a diagram illustrating the elements or functional components of an embodiment of the system or platform disclosed herein. The internal architecture to be described is responsible for the distribution of the various tasks across the system's internal components in a manner and according to a protocol that protects the privacy and security of user data and prevents fraud and errors. These sections of the disclosure describe the data flows between internal components, and only tangentially discuss the protocol details of how a Client interacts with the Interchange and how the Interchange interacts with a Provider.

The Interchange organization platform or system (e.g., also referred to as Hellō herein) is architected so that no single entity or service can arbitrarily access or modify user or developer information, and so that external requests for user data have to be processed by at least two (presumably independent) services. Each such service is operated by a different organization, which is subject to different regulations and may be located in a different jurisdiction. In some embodiments, source code for the services accessible through the Interchange may be made publicly accessible so that the process for protecting the data is transparent.

Below are further descriptions of the functionality or processes implemented by each of the "services" disclosed herein and illustrated in FIG. 6.

Orchestration Service (OS) (Element, Component, or Process 610 in the Figure)
- The public facing interface of the Interchange—operates/functions to orchestrate data processing flow, data entry, and other functionality;
- Provides a console for user(s) to create and manage their Interchange account (such as to add or remove providers, enter email, phone, name, or image, and set defaults);
- Serves as the OpenID Connect (OIDC) authorization end point that a user is redirected to by developers;
- Serves as a redirect endpoint for providers;
- Interface to obtain user consent for release of claims to applications;
- The OS does not store data within the service;
- The OS has access to user data when a user has an active session and accesses the user data by presenting a valid token from a device or provider previously selected by the user;
- The OS provides create, read, update, and delete (CRUD) APIs for resellers to manage applications on behalf of developers; and
- The OS calls the Token Service (TS) to create storage access tokens and records.

Token Service (TS) (Element, Component, or Process 620 in the Figure)
- Verifies all Orchestration Service (OS) operations;
- Generates storage access tokens for Orchestration Service per pre-set policies;
- Creates and signs all records stored in the Storage Service (SS);
- Creates and signs all tokens created by Interchange that are shared externally;
- Creates, updates, and signs session token; and
- Generates and verifies contact verification codes.

Storage Service (SS) (Element, Component, or Process 630 in the Figure)
- Performs CRUD operations on the database per contents of a valid storage access token;
  - Indexes to the database records are hashed identifiers;
  - Records are encrypted—the storage service cannot read records; and
- Works with the Encryption Service (ES) to rotate a master encryption key.

Figure 22:
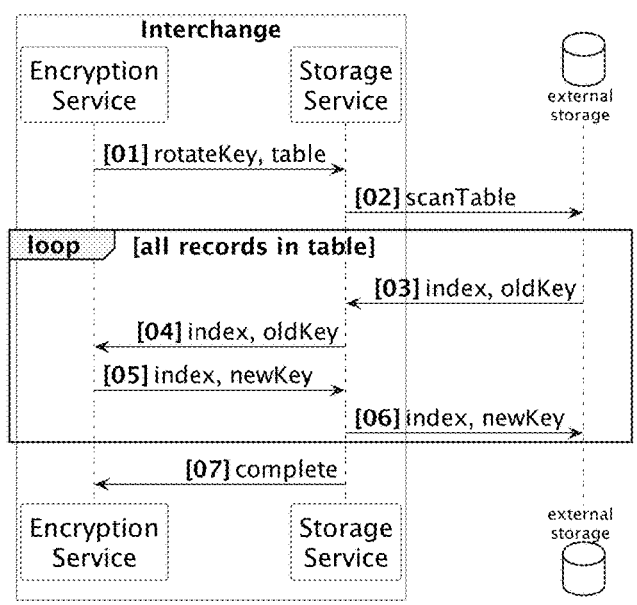
FIG. 22 is a flow diagram illustrating an example processor method for the encryption service (ES) to rotate cryptographic keys as part of an implementation of an embodiment of the systems and methods disclosed herein.

Encryption Service (ES) (Element, Component, or Process 640 in the Figure)
- Generates a unique key for each record (the record key), and encrypts the record key with the master key;
- Encrypts records coming from Orchestration Service (OS) with the record key;
- Passes storage access tokens, encrypted record key, and encrypted record to the Storage Service (SS);

Decrypts records coming from the Storage Service (SS) using the record key after decrypting the records key with the master key; and Works with Storage Service (SS) to rotate the master encryption key by decrypting each record key passed by the Storage Service (SS), encrypting with the new master key, and passing the record key encrypted with the new master key back to the Storage Service (SS), as shown in the process flow illustrated in FIG. 22.

Note the following features, functions and advantages of the system and methods disclosed herein for providing a secure, scalable, and user-friendly architecture that preserves user privacy and provides data security:

The system platform serves as an abstraction layer or "proxy" for user interactions with applications, developers and providers;

In some embodiments, a point of entry is OpenID Connect (OIDC)—a trusted identity layer on top of the OAuth 2.0 protocol, which allows computing clients to verify the identity of an end-user based on the authentication performed by an authorization server (as well as to obtain basic profile information about the end-user in an interoperable and REST-like manner);

Use of the disclosed system/platform increases user choice and control, while preserving user privacy and providing data security;

The system platform may include "discovery" mechanisms to determine if a user has an existing platform (Interchange) account;

Each of the four "services" that form part of the overall platform or architecture (OS, TS, ES, and SS) may be operated or subject to regulation by a separate and independent jurisdiction (a country, independent organization, state, county, or company, as examples);

This separation of functions provides privacy, data security, and reduces possibilities of data leakage or sharing between the entities operating the services;

All four services are stateless, and do not retain data or a token used to access user data;

Only the OS can be accessed from systems outside of the Interchange. Only the OS can access the TS. Only the ES can call the OS. Only the OS and SS can call the ES. Only the ES can call the SS;

All database indexes are hashed values of the index identifier for the record. Each index type has its own hash salt[1]. Only the OS and TS have the salts for the Providers, Applications (Apps), Resellers, Contacts, and Hints tables, as each creates storage access tokens. Only the TS has the salts for the remaining records. This prevents the SS from being able to correlate any database records with any other data; and Two of the four "services" must cooperate/interact to access user data. This provides an increased level of protection against improper access or use of data. The Table below provides a summary of some aspects of the cooperating access feature or requirement:

[1]Salting is the process of adding a unique value to the end of a password before hashing takes place. Salting the hash is crucial because it ensures that the encryption process results in a different hash value, even when two passwords are the same.

Cooperating Operators Access Scenarios (and What is Needed for Access):

| | Orchestration Service | Token Service | Encryption Service | Storage Service |
|---|---|---|---|---|
| Orchestration Service | — | (A) or (B) | No Access | No Access |
| Token Service | | — | (B) | No Access |
| Encryption Service | | | | (C) |
| Storage Service | | | | — |

Note the following features or characteristics of this requirement:

(A) Access to a specific user requires a contact identifier verified at Interchange—the hint record—from which the preferred provider is learned and then the "sub" identifier for that user at that provider must be known or obtained from the preferred provider;

(B) Access to a specific user requires a "sub" claim and the "iss" claim (the login provider's unique identifier) from any login provider linked to the user account. This requires knowing which providers, and then obtaining the identifiers from the providers; and (C) Access is provided to all records, records have no index, and as a result, there is no granularity in terms of the access provided;

If needed, an authorized law enforcement entity may be provided access using the Orchestration Service cooperating with the Token Service. This will typically require a contact identifier and "sub" from a preferred login provider, or a "sub" from a login provider for the user;

The interchange may alternately only return a binary response to a query of contact identifiers for the user, indicating they have an account, but not which provider is their preferred provider. In this case, there is no difference between (A) and (B).

The initial conditions of the Interchange are as follows:

a. There are no records in the SS;

b. The OS and TS trustees have configured their respective components to each have a list of the Provider and Reseller URIs that can use the Interchange.

On startup (or initialization) of the components:

a. the OS enumerates the list or Provider URIs and passes each URI to the TS;

b. The TS confirms the URI is on its Provider list, fetches the metadata for the URI, and creates a provider record and a createProvider storage access token, and returns both to the OS; and c. The OS fetches the metadata for the URI and confirms the contents of the record and storage access token. The OS then passes the createProvider and provider record to the ES, the encrypts the provider record and passes them to the SS for storage.

Figure 3:
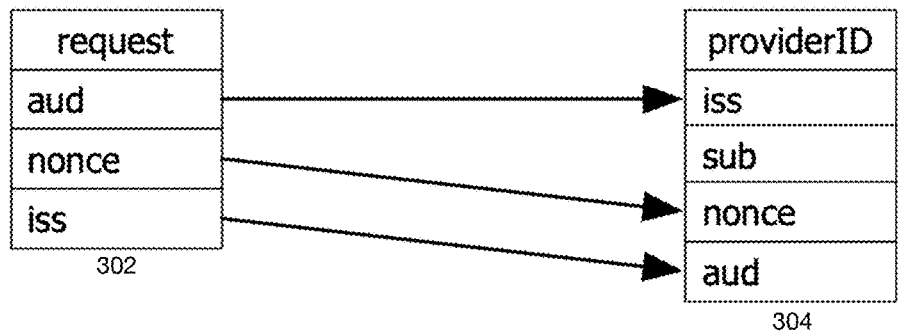
FIG. 3 is a diagram illustrating an example process or method for a mapping between an OpenID Connect request, and the resulting OpenID Connect ID Token as part of an implementation of an embodiment of the systems and methods disclosed herein.

FIG. 3 is a diagram illustrating an example process or method for a mapping between an OpenID Connect request, and the resulting OpenID Connect ID Token as part of an implementation of an embodiment of the systems and methods disclosed herein. FIG. 3 shows the tokens used in a typical OpenID Connect flow with a signed request 302. After authenticating the user, the provider creates an ID Token (providerID) 304 where provider.sub is the identifier the provider has for the user and may be specific to an application. The other key values in providerID are shown as assignments from the request token.

Figure 4:
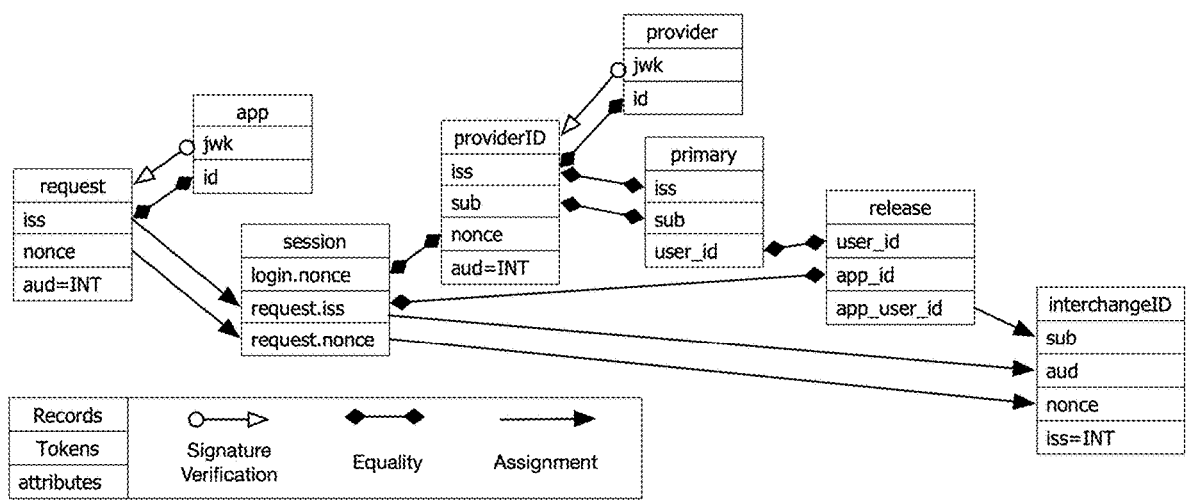
FIG. 4 is a flow diagram illustrating an example process or method for a login token assertion chain as part of an implementation of an embodiment of the systems and methods disclosed herein.

FIG. 4 is a flow diagram illustrating an example process or method for a login token assertion chain as part of an implementation of an embodiment of the systems and methods disclosed herein. FIG. 4 shows how the various tokens and records are chained together for the interchange to transform the providerID token into an interchangeID token.

Figure 5:
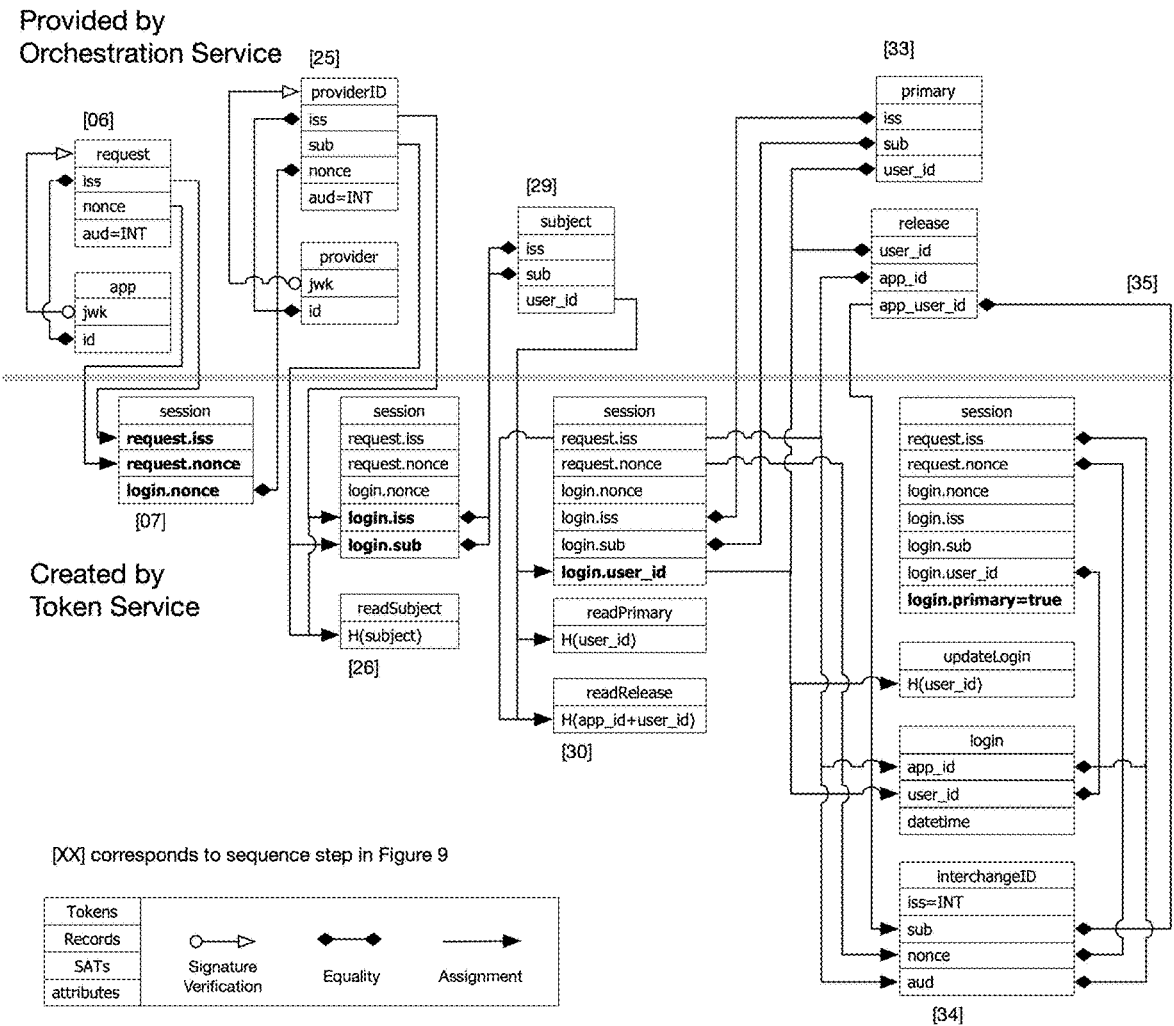
FIG. 5 is a flow diagram illustrating a more detailed view of an example process or method for the login token assertion chain as part of an implementation of an embodiment of the systems and methods disclosed herein.

Details on each token and record are stored in the Token and Record tables. FIG. 5 is a flow diagram illustrating a more detailed view of an example process or method for the login token assertion chain as part of an implementation of an embodiment of the systems and methods disclosed herein. FIG. 5 shows the details of how the session record is updated for each step of the transformation of a providerID token to an interchangeID token. Each step of the transformation is labeled with the corresponding sequence diagram in FIG. 9, which is a flow diagram illustrating an example process or method for a user login to an application using the Interchange as part of an implementation of an embodiment of the systems and methods disclosed herein.

Figure 8:
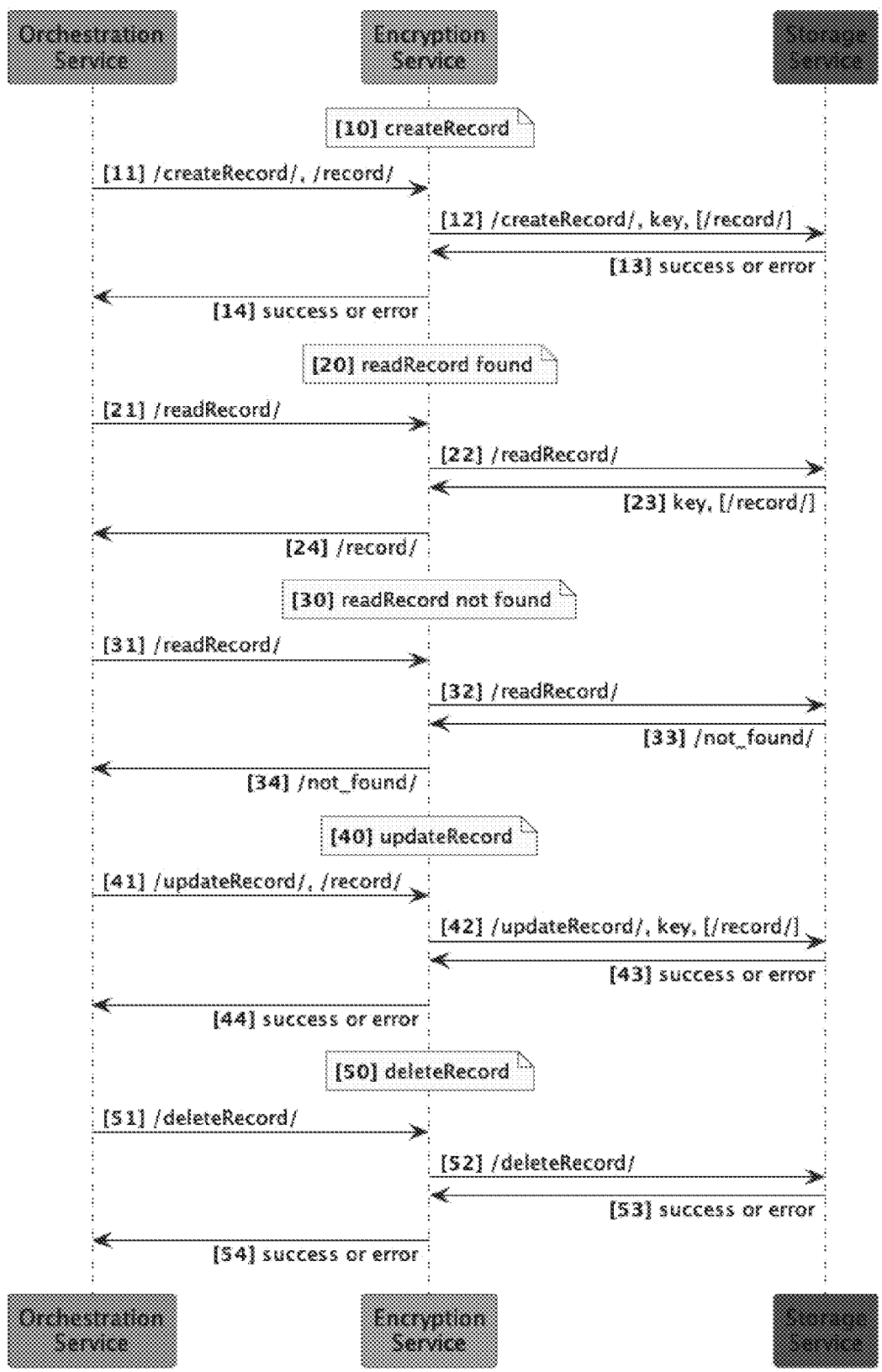
FIG. 8 is a flow diagram illustrating an example process or method for an encryption service to encrypt and decrypt records as part of an implementation of an embodiment of the systems and methods disclosed herein.

To create, read, update, or delete (CRUD) a record, the Orchestration Service (OS) calls the Encryption Service (ES), which then calls the Storage Service (SS). The Encryption Service operates to encrypt records going to the Storage Service and decrypt records coming from the Storage Service. The process flow for each CRUD (create, read, update, or delete) operation is shown in FIG. 8, which is a flow diagram illustrating an example process or method for an encryption service to encrypt and decrypt records as part of an implementation of an embodiment of the systems and methods disclosed herein. In some embodiments, the process flow is as follows for the indicated operation:

/token/:=a signed token
/record/:=a signed record
[/record/]:=a signed record that has been encrypted
key:=a record key encrypted by the master key

[10] Create a Record
[11] Orchestration Service sends a storage access token (/createRecord/) to create a record in a given table with a given index, and the record to the Encryption Service;
[12] The Encryption Service generates an encryption key for the record, encrypts the record, and the encrypts the record key with the master key. The Encryption Service sends the storage access token, the encrypted record (/record/), and the encrypted key to the Storage Service;
[13] The Storage Service checks the signature on the storage access token, and then stores the key and /record/ in the table and index per the storage access token. If a record already exists at the index, the operation fails and an error is returned, otherwise the Storage Service returns success; and
[14] The Encryption Service passes the result from the Storage Service to the Orchestration Service.

[20] Read a Record (and [30])
[21] Orchestration Service sends a storage access token (/readRecord/) to read a record in a given table with a given index to the Encryption Service;
[22] The Encryption Service sends the storage access token to the Storage Service;
[23] The Storage Service checks the signature on the storage access token, and then attempts to read the record from the table and at the index per the storage access token. If the record exists, the Storage Service returns the record and the key. If the record does not exist, the Storage Service creates a not_found record that contains the table and index that was not found and returns the not_found record to the Encryption Service as shown in [33];
[24] If the Encryption Service received a record and key, it decrypts the record key with the master key, and then decrypts the record and passes it back to the Orchestration Service. If the Encryption Service received a not_found record, it passes it back to the Orchestration Service as shown in [34].

[40] Update a record
[41] Orchestration Service sends a storage access token (/updateRecord/) to update a record in a given table with a given index to the Encryption Service;
[12] The Encryption Service generates an encryption key for the record, encrypts the record, and the encrypts the record key with the master key. The Encryption Service sends the storage access token, the encrypted record (/record/), and the encrypted key to the Storage Service, similar to [12];
[43] The Storage Service checks the signature on the storage access token, and then stores the key and /record/ in the table and index per the storage access token, but only if the record already exists. If a record does not exist at the index, the operation fails and an error is returned, otherwise the Storage Service returns success; and
[44] The Encryption Service passes the result from the Storage Service to the Orchestration Service.

[50] Delete a record
[51] Orchestration Service sends a storage access token (/deleteRecord/) to delete a record in a given table with a given index to the Encryption Service;
[52] The Encryption Service passes the storage access token to the Storage Service;
[53] The Storage Service checks the signature on the storage access token, and then deletes the record. If the record did not exist, an error is returned, otherwise the Storage Service returns success; and
[54] The Encryption Service passes the result from the Storage Service to the Orchestration Service.

Note that in Figures where the Encryption Service is followed by *, the above operations are omitted from the sequence diagrams (for example, in FIGS. 9-18 and 20).

Figure 18:
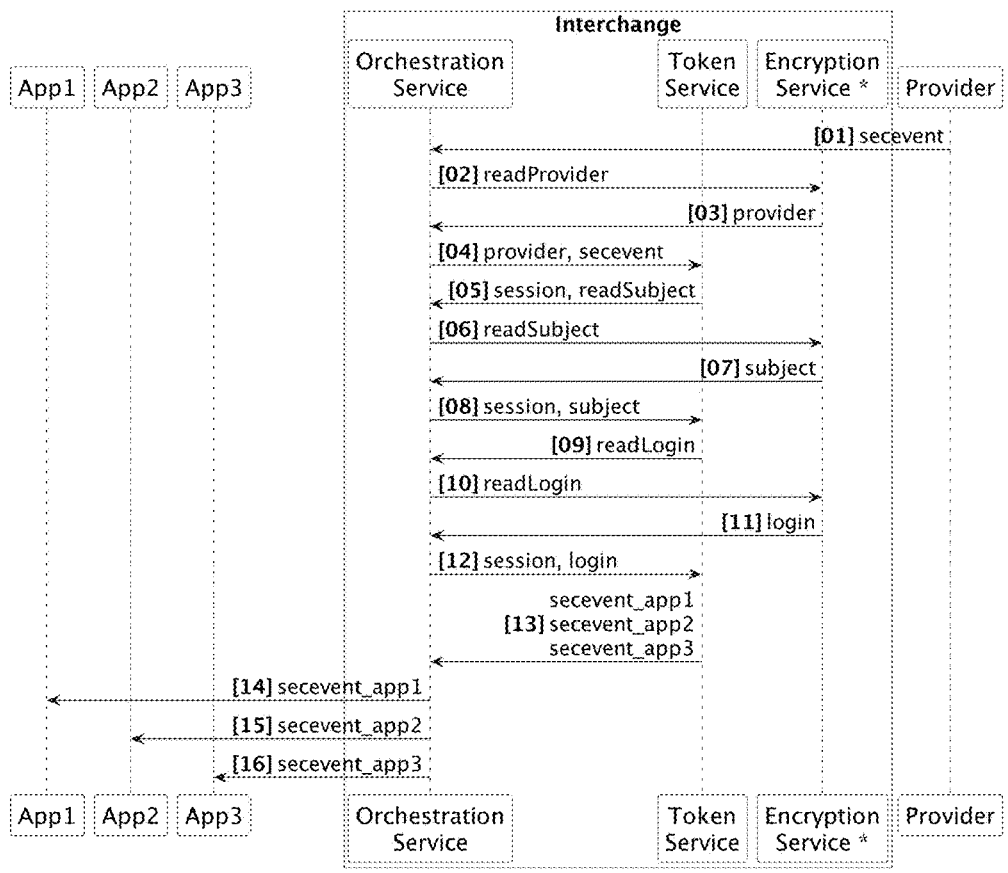
FIG. 18 is a flow diagram illustrating an example process or method for the Interchange to distribute a security event from a provider to all the applications that a user has used as part of an implementation of an embodiment of the systems and methods disclosed herein.

FIG. 18 is a flow diagram illustrating an example process or method for the Interchange to distribute a security event from a provider to all the applications that a user has used as part of an implementation of an embodiment of the systems and methods disclosed herein. Occasionally, a Provider may want to send a security event to all the user's other applications to alert them to an important security related event or a requested action. For example, a Provider may want to send an Account Credential Change Required event, in the form below:
https://schemas.openid.net/secevent/risc/event-type/account-credentialchangerequired; or
a Client may send an Account Disabled event:
https://schemas.openid.net/secevent/risc/event-type/account-disabled, if a user's account was disabled.

The Interchange will distribute these events to all applications that support receiving Security Events. FIG. 18 shows the process sequence or flow for a Provider sending a Security Event:

[01] The Provider sends the security event (secevent) to the Orchestration Service;
[02] The Orchestration Service requests the provider record for the issuer of the secevent;
[03] The Encryption Service retrieves the provider record from the Storage Service, decrypts it, and returns it to the Orchestration Service;
[04] The Orchestration Service verifies it received the correct provider record and verifies the secevent was signed by the provider using the jwk in the provider record. The Orchestration Service then passes the secevent token and provider record to the Token Service;

[05] The Token Service verifies the provider record, and then verifies the secevent token and that it was signed by the provider. The Token Service generates a session record containing the pertinent secevent and provider details, and then generates and returns a readSubject with the providers subject identifier, and the session record;

[06] The Orchestration Service verifies the session object contains the information from the secevent token and provider record, then requests the subject record;

[07] The Encryption Service returns the subject record;

[08] The Orchestration Service confirms the subject record matches the subject in the secevent, and passes the session and subject records to the Token Service;

[09] The Token Service verifies the session and subject records, and that the subject in the subject record matches the subject in the secevent. The Token Service then adds the user_id in the subject record to the session record, and generates a readLogin for the user_id, and passes them back to the Orchestration Service;

[10] The Orchestration Service verifies the user_id in the session is the same as the user_id in the subject record, and then passes the readLogin to the Encryption Service.

[11] The Encryption Service returns the login record;

[12] The Orchestration Service checks the user_id in the login record is the same as in the session, and then passes the login and session records to the Token Service;

[13] The Token Service generates a secevent for each app in the login record and passes them to the Orchestration Service; and

[14] The Orchestration Service sends the secevent to each application (App1, etc.).

Figure 9:
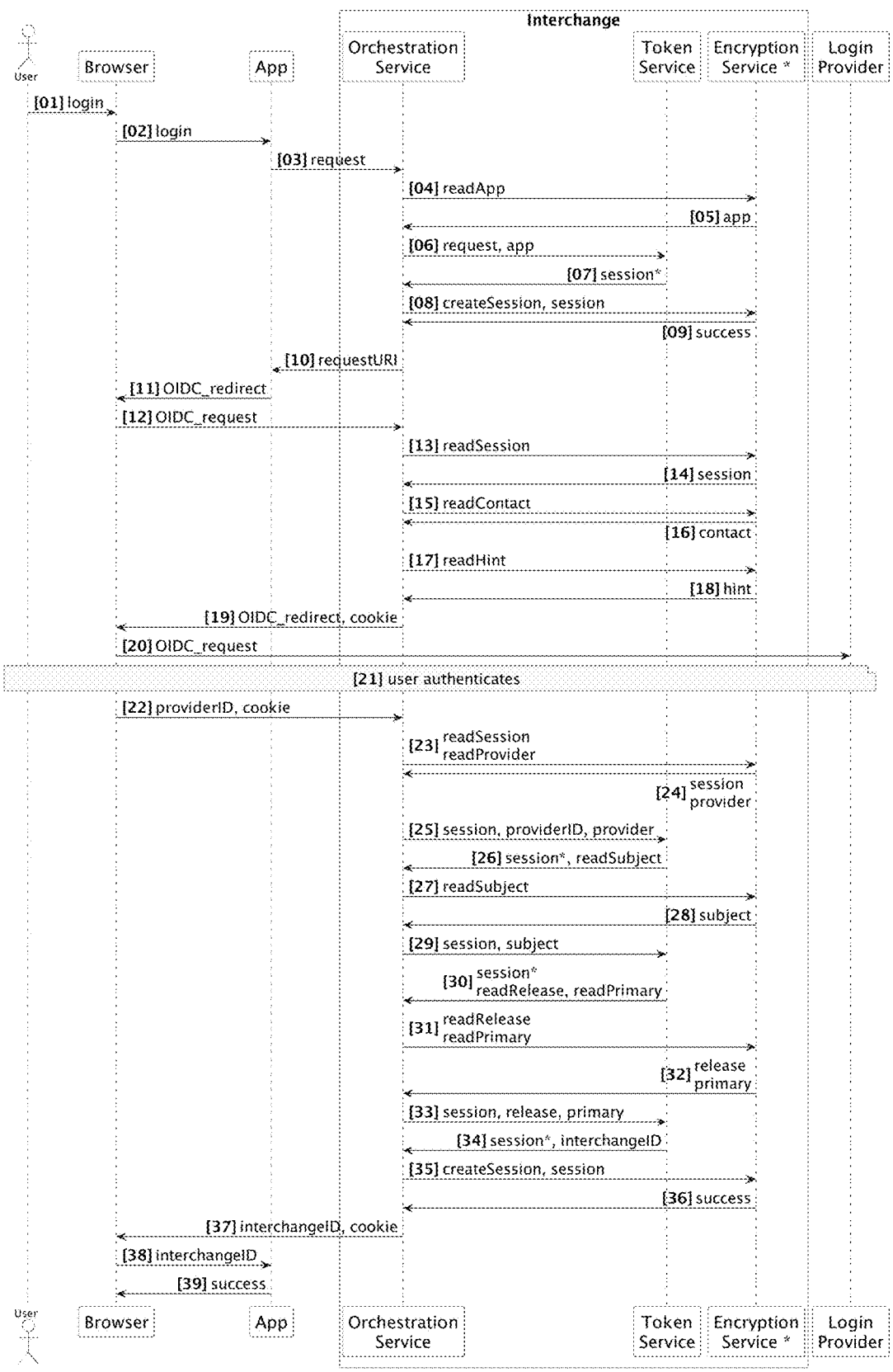
FIG. 9 is a flow diagram illustrating an example process or method for a user login to an application using the Interchange as part of an implementation of an embodiment of the systems and methods disclosed herein.

FIG. 9 is a flow diagram illustrating an example process or method for a user login to an application using the Interchange as part of an implementation of an embodiment of the systems and methods disclosed herein. As shown in the figure, the process sequence or flow may be represented by:

[01] The User interacts with the Browser to login to the application with the Interchange;

[02] The App makes a login request to the Orchestration Service;

[03] The Orchestration Service creates a readApp using the request.iss app identifier and requests the application record;

[04] The Encryption Service returns the application record;

[05] The Orchestration Service verifies the request was made by the App using the jwk in the application record (further details regarding this step or stage are shown in [06] in FIG. 5);

[06] The Orchestration Service then passes the request and the application record to the Token Service;

[07] The Token Service verifies the application record, and that the request was signed by the application. The Token Service creates a session, generates a nonce and adds it to session.login.nonce, and adds in the application and request information, and returns the session record with a matching createSession and readSession (further details regarding this step or stage are shown in [07] in FIG. 5);

[08] The Orchestration Service confirms the information in the session record matches the application and request information, and sends the createSession with the session to the Encryption Service;

[09] The Encryption Service returns success;

[10] The Orchestration Service creates a requestURI it sends to the application that contains the readSession;

[11] The application initiates an OIDC flow with the requestURI in a redirect to the Browser;

[12] The Browser passes the OIDC request to the Orchestration Service;

[13] The Orchestration Service extracts the readSession from the OIDC request and passes it to the Encryption Service;

[14] The Encryption Service returns the session;

[15] The Orchestration Service creates a readContact using the contact from the session record, from a cookie, or from the user;

[16] The Encryption Service returns the contact record;

[17] The Orchestration Service creates a readHint and sends it to the Encryption Service;

[18] The Encryption Service returns the hint record;

[19] The Orchestration Service creates an OIDC request, that includes session.login.nonce, for the user's primary issuer that was in the hint record, and sends it and the readSession as a cookie to the Browser;

[20] The Browser does a redirect and sends the OIDC request to the Login Provider;

[21] The User authenticates with the Login Provider in any appropriate manner and the Login Provider sends the Login Providers ID Token (providerID) in a redirect to the Browser;

[22] The Browser sends the providerID and the cookie to the Orchestration Service;

[23] The Orchestration Service creates a readProvider for the issuer in the ID Token, and sends it and the readSession from the cookie to the Encryption Service;

[24] The Encryption Service returns the provider and session records;

[25] The Orchestration Service verifies the providerID was from the provider, the providerID contains the session.login.nonce as the nonce, and sends the session, provider, and providerID to the Token Server (further details regarding this step or stage are shown in [25] in FIG. 5);

[26] The Token Server verifies the session and provider records as well as the providerID. The Token Server verifies session.login.nonce is the nonce in providerID. The Token Server adds the iss and sub from providerID to session.login, generates a readSubject with the subject made from the iss and sub, and passes the session and readSubject back to the Orchestration Service (further details regarding this step or stage are shown in [30] in FIG. 5);

[27] The Orchestration Service verifies none of the session attributes have changed since the previous session record, that the session.login.iss and sub match the subject, and then passes the readSubject to the Encryption Service;

[28] The Encryption Service returns the subject;

[29] The Orchestration Service verifies the sub and iss in the subject record match the sub and iss in session.login. The Orchestration Service then passes the subject and session to the Token Service (further details regarding this step or stage are shown in [29] in FIG. 5);

[30] The Token Service verifies the session and subject records and confirms the subject iss and sub match session.login. The Token Service adds the user_id from the subject record to session.login, creates a readPrimary and readRelease with the user_id, and passes the session, readPrimary, and readRelease back to the Orchestration Service (further details regarding this step or stage are shown in [30] in FIG. 5);

[31] The Orchestration Service verifies none of the session attributes have changed since the previous session record, and that the user_id in session.login matches the user_id in the subject record. The Orchestration Service then passes the readPrimary and readRelease to the Encryption Service;

[32] The Encryption Service returns the primary and release records;

[33] The Orchestration Service verifies the primary iss and sub are the same as the session.login iss and sub, the user_id in the primary and release is the same as session.request.iss, and then passes the session, primary, and release to the Token Service (further details regarding this step or stage are shown in [33] in FIG. 5);

[34] The Token Service verifies the session, primary, and release records are valid, then checks that the primary iss and sub are the same as the session.login iss and sub, the user_id in the primary and release is the same as session.request.iss, and then creates an updateLogin with the user_id, and a login record with the app_id, user_id and current time, and an interchangeID with the iss being the interchange, sub being the app_user_id from the release record, and the nonce and aud being the nonce and iss from session.request respectively. The Token Service sets session.primary to true and returns the session, createSession, readSession, updateLogin, login, and interchangeID to the Orchestration Service (further details regarding this step or stage are shown in [34] in FIG. 5);

[35] The Orchestration Service verifies none of the session attributes have changed since the previous session record, that the user_id in session.login matches the user_id in the login record, the session.request.iss matches the app_id in the login record and the aud in the interchangeID, the session.request.nonce matches the nonce in the interchangeID, the app_user_id in the release matches the sub in the interchangeID (further details regarding this step or stage are shown in [35] in FIG. 5). The Orchestration Service then passes the updateLogin and login record to the encryption service;

[36] The Encryption Service returns success;

[37] The Orchestration Service passes the interchangeID to the Browser and sets the readSession cookie;

[38] The Browser redirects the interchangeID to the application; and

[39] The application verifies the interchangeID and presents success to the Browser.

Applications (apps) or services must be authenticated with the Interchange to request information about users. This performs several functions, including so that the Interchange can inform the user which application is making the request, to ensure the security of the system, and to debit the account of the application for any Interchange fees. To enable the Orchestration Service and the Token Service to verify/authenticate the application making a request, the application may sign the request using a private key. The application does not authenticate with a shared secret, as there is no mechanism for the Orchestration Service and the Token Service to independently verify the identity of the application that made the request.

Popular mobile platforms, such as iOS and Android, often have mechanisms for an application to obtain an attestation from a mobile platform asserting the identity of the application. A mobile developer uses the attestation to verify it is their application calling their backend servers.

Figure 10:
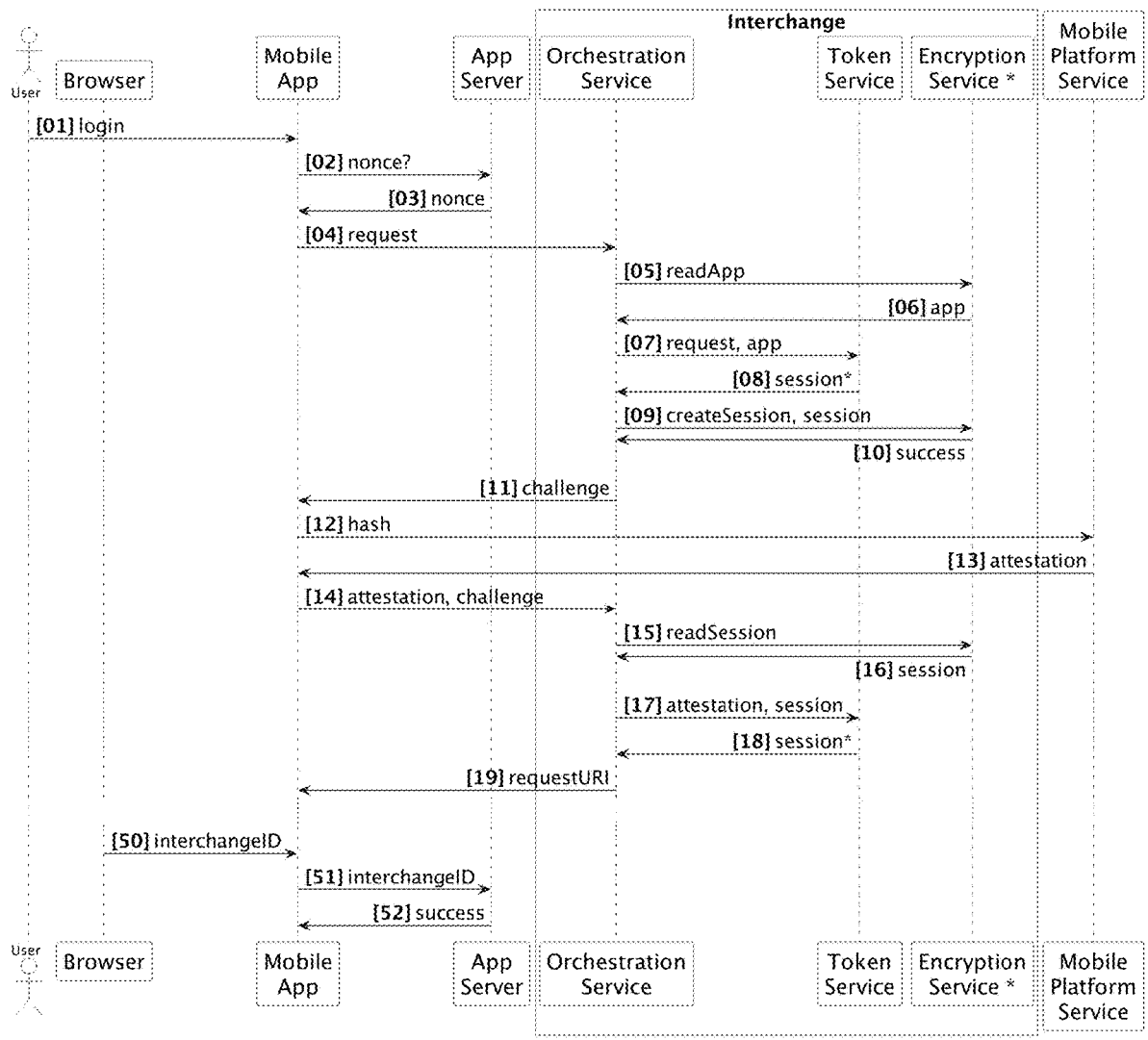
FIG. 10 is a flow diagram illustrating an example process or method for a mobile application to establish the application identity to the Interchange as part of an implementation of an embodiment of the systems and methods disclosed herein.

The Interchange platform also needs to know the identity of an application, and a mobile application identifier can be included in the ID Token issued by the Interchange so that the developer does not need to implement the attestation process when using the Interchange. FIG. 10 is a flow diagram illustrating an example process or method for a mobile application to establish the application identity to the Interchange as part of an implementation of an embodiment of the systems and methods disclosed herein. In some embodiments, the sequence of interactions (as illustrated in FIG. 10) may be as follows:

[01] The user indicates they want to login to the application;

[02] The mobile application calls the application server to obtain a nonce;

[03] The application server returns a nonce;

[04] The mobile application makes a request that includes the nonce to the Interchange at the Orchestration service (OS);

[05] The OS reads the application record;

[06] The Encryption Service (ES) returns the application record;

[07] The OS passes the request and the application record to the Token Service (TS);

[08] The TS verifies the application record and creates a session including the application information and the request, and a challenge nonce, and returns the session and a readSession and createSession;

[09] The OS verifies the information in the session, and stores the session;

[10] The ES returns success;

[11] The OS adds the readSession to the challenge nonce, and passes that back to the mobile application as a challenge;

[12] The mobile application creates a hash of the challenge and sends it to the mobile platform service API (corresponding to the mobile application server);

[13] The mobile platform service verifies the identity of the mobile application and returns an attestation that includes the mobile application identity and the challenge hash;

[14] The mobile application passes the attestation and the challenge to the OS;

[15] The OS retrieves the session using the readSession in the challenge;

[16] The ES returns the session;

[17] The OS verifies (1) the attestation, (2) that the mobile application identifier matches the session application information, and (3) the challenge hash matches the challenge, and passes the session and attestation to the TS;

[18] The TS verifies (1) the session and attestation, (2) confirms the attestation mobile application identifier matches the session application identifier, and (3) the challenge hash matches the challenge, and then updates the session to indicate the application identity has been verified, and returns the session and corresponding readSession and createSession;

[19] The OS then returns a requestURI (similarly to step or stage [10] of FIG. 9), and the login process continues as illustrated in FIG. 9;

[50] The Browser sends the interchangeID to the mobile application through a redirect similar to that illustrated at step or stage [38] of FIG. 9. The nonce in the interchangeID is the nonce the mobile application retrieved from the mobile application server (in step or stage [03] above). The "aud" in the interchangeID is the mobile application identifier at the Interchange;

[51] The mobile application sends the interchangeID to the application server; and

[52] The application server verifies it received the nonce it provided earlier and that the application identifier matches the identifier it received earlier and returns success.

As another example of the benefits of using the Interchange, the platform can provide security and greater convenience for a user when they desire to set up a new device. The FIDO2 (also known as WebAuthN) protocol is a phishing resistant authentication mechanism using hardware keys on a device. A challenge with FIDO authentication is that each application needs to enroll and manage each device the user wants to use with the application. This means that if a user gets a new device, such as a new phone, they need to enroll that device everywhere they use FIDO. To enroll a new device, the user needs to authenticate to each application in a potentially less secure way.

In contrast, enrolling a WebAuthN device with the Interchange allows a user and application developer to obtain the advantages of phishing resistant device authentication, without the user and application having to manage each of the devices. WebAuthN also provides a more seamless experience for the user, as the user only authenticates to the device rather than to their preferred provider. This process is shown in FIG. 26, which is a diagram illustrating an example process or method for a user to sign up to use an application by discovering if the user has an account at the Interchange, as viewed on a set of mobile phone screen displays, as part of an implementation of an embodiment of the systems and methods disclosed herein.

Figure 11:
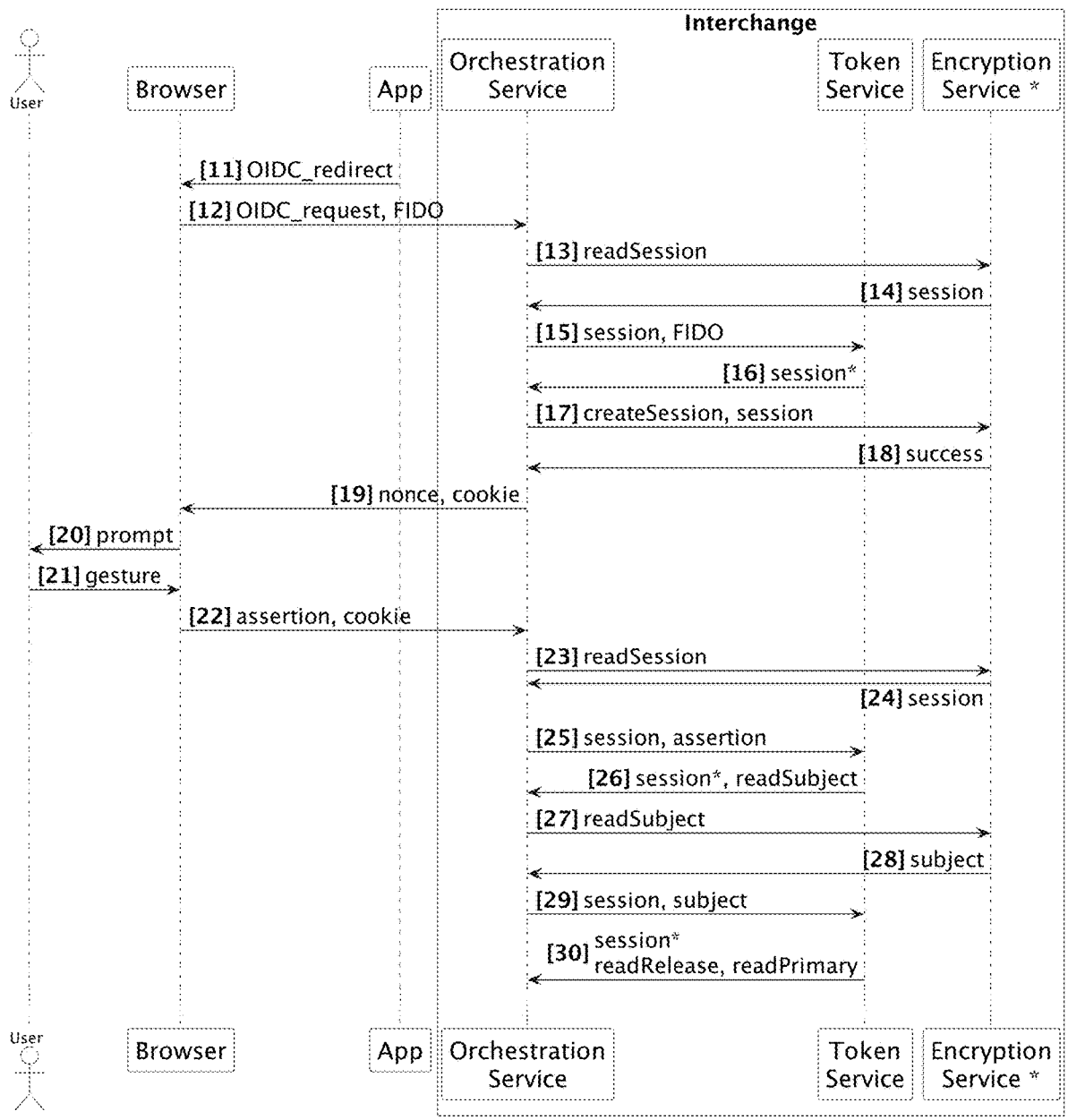
FIG. 11 is a flow diagram illustrating an example process or method for a user to use a device authentication method to login to the Interchange.

An example of the corresponding sequence diagram for using WebAuthN is shown in FIG. 11, which is a flow diagram illustrating an example process or method for a user to use a device authentication method to login to the Interchange. A description of each step or stage in a WebAuthN authentication flow (as illustrated in FIG. 11) is as follows, where the below description begins at step or stage [11], as steps [1]-[10] are the same as those shown in FIG. 9.

[11] The browser receives the OIDC (Open ID Connect) request to login to the Interchange;

[12] JavaScript in the browser detects the browser supports WebAuthN and that it has been used on the device before, and sends the OIDC request and that it wants to use FIDO to the OS;

[13] The OS pulls the readSession for the OIDC request and fetches the session;

[14] The ES returns the session;

[15] The OS passes the session and the FIDO request to the TS;

[16] The TS verifies the session and creates a nonce for WebAuthN and returns the session and a matching createSession and readSession;

[17] The OS stores the session;

[18] The ES returns success;

[19] The OS sets the cookie to readSession and returns the nonce;

[20] The JavaScript in the browser calls the WebAuthN API with the nonce;

[21] The user is prompted by the device to provide a gesture or authenticate with a fingerprint or face scan;

[22] The JavaScript passes the assertion from the WebAuthN API, and then sends the assertion and cookie to the OS;

[23] The OS fetches the session;

[24] The ES returns the session;

[25] The OS verifies the assertion from the browser contains the nonce and is a valid assertion, and then passes the assertion and session to the TS;

[26] The TS verifies the session, assertion, and that the nonce is in the assertion, and creates a readSubject using the user identifier in the assertion. The TS updates the session to include information from the assertion and passes the session and readSubject back to the OS;

[27] The OS confirms the new session contains the same information as the last session, and that the assertion information in the session is correct. It then passes readSubject to the ES;

[28] The ES returns the subject;

[29] The OS confirms the subject identifier in the subject record matches the user identifier in the assertion, and passes the subject and session to the TS;

[30] The TS verifies the session and subject records, confirms the subject identifiers match between the session and subject records, adds the user_id to the session record, creates a readPrimary and readRelease with the userID, and returns the session and readPrimary to the OS. The flow or sequence then continues as from step or stage [31] in FIG. 9.

In some cases, an application developer may prefer that a reseller manage the marketing and distribution of their application. The Interchange can accommodate this business model, as based on authorization from a developer, an application may be managed by a reseller. This also allows the Interchange to be neutral regarding what applications use the Interchange.

Figure 12:
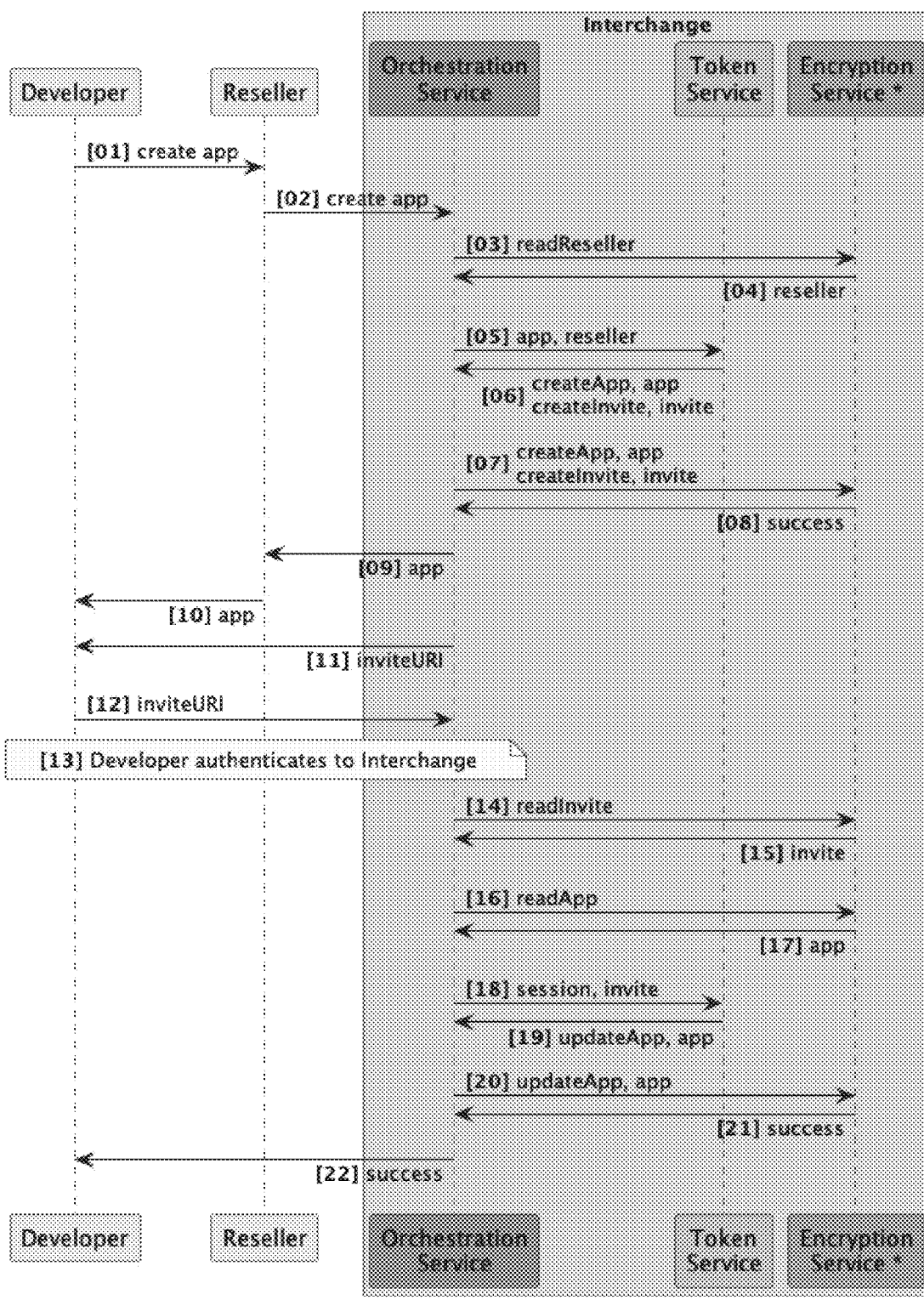
FIG. 12 is a flow diagram illustrating an example process or method for a reseller to create an application in the Interchange as part of an implementation of an embodiment of the systems and methods disclosed herein.

FIG. 12 is a flow diagram illustrating an example process or method for a reseller to create an application in the Interchange as part of an implementation of an embodiment of the systems and methods disclosed herein. The result is an application record that is bound to a developer, who is a user at the Interchange. As shown in the figure, the process flow may include the following steps or stages:

[01] The developer provides the necessary information to the reseller to create an application record;

[02] The reseller calls the OS API to pass a create an application (create app) request containing the application record;

[03] The OS creates a readReseller and passes it to the ES;

[04] The ES returns the reseller record;

[05] The OS verifies the request was sent by the reseller, and passes the request and the reseller record to the TS;

[06] The TS verifies the create app request and reseller record, creates an application record and createApp, creates an invite record with the application identifier and developer email, and a createInvite, and passes them back to the OS;

[07] The OS verifies the application record and invite have the correct information from the application request, and then passes the createApp, app, createInvite, and invite to the ES;

[08] The ES returns success;

[09] The TS returns the application record to the reseller;

[10] The Reseller shows the developer the application record, which includes the application identifier;

[11] The TS creates an inviteURI using the readInvite and emails the inviteURI to the developer's email address;
[12] The developer clicks on the inviteURI;
[13] The developer authenticates to the Interchange, creating an account if needed, and completing email verification if needed;
[14] The OS sends the readInvite to the ES;
[15] The ES returns the invite;
[16] The OS creates a readApp with the application identifier in the invite and sends it to the ES;
[17] The ES returns the application record;
[18] The OS sends the session from the developer authenticating in step or stage [13] and the application and invite records to the TS after confirming the developer has the email associated with the invite, and the application identifier in the invite matches the application record;
[19] The TS verifies the session, application, and invite, confirms the developer has the email in the invite, and that the invite application identifier matches the application record, creates an updateApp and updates the application record with the user_id of the developer, and notes that the application has been claimed by the developer. The ES then returns the updateApp and application record to the OS;
[20] The OS sends updateApp and application record to the ES;
[21] The ES returns success;
[22] The OS returns success to the developer.

For a reseller to update an application, or to transfer an application to itself, the reseller needs an access token from the Interchange that represents the developer authorizing the reseller to take the action they request. This prevents the reseller from modifying an application without the developer's consent. Further, a developer can delegate application management or updating to one or more other developers, so that the application is not dependent on a single developer. The original developer can define a policy so that multiple delegates are required to approve critical changes to the application, using conventional mechanisms.

Figure 13:
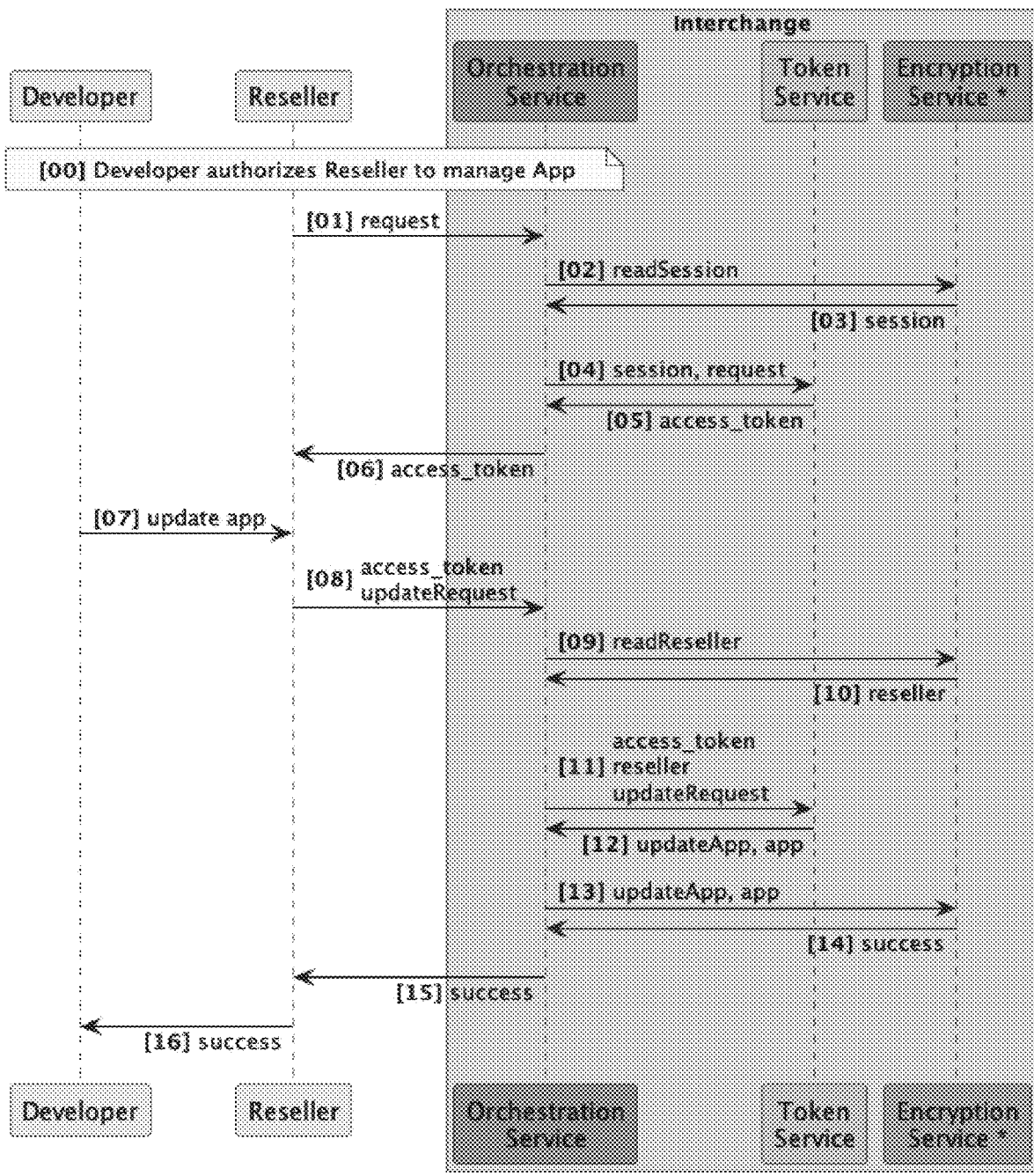
FIG. 13 is a flow diagram illustrating an example process or method for a developer to update an application previously created in the Interchange as part of an implementation of an embodiment of the systems and methods disclosed herein.
Figure 14:
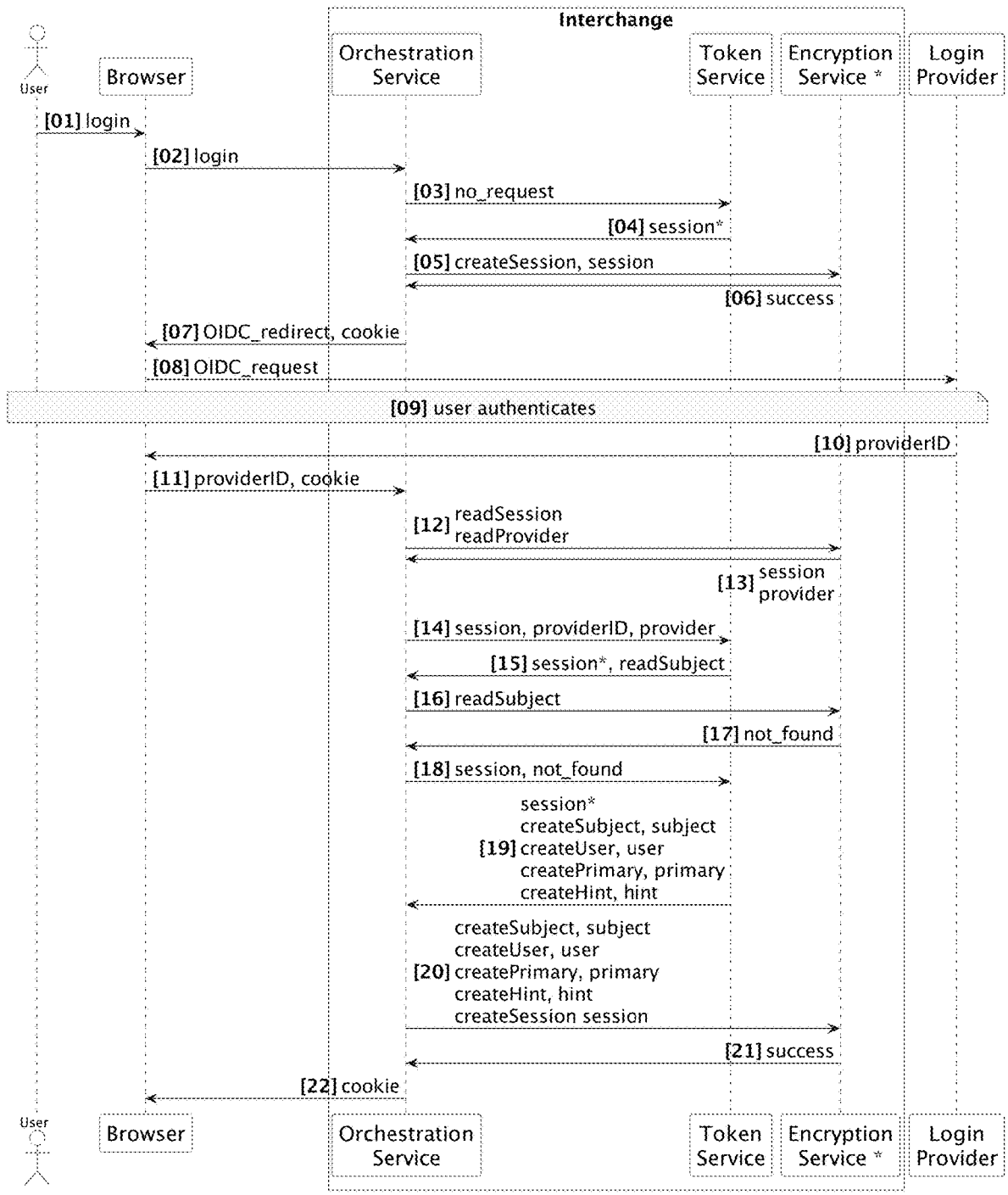
FIG. 14 is a flow diagram illustrating an example processor method for a user to sign up for an account with the Interchange as part of an implementation of an embodiment of the systems and methods disclosed herein.

FIG. 13 is a flow diagram illustrating an example process or method for a developer to update an application previously created in the Interchange as part of an implementation of an embodiment of the systems and methods disclosed herein. As shown in the figure, the sequence of steps or stages for updating an application may include:

[00] The developer authorizes the reseller to perform certain actions on the application using a standard authorization protocol, such as OAuth 2.0. This is captured in a session with the Reseller information;
[01] The Reseller passes the request to the OS;
[02] OS pulls the readSession from the request and passes it to the ES;
[03] The ES returns the session;
[04] The OS confirms the information in the session and the request match and passes both to the TS;
[05] The TS verifies the session and request and creates an access token and returns it to the OS;
[06] The OS returns the access token to the Reseller;
[07] The developer indicates to the Reseller how the application should be updated;
[08] The Reseller sends the updateRequest to the OS;
[09] The OS verifies the access token, and creates a readReseller and sends it to the ES;
[10] The ES returns the reseller;
[11] The OS confirms the updateRequest is from the reseller, and passes the updateRequest, reseller, and access token to the TS;
[12] The TS verifies the reseller, access token, and updateRequest. TS verifies the access token grants the Reseller access to the modifications in the updateRequest to the application, and then creates an updateApp and application record and passes them to the OS;
[13] The OS verifies the application record matches the updateRequest, and then passes them to the ES;
[14] The ES returns success;
[15] The OS returns success;
[16] The Reseller returns success;

Signing up to the Interchange creates a user record from the ID Token provided from the user's preferred login provider (presuming the ID Token sub[2] has not previously been used at the Interchange). When the user is signing up for an account, or updating their profile, there is no request from an application. FIG. 14 is a flow diagram illustrating an example process or method for a user to sign up for an account with the Interchange as part of an implementation of an embodiment of the systems and methods disclosed herein. As shown in the figure, the sequence of steps or stages may include:

[2] ID Token is defined in the OpenID Connect 1.0 Core—https://openid.net/specs/openid-connect-core-1_0.html#IDToken.

[01] The user navigates to the Interchange and selects their preferred provider;
[02] The browser sends the provider identifier to the OS;
[03] The OS calls the TS to create a session with no request;
[04] The TS creates a session indicating there is no request and including a nonce, and passes it back with a createSession and readSession;
[05] The OS confirms the information in the session and sends the createSession and session to the ES;
[06] The ES returns success;
[07] The OS puts the readSession in a cookie, and creates an OIDC redirect request containing the nonce from the session, and sends the cookie and OIDC_redirect to the browser;
[08] The Browser sends the OIDC request to the login provider;
[09] The user authenticates at the login provider;
[10] The login provider sends its ID Token, providerID, that contains the nonce to the Browser;
[11] The Browser sends the cookie and providerID to the OS;
[12] The OS creates and sends readSession and readProvider to the ES;
[13] The ES returns the session and provider;
[14] The OS verifies the providerID token, and that it has the nonce from the session, and then sends the session, provider, and providerID to the TS;
[15] The TS verifies the session, provider, and providerID. The TS confirms the session nonce is the same as the providerID nonce. The TS updates the session with the iss and sub from the providerID, creates a readSubject with the iss and sub, and returns the session and readSubject;
[16] The OS confirms the earlier session information has not been changed, and the session has the iss and sub from the providerID, and sends the readSubject to the ES;
[17] The ES returns a not_found record from the storge service (SS) as the subject does not exist;

[18] The OS sends the not_found and session records to the TS;
[19] The TS verifies the session and not_found records, and that the index in the not_found record matches the session iss and sub, generates a new user_id and adds it to the session, and then creates the records needed for a new user: these may include subject, createSubject, user, createUser, primary, createPrimary, hint, and createHint, and then passes them all back to the OS along with a createSession and readSession;
[20] The OS verifies that earlier session attributes have not been modified, and the user_id is the same in the session, subject, user, and primary records, that the subject and primary have the iss and sub from the session, and the hint has the iss. It then sends them all to the ES;
[21] The ES sends success;
[22] The OS sends the readSession back to the Browser as a cookie.

The Interchange supports and encourages users to add at least two backup login providers so that they can recover their Interchange account if they are unable to use their primary login provider, either because they have been locked out, or because the login provider revoked their account. To recover their Interchange account, a user will then login with two of their login providers, and select one of them to be their new, primary (preferred) provider.

Figure 15:
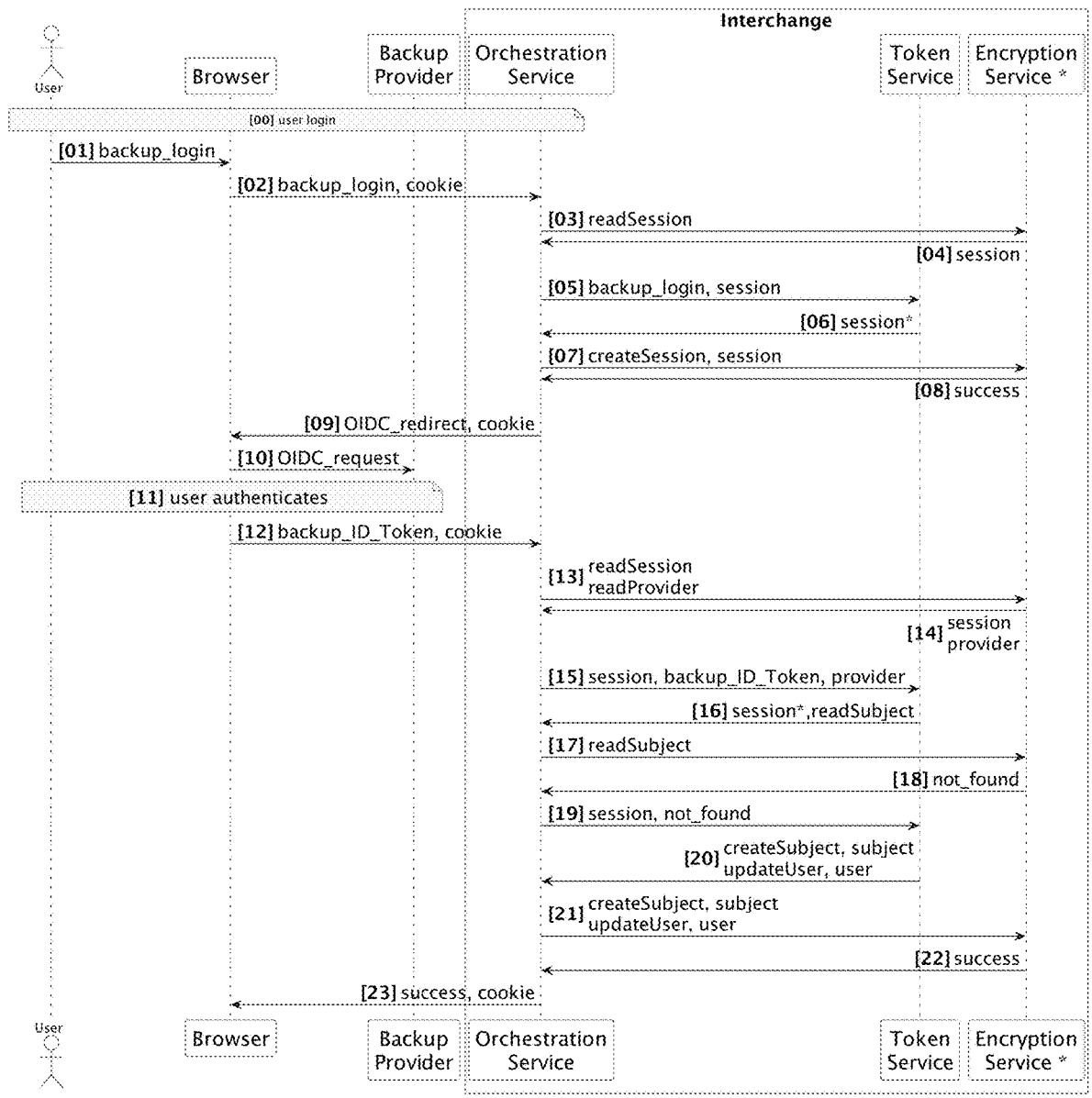
FIG. 15 is a flow diagram illustrating an example process or method for a user to add a backup sign-in service provider at the Interchange as part of an implementation of an embodiment of the systems and methods disclosed herein.

FIG. 15 is a flow diagram illustrating an example processor method for a user to add a backup sign-in service provider at the Interchange as part of an implementation of an embodiment of the systems and methods disclosed herein. As is apparent from FIG. 15, adding a backup provider is building on the earlier sequences of authenticating at the Interchange, which is captured in the session record, and then authenticating at another login provider which allows the Interchange to link the Interchange to add another subject record for that user, and the sub and iss to the user record. As shown in the figure, the sequence of steps or stages may include:

[00] The user starts off logged into the interchange;
[01] The user selects a backup sign-in service provider;
[02] The browser sends the provider identifier and session cookie to the OS;
[03] The OS calls the ES to read the session;
[04] The ES returns the session;
[05] The OS calls the TS to add a backup login provider;
[06] The TS creates a new session indicating the backup login provider to be added and includes a new nonce, and passes it back with a createSession and readSession;
[07] The OS confirms the information in the session and sends the createSession and session to the ES;
[08] The ES returns success;
[09] The OS puts the readSession in a cookie, and creates an OIDC redirect request containing the nonce from the session, and sends the cookie and OIDC_redirect to the browser;
[10] The Browser sends the OIDC request to the login provider;
[11] The user authenticates at the backup login provider, and then the backup login provider sends its ID Token, backup_ID_Token, that contains the nonce to the Browser;
[12] The Browser sends the cookie and backup_ID Token to the OS;
[13] The OS creates and sends readSession and readProvider to the ES;
[14] The ES returns the session and provider;
[15] The OS verifies the backup_ID_Token token, and that it has the nonce from the session, and then sends the session, provider, and backup_ID_Token to the TS;
[16] The TS verifies the session, provider, and backup_ID Token. The TS confirms the session nonce is the same as the backup_ID_Token nonce. The TS updates the session with the iss and sub from the backup_ID Token, creates a readSubject with the iss and sub, and returns the session and readSubject;
[17] The OS confirms the earlier session information has not been changed, and the session has the iss and sub from the backup_ID_Token, and sends the readSubject to the ES;
[18] The ES returns a not_found record from the storge service (SS) as the subject does not exist;
[19] The OS sends the not_found and session records to the TS;
[20] The TS verifies the session and not_found records, and that the index in the not_found record matches the session iss and sub, generates a new user_id and adds it to the session, and then creates the records needed for a new user—these records may include subject, createSubject, user, createUser, primary, createPrimary, hint, and createHint, and then passes them back to the OS along with a createSession and readSession;
[21] The OS verifies that earlier session attributes have not been modified, and the user_id is the same in the session, subject, user, and primary records, that the subject and primary have the iss and sub from the session, and the hint has the iss. It then sends them to the ES;
[22] The ES sends success;
[23] The OS sends the readSession back to the Browser as a cookie.

It is desirable for a user that the provider of a claim does not know the identity of the application the claim is being presented to, and that the provider does not know the identifier the application uses for the user. This ensures a higher degree of security and minimizes the possibility of a successful collusion with the application. The Interchange enables the application to request a claim (with the Interchange knowing the identity of the provider and being able to independently verify the authenticity of the claim from the provider), without exposing the identity of the application or the application's identifier for the user.

Figure 16:
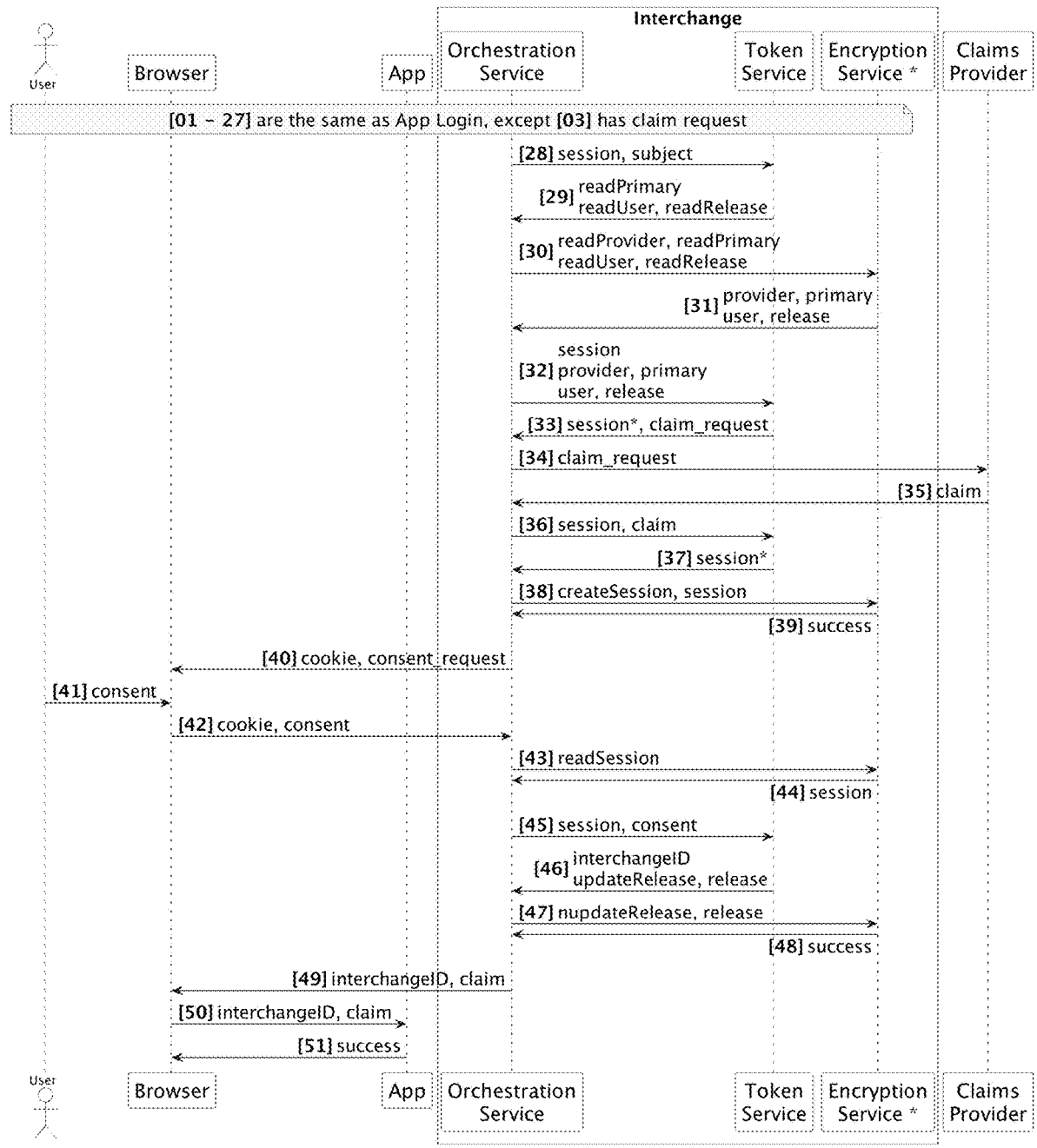
FIG. 16 is a flow diagram illustrating an example processor method for an application to request a claim, and a user to release a claim as part of an implementation of an embodiment of the systems and methods disclosed herein.
Figure 19:
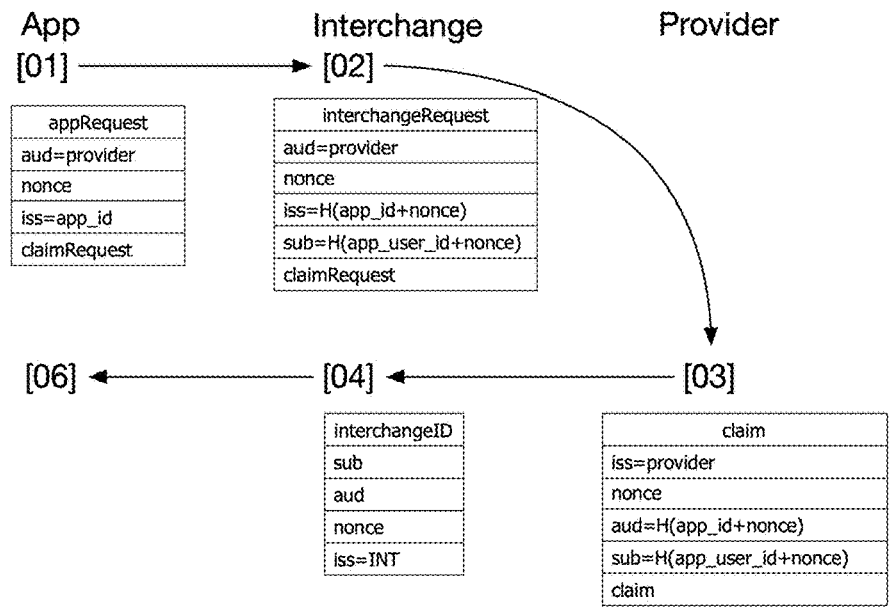
FIG. 19 is a flow diagram illustrating an example process or method for application and user identifiers to be masked from a provider when making a claim as part of an implementation of an embodiment of the systems and methods disclosed herein.

FIG. 16 is a flow diagram illustrating an example process or method for an application to request a claim, and a user to release a claim as part of an implementation of an embodiment of the systems and methods disclosed herein. FIG. 16 illustrates a process flow for an application to request, and then receive a claim meeting those conditions, where the process flow may include the following steps, stages, operations, or functions:

Steps [01-27] of FIG. 16 are the same as those for FIG. 9, with the difference that the request (at [03]) includes information about the claim being requested;
[28] The OS sends the verified session and subject records to the TS;
[29] The TS verifies the session and subject records, sees that the application is requesting a claim, and creates a readPrimary, readUser, and readRelease and passes them to the OS;
[30] The OS creates a readProvider, and passes it and the readPrimary, readUser, and readRelease to the ES;
[31] The ES passes back the provider, primary, user, release records;

[32] The OS verifies the provider, primary, user, and release records and passes them and the session to the TS;

[33] The TS verifies all records passed in, and that the user_id in the session matches the user_id in primary, user, and release records. The TS creates a claim_request suitable for the provider for the claim requested by the app and setting the iss and sub values per the process shown in FIG. 19, at step or stage [02], and updates the session with the claim_request information, and passes back to the OS the claim_request and session;

[34] The OS sends the claim_request to the provider;

[35] The provider creates a claim with the aud, iss per FIG. 19, step or stage [03], and returns it to the OS. The identity of the application and the application's identifier for the user are hidden from the provider;

[36] The OS verifies the claim from the provider and that the aud, iss, and nonce are the correct values. The OS then sends the session and claim to the TS;

[37] The TS verifies session and claim, and that the aud, iss, and nonce in the claim are the correct values. The TS then adds claim information to the session and returns the session, createSession, and readSession to the OS;

[38] The OS sends createSession and readSession to the ES;

[39] The ES returns success;

[40] The OS sends a consent request to the Browser for the user to understand the claim being shared;

[41] The user grants consent;

[42] The browser sends consent to the OS;

[43] The OS sends readSession to the ES;

[44] The ES returns the session;

[45] The OS sends the session and consent to the TS;

[46] The TS verifies the session, and creates an interchangeID ID token, an updateRelease, and a release, and returns them to the OS;

[47] The OS sends updateRelease and release to the ES;

[48] The ES sends success;

[49] The OS sends the interchangeID and the claim to the Browser in a redirect;

[50] The Browser sends the interchangeID and claim to the Application (App); and

[51] The Application verifies the interchangeID and claim, that the nonces match the nonce in the original request, and that the interchange hash(aud+nonce) and hash(sub+nonce) are the same as the claim aud and sub to confirm the claim is about the same user as the interchangeID.

Removing a backup provider requires signing in with a preferred provider, and then the backup provider, or one of the other backup providers. This prevents an attacker that has gained access to a user's preferred provider from removing a user's backup providers. When the user realizes their account has been taken over, they can login with two or more of the backup providers, and then change one of them to be their preferred provider. The attacker can no longer impersonate them, and they can then recover their preferred provider.

Verification of contact identifiers such as phone and email are desirable functions for applications. In some embodiments, the Interchange can verify the user's contact information, and then enable the user to share the verified claim in the future without needed to reverify it. In some cases, the Interchange may need to obtain signals, including reverification, to have confidence the user still controls the identifier. No user can have a verified identifier already verified with another user. If a new user can verify that it controls an identifier already verified, then the original user will be contacted on a suitable communication channel and prompted to confirm they still control the identifier. This addresses the situation where an attack occurs in which the user has temporarily lost control of their contact identifier. If the former user does not reverify the information after a period of time, then the contact will be moved to the new user. Applications can also subscribe to being notified if a contact identifier they have received has been recycled.

Figure 17:
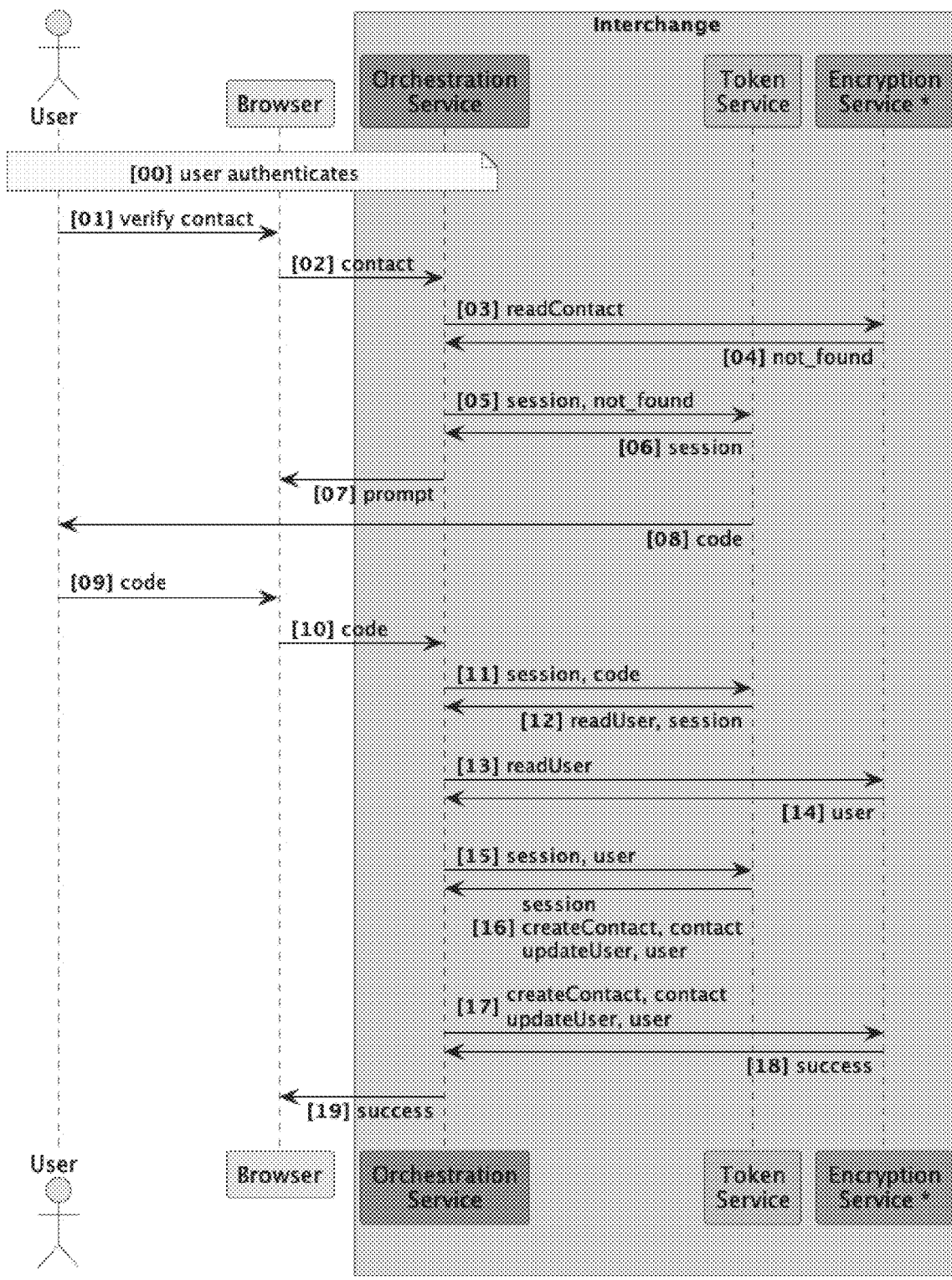
FIG. 17 is a flow diagram illustrating an example processor method for a user to verify a contact with the Interchange as part of an implementation of an embodiment of the systems and methods disclosed herein.

FIG. 17 is a flow diagram illustrating an example process or method for a user to verify a contact with the Interchange as part of an implementation of an embodiment of the systems and methods disclosed herein. In the process flow shown in FIG. 17, session record management has been deleted from the flow:

[00] The user has authenticated to the interchange;

[01] The user enters a contact identifier in the browser and asks to verify it;

[02] The browser sends the contact identifier to the OS;

[03] The OS creates a readContact and sends it to the ES to ensure the contact has not already been verified;

[04] The ES returns a not_found record from the Storage Service with the index to the OS;

[05] The OS verifies the not_found index matches the contact identifier, and sends the not_found and session records to the TS;

[06] The TS verifies the not_found and session records, generates a code, and stores a hash of the code, and the contact identifier in the session and returns it to the OS;

[07] The OS verifies the session record has all the correct values and sends a prompt for the code to the browser;

[08] The TS sends the code to the user via the contact communication method;

[09] The user enters the code into the prompt;

[10] The browser sends the code to the OS;

[11] The OS sends the code and the session to the TS;

[12] The TS verifies the session, verifies the code matches the hash in the session, updates the session with the new state, and returns a readUser;

[13] The OS verifies the session has the correct values, and sends the readUser to the ES;

[14] The ES returns the readUser;

[15] The OS sends the session and readUser to the TS;

[16] The TS verifies the session and readUser, updates the user record, creates a createContact, updateUser, and contact record, and returns them to the OS;

[17] The OS verifies the session, contact, and user records have the correct information, and sends the createContact, contact, updateUser, and user to the ES;

[18] The ES returns success; and

[19] The OS returns success to the Browser.

FIG. 19 is a flow diagram illustrating an example process or method for application and user identifiers to be masked from a provider when making a claim as part of an implementation of an embodiment of the systems and methods disclosed herein. FIG. 19 shows the different tokens generated in the sequence flow illustrated in FIG. 16. The order of the tokens is the order in which they are created:

[01] The Application (App) creates a request token;

[02] The Interchange creates a new request token from the app request token, changing the issto be a hash of the iss+nonce, and the sub to be a hash of the sub+nonce;

[03] After verifying the request from the Interchange along with any other tokens created as part of the request, the provider creates a claim with the aud being the iss of the Interchange request, and the sub being the same, and the nonce being the same; and

[04] The Interchange creates an ID Token for the user, which combined with the claim from the provider, the application can verify the claim is about the user with the identifier from the Interchange.

In some cases, the application does not need to know the identity of the provider that issued the claim about the user, and the user wants to minimize how much information is shared about them. This result may be achieved using token chaining. Using token chaining, the Interchange transforms the application request into a request from the Interchange and transforms the claim to the Interchange into a claim to the application with the user information being minimized.

Figure 29:
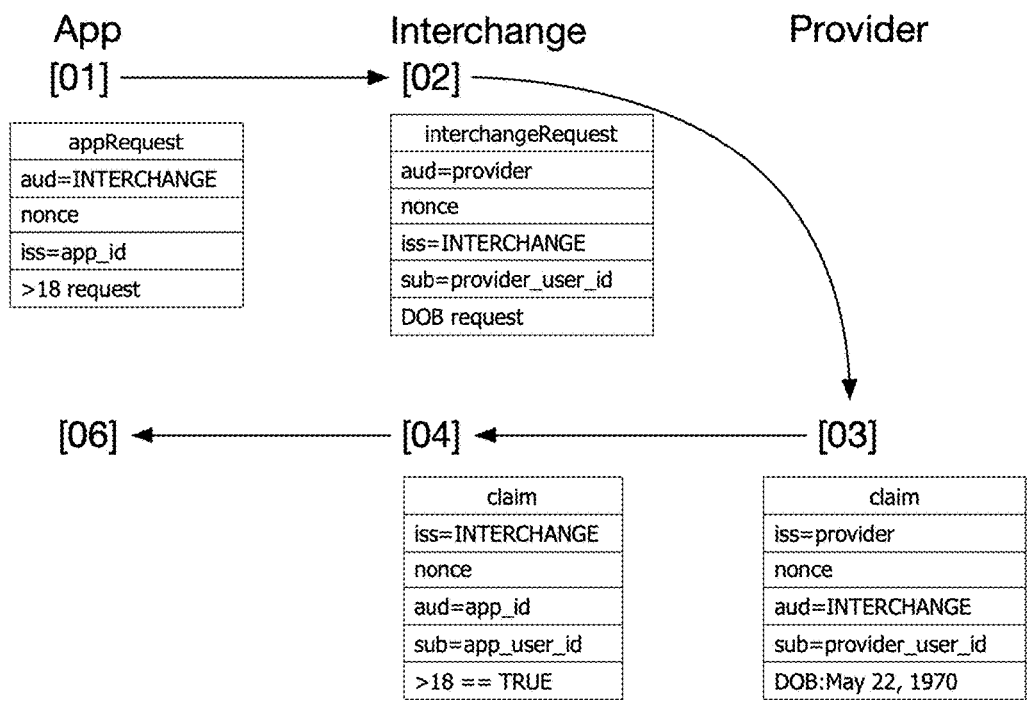
FIG. 29 is a diagram illustrating an example process or method for the Interchange to share the minimal information needed to be shared in a claim about a user, as part of an implementation of an embodiment of the systems and methods disclosed herein.

FIG. 29 is a diagram illustrating an example process or method for the Interchange to share the minimal information needed to be shared in a claim about a user, as part of an implementation of an embodiment of the systems and methods disclosed herein. In the embodiment illustrated in FIG. 29, the token chaining and transformation process flow is as follows:

[01] The Application (App) creates a request token;

[02] The Interchange creates a new request for the provider that has a claim about the user that can be transformed into the claim requested by the application. The new request has the Interchange as the issuer, the sub is the identifier the provider has for the user, and the request is for the broader claim (such as a date of birth) that the provider has;

[03] The provider generates a claim as usual; and

[04] The interchange creates a new claim with the aud and sub being for the Application and minimizes the claim per a defined minimization process (such as the user is over 18 years of age) that is verified by both the OS and TS.

Figure 30:
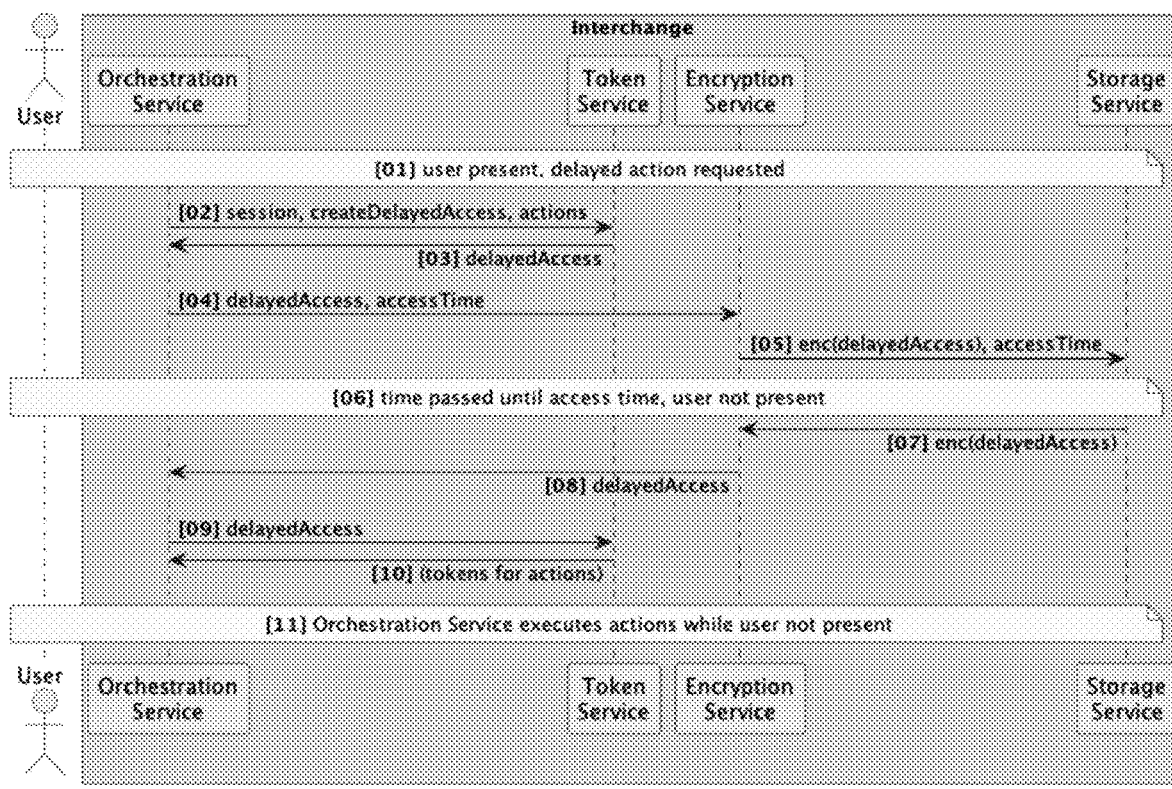
FIG. 30 is a flow diagram illustrating a process or method for the Interchange to access user data in a predetermined way at a future time when the user is not present.

FIG. 30 is a flow diagram illustrating a process or method for the Interchange to access user data in a predetermined way at a future time when the user is not present. In the embodiment illustrated in FIG. 30, the process flow is as follows:

[01] The user is interacting with the interchange and an action in the future is desired;

[02] The OS sends a delayedAccessRequest with the actions to be performed and the session information to the TS;

[03] the TS evaluates the request and if valid, generates a delayedAccess token. This token is a 'nbf' (or similar) claim that indicates a date and time where the token is not valid before that date and time, as well as an expiry claim that is a short period of time after the nbf claim. The difference in time is adequate for the actions to be performed. This token is only usable for a narrow window of time, and only for the actions indicated;

[04] The OS sends the delayedAccess token and the time when the token should be returned to the ES;

[05] The ES encrypts the delayedAccess token and sends it and the time for the token to be returned to the SS;

[06] Time passes until the access time has arrived. The user is not present at this time. As the delayedAccess token is encrypted, the SS has no knowledge of the actions to be taken, or for who the actions will be performed;

[07] The SS sends the encrypted delayedAccess token to the ES;

[08] The ES decrypts the delayedAccess token and sends it to the OS;

[09] The OS verifies the delayedAccess token and presents it to the TS;

[10] The TS verifies the delayedAccess token, ensures it is after the 'nbf' value, and before the expiry, and generates the access tokens required by the OS to perform the actions in the delayedAccess token such as accessing the user's information; and

[11] The OS then uses the actions dictated by the delayedAction token using the valid tokens from the TS.

Figure 20:
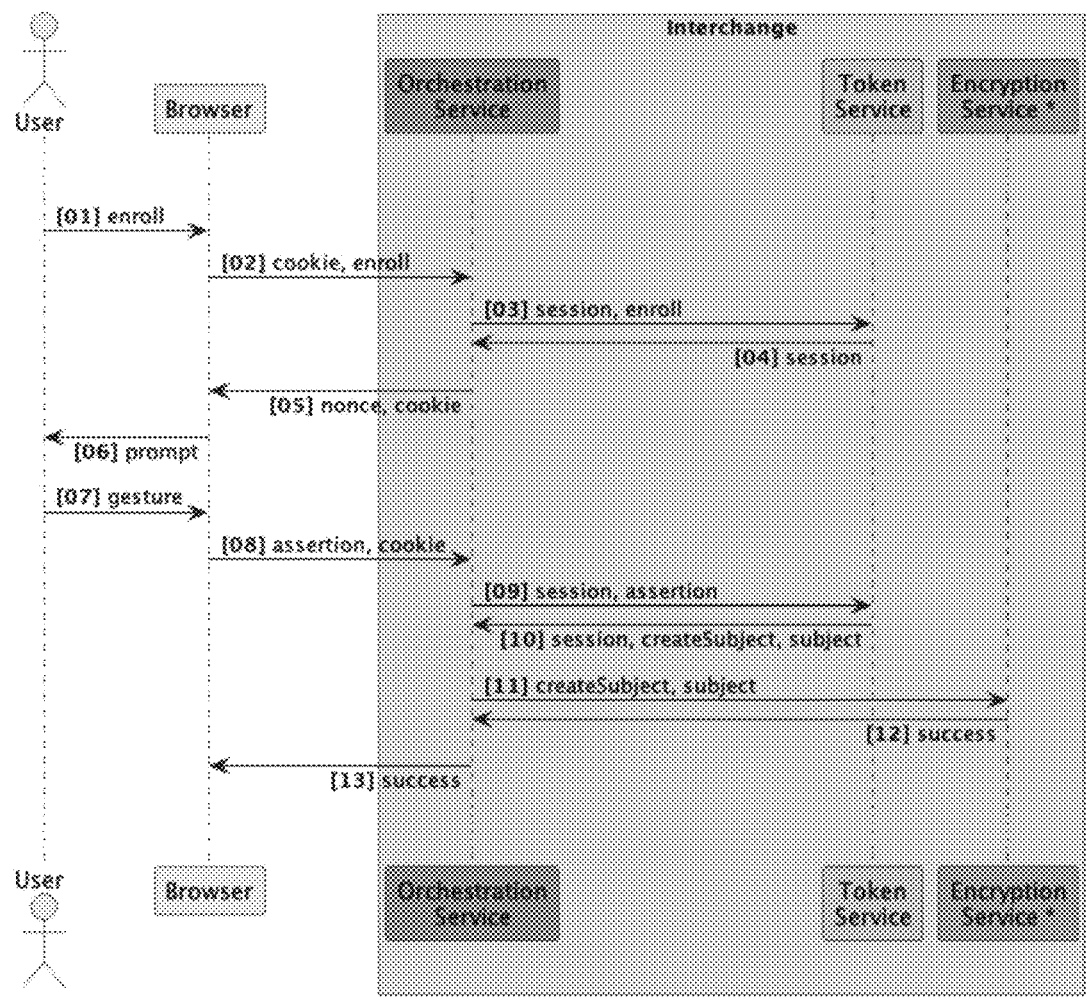
FIG. 20 is a flow diagram illustrating an example process or method for a user to enroll a device authentication mechanism with the Interchange as part of an implementation of an embodiment of the systems and methods disclosed herein.

As previously discussed, using a device with WebAuthN is more convenient for users, and is phishing resistant. FIG. 20 is a flow diagram illustrating an example process or method for a user to enroll a device authentication mechanism with the Interchange as part of an implementation of an embodiment of the systems and methods disclosed herein. For example, FIG. 20 shows how a device may be added as an authentication mechanism between a user and the Interchange:

[01] The user indicates they would like to enroll their device for authentication;

[02] The browser sends the enroll request to the OS;

[03] The OS sends the session and enroll request to the TS;

[04] The TS verifies the session, and adds a nonce to be signed;

[05] The OS verifies the session has not been modified except for the nonce, and sends the nonce to the browser;

[06] The JavaScript in the browser invokes the WebAuthN APIs and the user is presented with a prompt by the device;

[07] The user provides the appropriate response to the prompt;

[08] The browser takes the assertion returned from the WebAuthN call and passes to the OS;

[09] The OS verifies the assertion, confirms it contains the nonce, and passes the assertion and the session to the TS;

[10] The TS verifies the session and the assertion, confirms it contains the nonce, and creates a subject and createSubject and passes them back to the OS;

[11] The OS verifies the subject information and sends the createSubject and subject to the ES;

[12] The ES returns success; and

Figure 21:
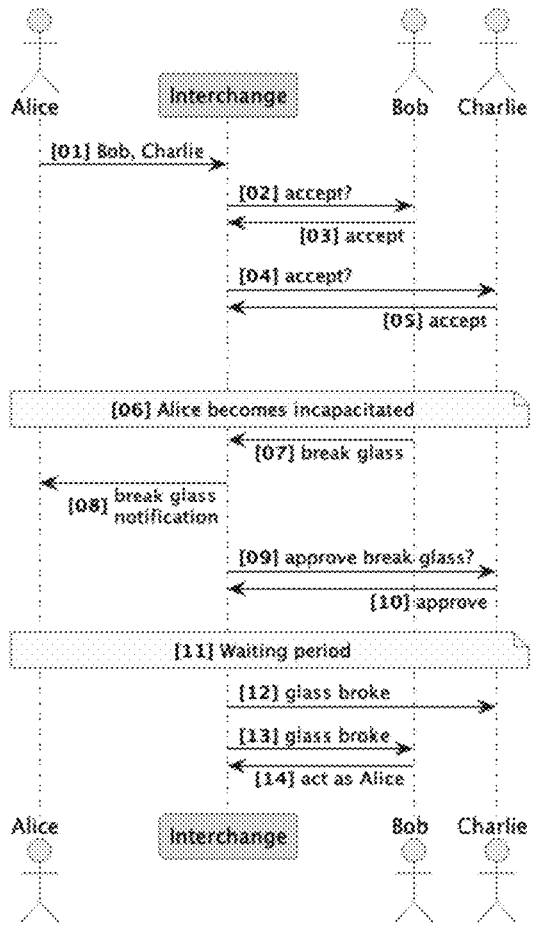
FIG. 21 is a flow diagram illustrating an example processor method for a user "Alice", to delegate users "Bob" and "Charlie" to act as Alice if Alice is incapacitated as part of an implementation of an embodiment of the systems and methods disclosed herein.

[13] The OS returns success to the Browser;

There may be times when a user is incapacitated or locked out of their account. To assist with this possible limitation on access, a user can delegate two or more other users to be able to access their account if they are unable to (referred to as a "break glass" event in the following). The number of users required, the policy on when they will have access, and the type of access they can have may be configured. FIG. 21 is a flow diagram illustrating an example process or method for a user "Alice", to delegate users "Bob" and "Charlie" to act as Alice if Alice is incapacitated, as part of an implementation of an embodiment of the systems and methods disclosed herein. The figure illustrates the steps or stages in setting up delegation, and then one example process for how the delegation can be invoked:

[01] Alice selects Bob and Charlie to be delegates at the Interchange;

[02] The Interchange sends a delegation acceptance request to Bob;

[03] Bob accepts at the Interchange;

[04] The Interchange sends a delegation acceptance request to Charlie;

[05] Charlie accepts at the Interchange;

[06] Time goes by and Alice becomes incapacitated;

[07] Bob learns of Alice's incapacitation and needs to act on behalf of Alice and "breaks glass" (i.e., seeks to obtain access as a delegate) for Alice's account at the Interchange;

[08] The Interchange sends Alice notifications about the break glass event in case Alice is not incapacitated and a delegate is acting maliciously;

[09] The Interchange sends Charlie a message to approve Bob's break glass request for Alice's account;

[10] Charlie approves the break glass request;

[11] The waiting period for Alice to respond to the notification passes;

[12] Charlie is notified that Bob has been granted access;

[13] Bob is notified he has been granted access; and

[14] Bob can act as Alice in interactions with the Interchange.

Rotating the keys used in an encryption process is a desirable security practice. Rotating keys on a regular basis ensures that if a key is compromised, then the potential harm can be limited, and the process can instead utilize a new key in a safe and reliable manner. FIG. 22 is a flow diagram illustrating an example process or method for the encryption service (ES) to rotate cryptographic keys as part of an implementation of an embodiment of the systems and methods disclosed herein.

Having a unique key for each record that itself is encrypted prevents an analysis of the records to determine the key value and reduces the possibility of a successful "rainbow" attack where encrypted records have the same value because the records have the same value, and they were encrypted with the same key. One mechanism for simultaneously having two valid keys, is to have two crypto key entries in each database (DB) entry. The ES can then decrypt the key it understands while the keys are being rotated, as the old key and new key are both available. After all keys have been rotated, the old keys can be deleted (if desired). The key rotation process has an advantage that the records themselves are never decrypted, only the key used to encrypt them. In one example embodiment, a key rotation sequence may be implemented as follows (as shown in FIG. 22):

[01] An instance of the ES tells the SS it would like to rotate the key for a given table;

[02] The SS starts to scan through each record in the table;

[03] For each record in the table the SS receives the index and the oldKey;

[04] The SS sends the index and oldKey to the ES;

[05] The ES decrypts the oldKey to get the record key, and then encrypts the record key with the new master key, creating the newKey, and sends it and the index to the SS;

[06] The SS updates the appropriate key record with the newKey at the index; and

[07] When all keys have been processed, the SS notifies the ES.

Implementing security as a multi-level process is also desirable. The decentralized and functionally separated architecture of the Interchange creates a required interdependency of the components (the OS, TS, ES, and SS) to access or modify user information. Further, with each component having an independent trustee, the trustees must collude or cooperate to access user information. This type of access is expected to be infrequent and subject to review prior to occurring because each trustee (a custodian or host of a service) is preferably under the jurisdiction of an independent entity without a data sharing agreement with another trustee.

Figure 31:
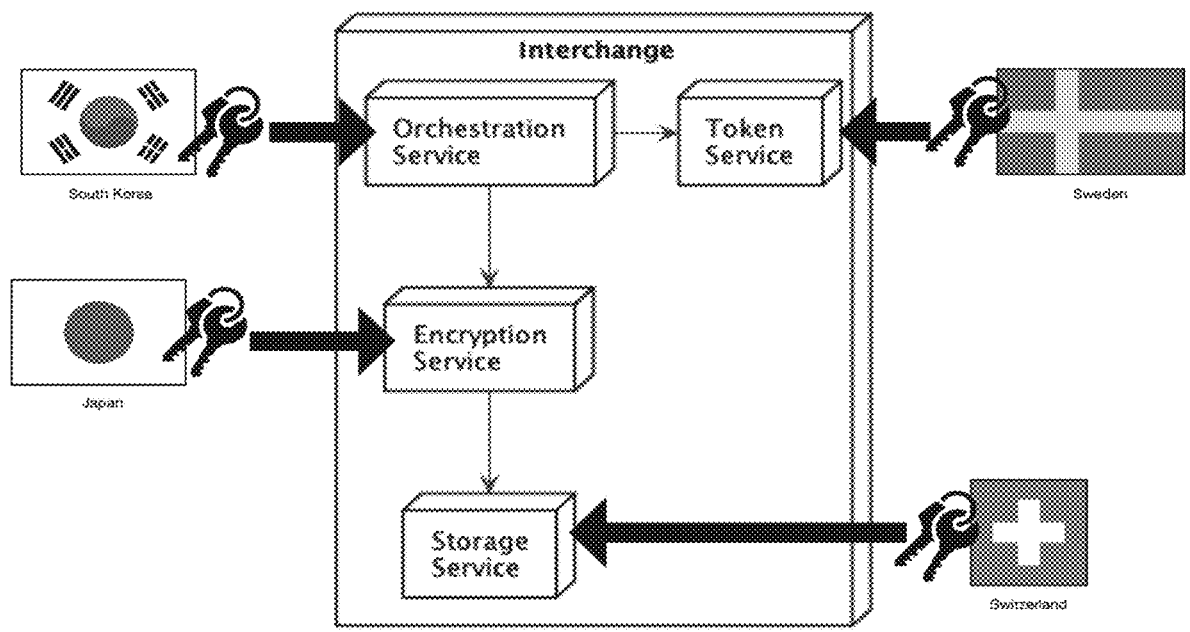
FIG. 31 is a diagram illustrating an example hosting of each of the four primary services in an independent jurisdiction, in accordance with an embodiment of the disclosure.

FIG. 31 is a diagram illustrating an example hosting of each of the four primary services in an independent jurisdiction, in accordance with an embodiment of the disclosure. As shown in the figure, each of the four primary services (Orchestration, Token, Encryption, and Storage) are hosted by, or located in, a separate jurisdiction. Each jurisdiction has a separate set of "keys" to enable its access to and management of its respective service. For purposes of this illustrative example, each jurisdiction or custodian is represented by a separate country (South Korea, Japan, Sweden, and Switzerland, as non-limiting examples).

Although each custodian is illustrated in the figure as an independent country, other forms of custodians may be used as part of implementing an embodiment of the disclosure. In general, to provide the benefits and security of the Interchange, the custodians of the primary services should be independent entities that are domiciled in independent jurisdictions. Each jurisdiction (preferably) should not have a data or intelligence sharing agreement that would compel the custodians to cooperate to reveal information contained in the Interchange. Each jurisdiction should also have a well-defined and recognized process for requesting information about a person pertaining to a criminal investigation.

Figure 7:
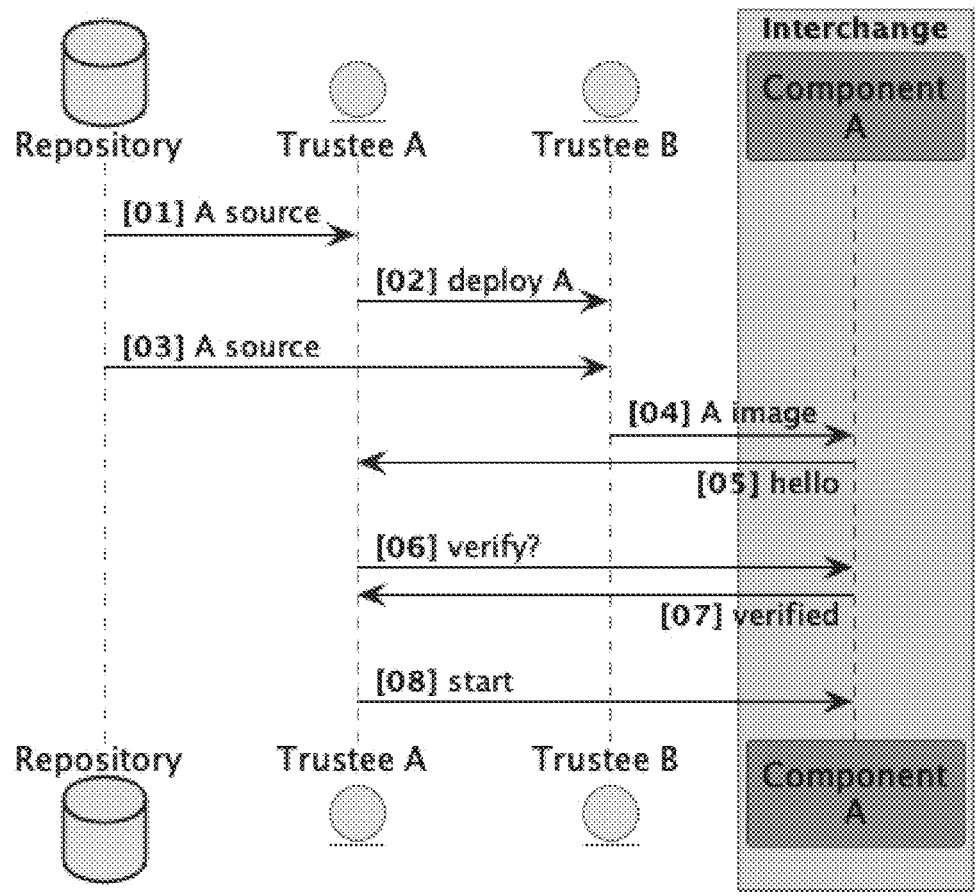
FIG. 7 is a flow diagram illustrating an example process or method for a verified deployment of an executable image as part of an implementation of an embodiment of the systems and methods disclosed herein.

An additional layer of security may be provided by having the source code for each component be available for all trustees to review and verify its correctness. Adding another layer or level of security is for deployment of an executable image to require coordination between two or more trustees. This ensures that the code executing is the code in the repository or database. FIG. 7 is a flow diagram illustrating an example process or method for a verified deployment of an executable image as part of an implementation of an embodiment of the systems and methods disclosed herein:

[01] Trustee A wants to deploy a new version of Component A. It pulls the version it wants to deploy, compiles it into an image, and calculates a hash of the image;

[02] Trustee A then tells Trustee B that it would like it to deploy Component A;

[03] Trustee B pulls the same version of Component A from the repository and compiles it;

[04] Trustee B deploys Component A;

[05] Component A starts up and calls back to Trustee A requesting Component A secrets;

[06] Trustee A calls the deployment service to provide the hash of the image;

[07] The deployment service sends back the hash of the image; and

[08] Trustee verifies the hash received is the same as the has it created in [01] and provides Component A the information it needs to start operating.

Creating Reseller and Provider Records

Each reseller and provider have a unique HTTPS URL identifier that resolves to provide metadata for the reseller and provider. The metadata includes, or links to the public key(s) the service uses to sign requests and claims. The list of resellers is static and is decided by the Interchange organization. An initial list of providers is configured and can be dynamically expanded as users can enter the URL for a provider to have them added. On startup, an instance of the Orchestration Service (OS) will enumerate the list of provider and reseller URLs and fetch the metadata. The OS will pass each URL to the Token Service (TS), which will independently fetch the metadata, and create a reseller or provider record as appropriate, and pass it back to the OS with a createReseller or createProvider. The OS will verify the record and store it. On a restart, the OS can retrieve each record from the Storage Service and see if it needs to be updated before passing it to the TS for processing.

Data Replication

The external data storage is replicated globally. To comply with specific jurisdictional requirements, or user preferences, all user and release records may be stored in a specific region, identified by the region value in the primary table entry. If a user is interacting with the Interchange in a different region, the Storage Service (SS) in the region the user is in will work with the Storage Service in the region the data is stored to perform the requested CRUD operations.

Embodiments of the system and methods disclosed herein provide users and developers with a secure platform and set of services for the authentication of users, protection of their private data and information, and use of that protected information for accessing websites and applications over the Internet. In some embodiments, this is accomplished by separating certain of the functions performed by the system and implementing them in servers or platforms located in different jurisdictions and operated by independent entities, so that the information or records they contain are not accessible by a jurisdiction directly through a single trustee or custodian.

Figure 32:
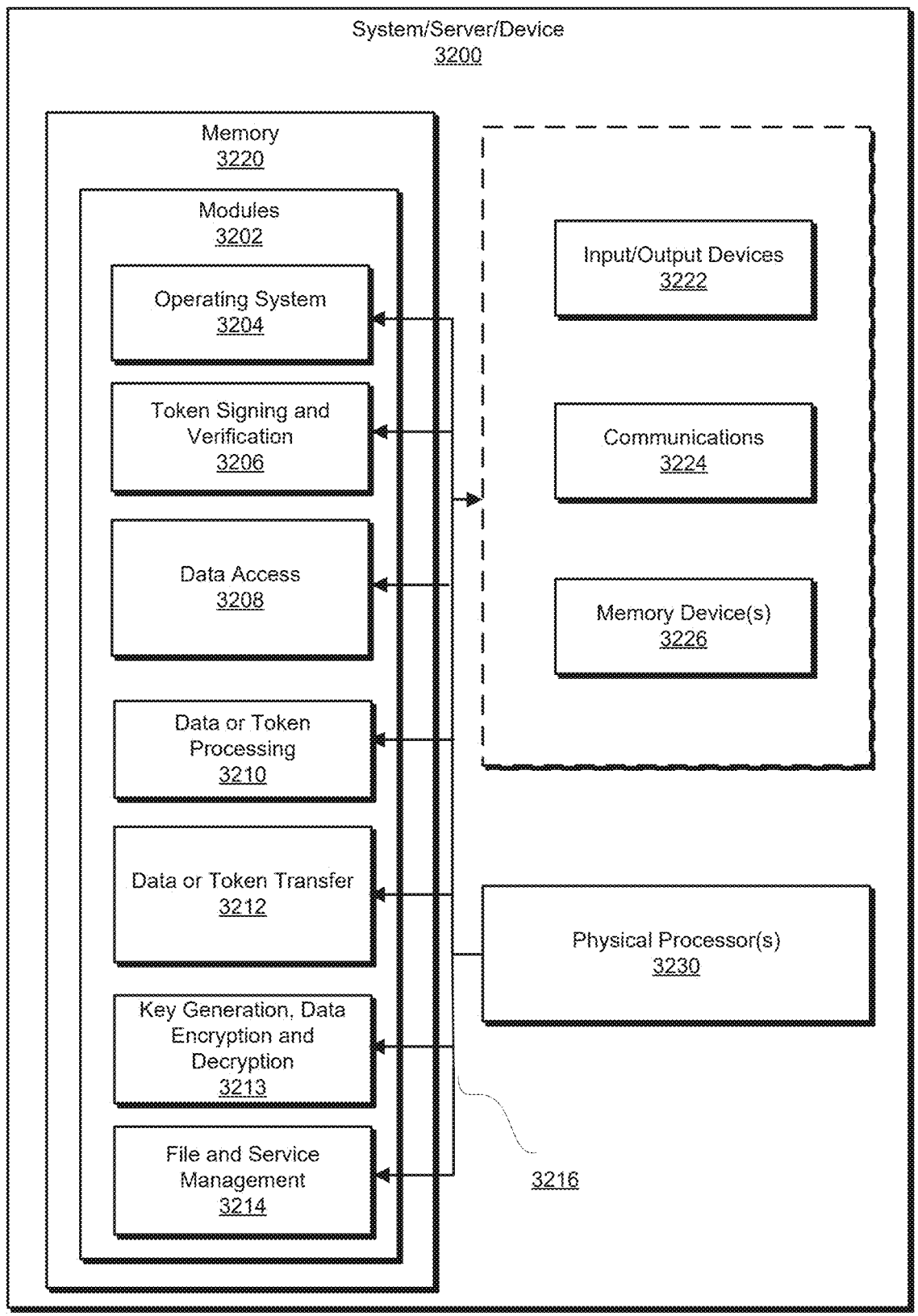
FIG. 32 is a diagram illustrating elements or components that may be present in a computing device, server or system configured to implement a method, process, function, or operation in accordance with an embodiment of the disclosure.

Each such server or platform may consist of a computing device or multiple computing devices of the type and functionality illustrated in FIG. 32 (i.e., a set of computer-executable instructions stored in a non-transitory memory and an electronic processor which when programmed with the instructions executes one or more of the steps or operations illustrated in the flow diagrams or descriptions contained herein).

FIG. 32 is a diagram illustrating elements or components that may be present in a computing device, server or system configured to implement a method, process, function, or operation for in accordance with an embodiment of the disclosure. As noted, in some embodiments, the disclosed system and methods may be implemented in the form of an apparatus that includes a processing element and set of executable instructions. The executable instructions may be part of a software application and arranged into a software architecture.

In general, an embodiment of the disclosure may be implemented using a set of software instructions that are designed to be executed by a suitably programmed processing element (such as a GPU, CPU, TPU, QPU, state machine, microprocessor, processor, controller, or computing device, as examples). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the system and methods disclosed herein.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

The system, apparatus, methods, processes, functions, and/or operations for implementing an embodiment of the disclosure may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system.

The subsystems shown in FIG. 32 are interconnected via a system bus 3216. Additional subsystems include may include input/output devices 3222, communications elements 3224, and additional memory or data storage devices 3226. The interconnection via the system bus 3216 allows one or more electronic processors 3230 to communicate with each subsystem and to control the execution of instructions that may be stored in a module 3202 in memory 3220, as well as the exchange of information between subsystems. The system memory 3220 and/or the memory devices 3226 may embody a tangible, non-transitory computer-readable medium.

Modules 3202 each may contain a set of computer-executable instructions, which when executed by a programmed processor 3230 will cause system, server, or device 3200 to perform one or more operations or functions. As mentioned, typically modules 3202 include an operating system 3204 which performs functions involved in accessing and transferring sets of instructions so that the instructions may be executed.

Depending on the service represented, modules 3202 may include module 3206 (which contains instructions which when executed perform some or all of the operations associated with token signing and verification), module 3208 (which contains instructions which when executed perform some or all of the operations associated with data access), module 3210 (which contains instructions which when executed perform some or all of the operations associated with data or token processing), module 3212 (which contains instructions which when executed perform some or all of the operations associated with data or token transfer to another entity or service), module 3213 (which contains instructions which when executed perform some or all of the operations associated with key generation and data encryption or decryption), and module 3214 (which contains instructions which when executed perform some or all of the operations associated with file, record, or account management of the service that are not part of the functions performed by the other modules).

Note that all or a subset of the described modules may be present in an apparatus responsible for performing one of the four primary services disclosed. Thus, for each system or platform that is responsible for performing one of the four primary services of the Interchange, some or all of the functions described with reference to FIG. 32 may be performed.

Note that in one embodiment, each of the four primary systems/services disclosed (OS, TS, SS, and ES) may implement one or more of the functions or operations disclosed (corresponding to modules 3206, 3208, 3210, 3212, and 3214). As an example, in one embodiment:

the Orchestration Service (OS) may be a system or platform that includes a server configured to implement modules 3206, 3210, 3212, and 3214;

the Token Service (TS) may be a system or platform that includes a server configured to implement modules 3206, 3210, and 3212;

the Encryption Service (ES) may be a system or platform that includes a server configured to implement module 3206, 3210, 3212, 3213, and 3214 and the Storage Service may be a system or platform that includes a server configured to implement modules 3208, 3212, and 3214.

Figure 33:
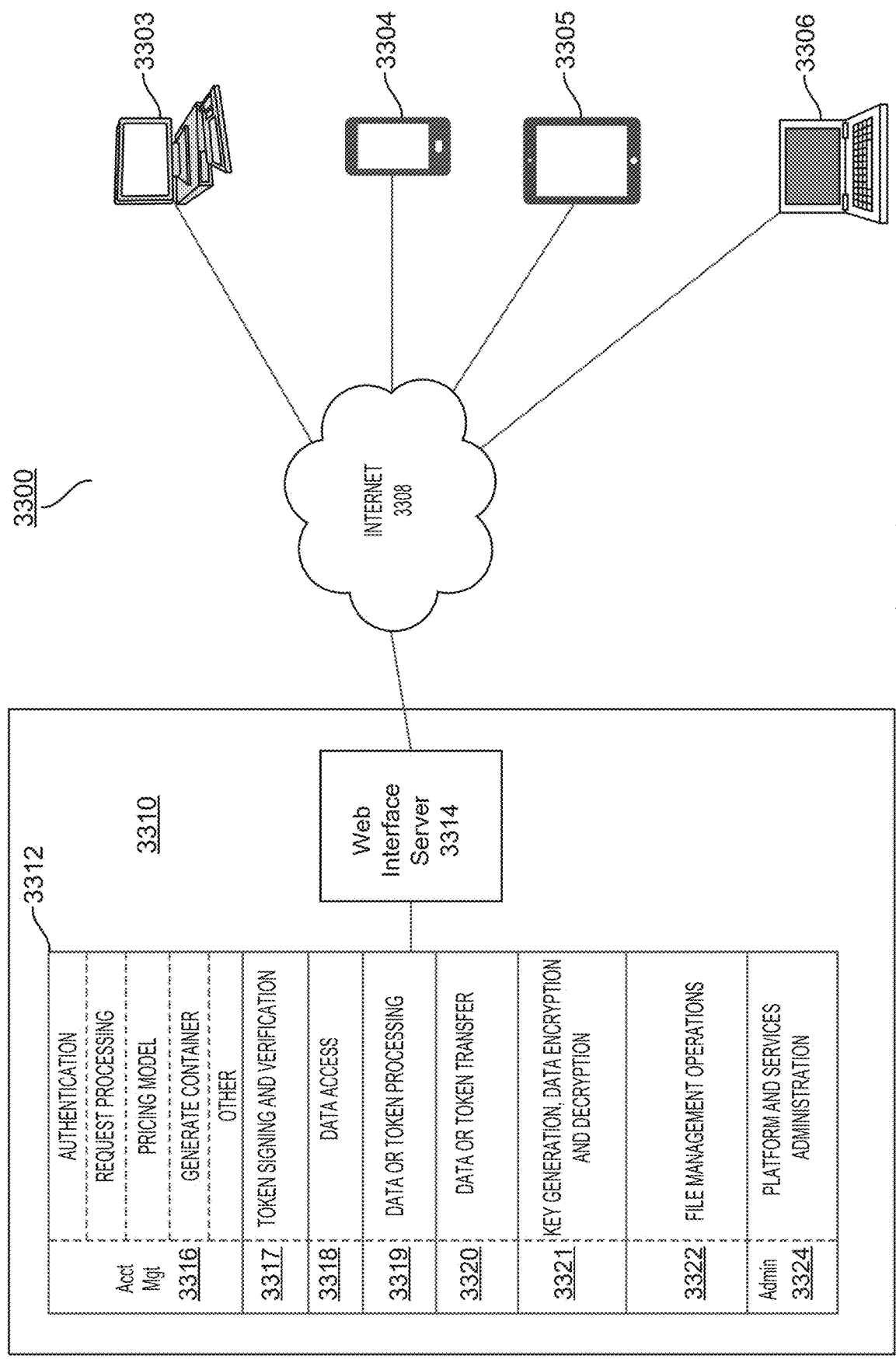
FIGS. 33-35 are diagrams illustrating an architecture for a multi-tenant or SaaS platform that may be used in implementing an embodiment of the systems and methods disclosed herein.
Figure 34:
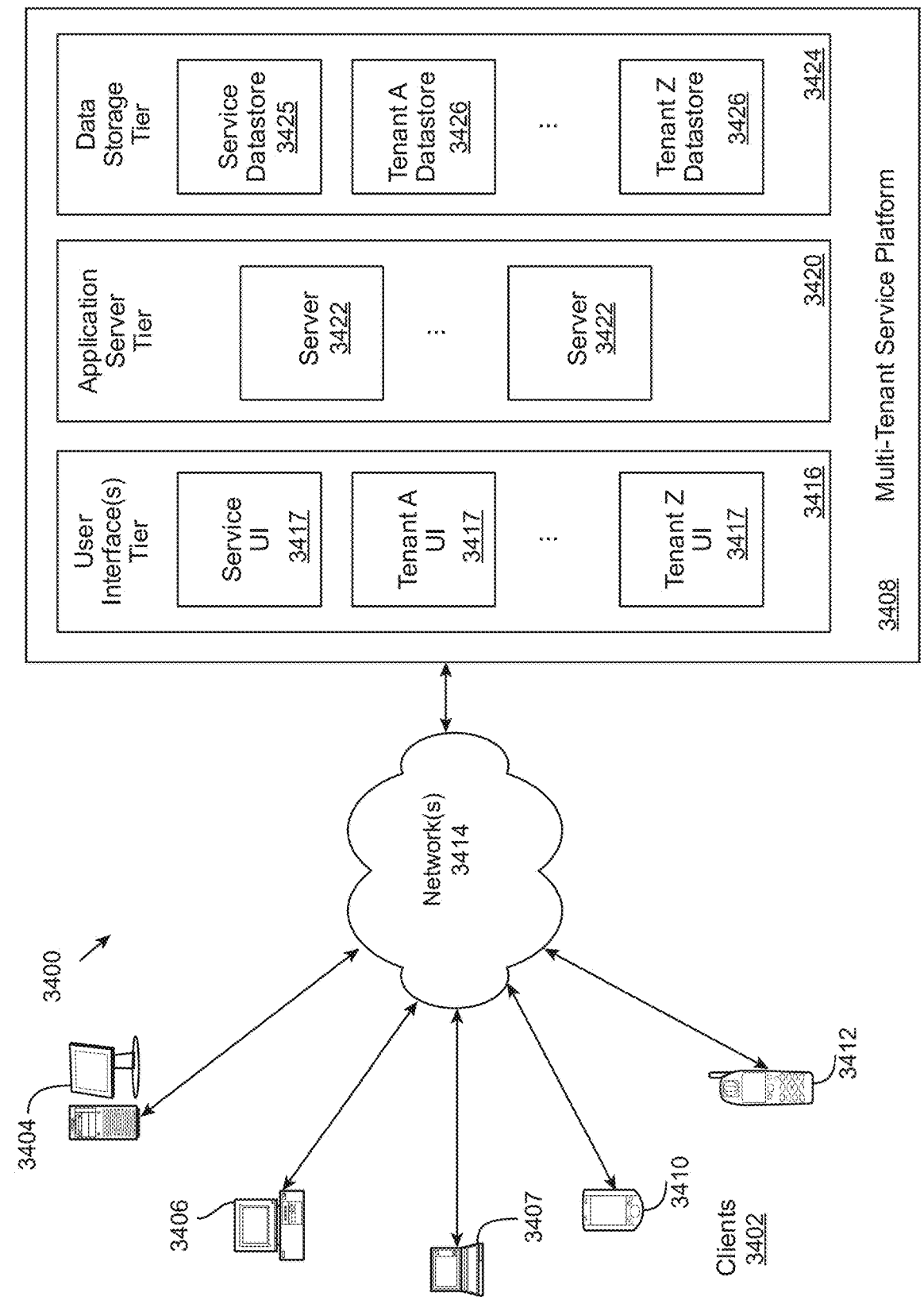
Figure 35:
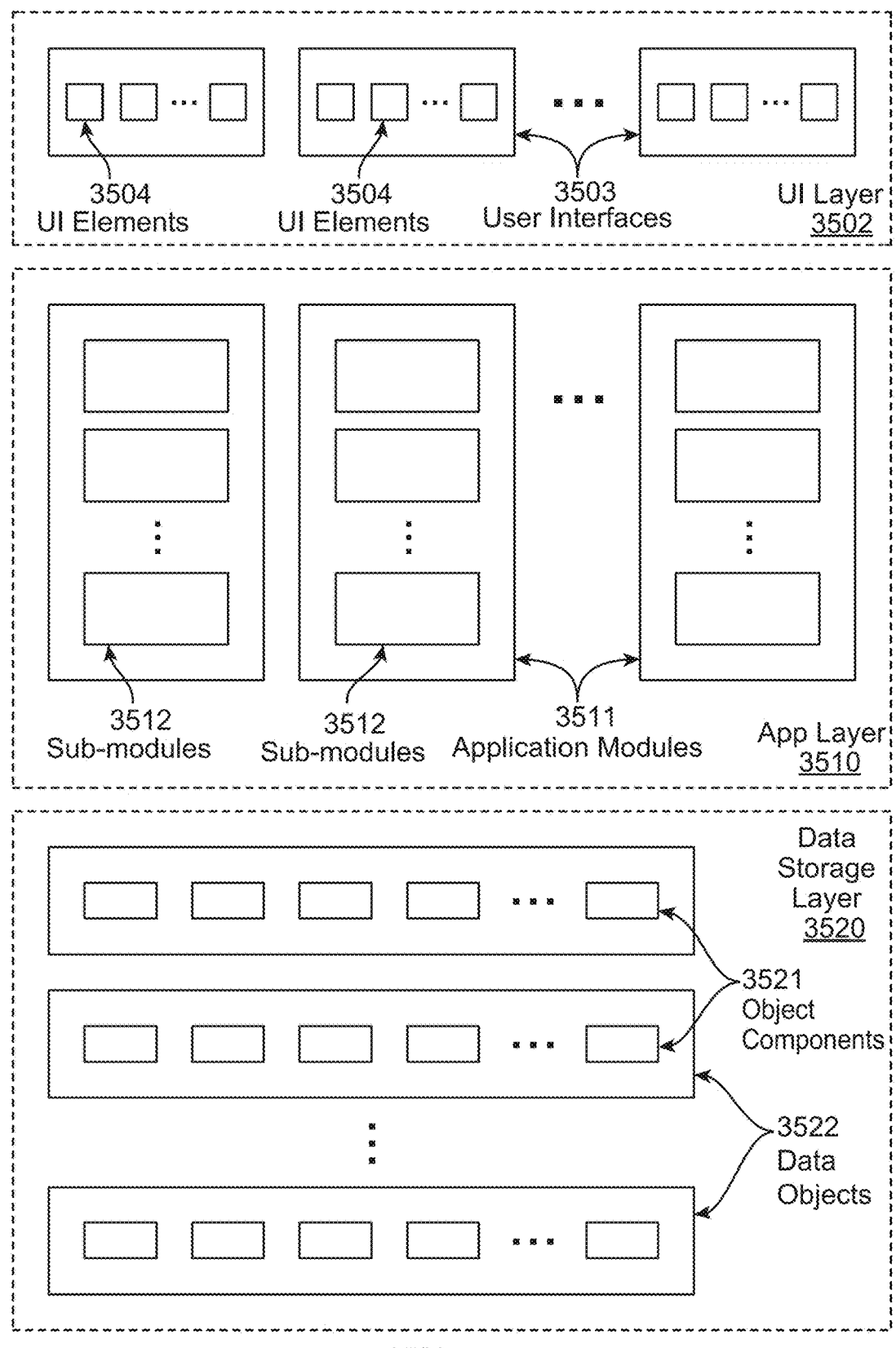

In some embodiments, the functionality and services provided by the system and methods disclosed herein may be made available to multiple users by the organization operating the system, with each user having an account maintained by a server or server platform. Such a server or server platform may be termed a form of Software-as-a-Service (SaaS). FIG. 33 is a diagram illustrating a SaaS system in which an embodiment of the disclosure may be implemented. FIG. 34 is a diagram illustrating elements or components of an example operating environment in which an embodiment of the disclosure may be implemented. FIG. 35 is a diagram illustrating additional details of the elements or components of the multi-tenant distributed computing service platform of FIG. 34, in which an embodiment of the disclosure may be implemented.

In some embodiments, the system or services disclosed herein may be implemented as microservices, processes, workflows or functions performed in response to the submission of a request and/or input data. The microservices, processes, workflows or functions may be performed by a server, data processing element, platform, or system. In some embodiments, the data analysis and other services may be provided by a service platform located "in the cloud". In such embodiments, the platform may be accessible through APIs and SDKs. The functions, processes and capabilities disclosed herein and with reference to one or more of the included Figures may be provided as microservices within the platform. The interfaces to the microservices may be defined by REST and GraphQL endpoints. An administrative console may allow users or an administrator to securely access the underlying request and response data, manage accounts and access, and in some cases, modify the processing workflow or configuration.

As noted, in some embodiments, aspects of the disclosure may be implemented in the context of a multi-tenant, "cloud" based environment (such as a multi-tenant business data processing platform), typically used to develop and provide Internet/web-based services and business applications for end users. Embodiments may also be implemented in the context of other computing or operational environments or systems, such as for an individual business data processing system, a private network used with a plurality of client terminals, a remote or on-site data processing system, or another form of client-server architecture.

FIG. 33 is a diagram illustrating a system, including an integrated services platform and an associated network in which an embodiment of the invention may be implemented. FIG. 34 is a diagram illustrating elements or components of an example operating environment in which an embodiment of the invention may be implemented. FIG. 35 is a diagram illustrating additional details of the elements or components of the multi-tenant distributed computing service platform of FIG. 34, in which an embodiment of the invention may be implemented.

In some embodiments, each custodian may operate a platform and provide their respective service (i.e., the OS, TS, ES, or SS) using a multi-tenant platform. This enables the service and functionality to be made available to multiple accounts. In some embodiments, the OS may function as a platform that "hosts" accounts for each of a set of users and communicates with the other platforms to initiate other services. Thus, the described structure, components, and functionality of a SaaS or multi-tenant platform may be used to implement one or more of the four primary services disclosed. In one embodiment, a SaaS or multi-tenant platform may be used to host a set of accounts and interact with a separate platform that functions as the Orchestration Service to provide the services and benefits of the Interchange to users.

FIG. 33 is a is a diagram illustrating a system 3300 in which an embodiment may be implemented or through which an embodiment of the services disclosed herein may be accessed. In accordance with the advantages of an application service provider (ASP) hosted business service system (such as a multi-tenant data processing platform), users of the services provided by the Interchange and disclosed herein may comprise individuals, groups of individuals, businesses, or organizations, as examples.

A user may access the services using any suitable client, including but not limited to desktop computers, laptop computers, tablet computers, scanners, smartphones, etc. In general, any client device having access to the Internet may be used to provide data and/or a request for services to such a platform for processing and evaluation. A user interfaces with the service platform across the Internet 3308 or another suitable communications network or combination of networks. Examples of suitable client devices include desktop computers 3303, smartphones 3304, tablet computers 3305, or laptop computers 3306.

System 3310, which may be hosted by a third party, may include a set of authentication and data protection services to assist in implementing the disclosed Interchange 3312, and a web interface server 3314, coupled as shown in FIG. 33. As disclosed herein, the functionality of the overall system may be partitioned into (distributed over) two or more separate platforms (e.g., a separate platform for each of the OS, TS, ES, and SS), with each platform hosting specific services and providing data and privacy protections for users.

It is to be appreciated that either or both of the authentication and other services 3312 and the web interface server 3314 may be implemented on one or more different hardware systems and components, even though represented as singular units in FIG. 33. Services 3312 may include one or more functions or operations for the processing of authentication requests and the provision of data protection and application access services.

As examples, in some embodiments, the set of functions, operations or services made available through the platform or system 3310 may include:

Account Management services 3316, such as;
- a process or service to begin an authenticate process for a user;
- a process or service to generate a container or instantiation of the authentication and data protection services implemented on that platform;
- a process or service to maintain records or files as suited for the specific service (i.e., OS, TS, ES, or SS);

Administrative services 3324, such as;
- a process or services to provide platform and services administration—for example, to enable the provider of the services and/or the platform to administer and configure the processes and services provided to users or other of the service platforms;

Other services specific to the platform and the allocation of services for the overall Interchange system, where these may include operation of one of the four primary functions/services from a server or platform in each independent jurisdiction:
Orchestration Service (OS);
Token Service (TS);
Storage Service (SS); and
Encryption Service (ES);

As disclosed herein, each of the primary services (OS, TS, SS, ES) may be implemented using one or more of the following modules:
token signing and verification (as suggested by service or function 3317);
data access (as suggested by service or function 3318);
data or token processing (as suggested by service or function 3319);
data or token transfer to another entity or service (as suggested by service or function 3320);
key generation, data encryption and decryption (as suggested by service or function 3321); and
file management operations (as suggested by service or function 3322).

The integrated business system shown in FIG. 33 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 34 is a diagram illustrating elements or components of an example operating environment 3400 in which an embodiment may be implemented. As shown, a variety of clients 3402 incorporating and/or incorporated into a variety of computing devices may communicate with a multi-tenant service platform 3408 through one or more networks 3414. For example, a client may incorporate and/or be incorporated into a client application (e.g., software) implemented at least in part by one or more of the computing devices. Examples of suitable computing devices include personal computers, server computers 3404, desktop computers 3406, laptop computers 3407, notebook computers, tablet computers or personal digital assistants (PDAs) 3410, smart phones 3412, cell phones, and consumer electronic devices incorporating one or more computing device components, such as one or more electronic processors, microprocessors, central processing units (CPU), or controllers. Examples of suitable networks 3414 include networks utilizing wired and/or wireless communication technologies and networks operating in accordance with any suitable networking and/or communication protocol (e.g., the Internet).

The distributed computing service/platform (which may also be referred to as a multi-tenant data processing platform) 3408 may include multiple processing tiers, including a user interface tier 3416, an application server tier 3420, and a data storage tier 3424. The user interface tier 3416 may maintain multiple user interfaces 3417, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as examples. Each application server or processing tier 3422 shown in the figure may be implemented with a set of computers and/or components including computer servers and processors, and may perform various functions, methods, processes, or operations as determined by the execution of a software application or set of instructions. The data storage tier 3424 may include one or more data stores, which may include a Service Data store 3425 and one or more Tenant Data stores 3426. Data stores may be implemented with any suitable data storage technology, including structured query language (SQL) based relational database management systems (RDBMS).

Service Platform 3408 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 3422 that are part of the platform's Application Server Tier 3420. As noted with regards to FIG. 33, the platform system shown in FIG. 34 may be hosted on a distributed computing system made up of at least one, but typically multiple, "servers."

In some embodiments, tenant customizations to the platform may include custom functionality (such as the capability to perform tenant or user-specific functions, data processing, or operations) built on top of lower-level operating system functions. Some multi-tenant service platforms may offer the ability to customize functions or operations at a number of different levels of the service platform, from aesthetic modifications to a graphical user interface to providing integration of components and/or entire applications developed by independent third-party vendors. This can be very beneficial, since by permitting use of components and/or applications developed by third party vendors, a multi-tenant service can significantly enhance the functionality available to tenants and increase tenant satisfaction with the platform.

In addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) to obtain feedback for improving the newer version of the extension, to test the stability of the extension, or to assist them to segment the market for their extension(s).

FIG. 35 is a diagram illustrating additional details of the elements or components of the multi-tenant distributed computing service platform of FIG. 34, in which an embodiment may be implemented. The software architecture shown in FIG. 35 represents an example of an architecture which may be used to implement an embodiment. In general, an embodiment may be implemented using a set of software instructions that are designed to be executed by a suitably programmed processing element (such as a CPU, GPU, TPU, QPU, microprocessor, processor, controller, state machine, or computing device, as examples). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 35 is a diagram illustrating additional details of the elements or components 3500 of a multi-tenant distributed computing service platform, in which an embodiment may be implemented. The example architecture includes a user interface layer or tier 3502 having one or more user interfaces 3503. Examples of such user interfaces include graphical user interfaces and application programming interfaces (APIs). Each user interface may include one or more interface elements 3504. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 3510 may include one or more application modules 3511, each having one or more sub-modules 3512. Each application module 3511 or sub-module 3512 may correspond to a function, method, process, or operation that is implemented by the module or sub-module (e.g., a function or process related to providing data processing and services to a user of the platform). Such function, method, process, or operation may include those used to implement one or more aspects of the disclosed system and methods, such as for one or more of the processes or functions described with reference to the included Figures.

As non-limiting examples, each application module or sub-module may contain software instructions that when executed cause the system or platform to perform one or more of:
token signing and verification;
data access;
data or token processing;
data or token transfer to another entity or service;
key generation, data encryption and decryption; and
file management operations.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server may include each application module. Alternatively, different application servers may include different sets of application modules. Such sets may be disjoint or overlapping.

The data storage layer 3520 may include one or more data objects 3522 each having one or more data object components 3521, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 33-35 are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Further example environments in which an embodiment of the invention may be implemented include devices (including mobile devices), software applications, systems, apparatuses, networks, or other configurable components that may be used by multiple users for data entry, data processing, application execution, or data review, and which have user interfaces or user interface components that can be configured to present an interface to a user.

Although further examples below may reference the example computing environment depicted in FIGS. 33-35, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

In addition to the user authentication, data security and privacy, and application access services disclosed, the architecture and functionality described may be used for purposes of:
claim chaining to minimize information shared in a claim;
claim chaining to anonymize identifier for a user;
trusted distribution of security events; or
verified deployment—to ensure the correct code is what is deployed and running.

Further, although described with reference to a specific allocation or installation of certain functions or combinations of functions within a service or platform, other allocations of elements, components, or functions are possible and may be used. There are numerous ways to segment the Interchange system so that each component is dependent on at least one other component to access user information.

This disclosure includes the following embodiments and clauses:

1. A system for providing a user with access to an application or service, comprising:
   an orchestration service operable to interact with a user, one or more applications the user is using, and one or more providers of services processing claims about the user, the orchestration service operable to perform processing and distribution of the claim about the user to other services of the system, and wherein the orchestration service operates to receive requests from an application, make requests of providers, receive claims from providers, obtain consent from users, and transfer results signed by a token service back to the application;
   a token service coupled to the orchestration service and operable to receive requests from the orchestration service to create and sign records, create and sign storage access tokens, create tokens for external parties, and verify orchestration service operations;
   an encryption service coupled to the orchestration service and operable to generate a unique record encryption key for each record provided by the orchestration service, and which operates to encrypt the record key with a master key, encrypts each record coming from the orchestration service, and decrypts each record going to the orchestration service; and
   a storage service coupled to the encryption service and operable to perform record management operations including create, read, update, and delete on a record stored in a database in the storage service based on authorization instructions in a storage access token signed by the token service.

2. The system of clause 1, wherein each of the orchestration, token, encryption, and storage services is operated by an entity that is independent of the entity operating a different one of the services.

3. The system of clause 2, wherein each of the orchestration, token, encryption, and storage services is operated by an entity located in an independent jurisdiction.

4. The system of clause 3, wherein each of the independent jurisdictions does not have a data sharing agreement with another of the independent jurisdictions.

5. The system of clause 1, wherein the claim about the user is a statement regarding a characteristic of the user or the user's interactions with the application.

6. The system of clause 1, wherein each of the orchestration, token, encryption, and storage services are configured to be unable to access user data without the assistance of at least one other of the services.

7. The system of clause 1, wherein each of the orchestration, token, encryption, and storage services is implemented as a separate multi-tenant platform.

8. The system of clause 1, wherein the orchestration service is operable to permit a user to identify a delegate who is authorized to access to the user's account if the user becomes incapacitated.

The present invention as disclosed above can be implemented in the form of control logic using computer software in a modular or integrated manner. Based on the disclosure and teachings provided herein, a person of ordinary skill in the art will know and appreciate other ways and/or methods to implement the present invention using hardware, software, or a combination of hardware and software.

Any of the software components, processes or functions disclosed in this application may be implemented as software code to be executed by a processor using any suitable computer language such as, for example, Java, JavaScript, C++, or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments disclosed herein, a non-transitory computer-readable medium may include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods disclosed herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods disclosed herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods disclosed herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein in the specification, figures, and claims, the term "or" is used inclusively to refer items in the alternative and in combination.

Different arrangements of the components depicted in the drawings or disclosed above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A system, comprising:
   one or more processors or servers;
   a set of computer-executable instructions stored on a non-transitory computer-readable medium, that when executed by the one or mor more processors or servers provides a set of services to a user, the services providing the user with access to an application and protection of the user's data; and
   the set of services, wherein the set of services further comprises
      an orchestration service operable to interact with a user, one or more applications the user is using, and one or more providers of services processing claims about the user, the orchestration service operable to perform processing and distribution of the claim about the user to one or more services of the set of services, and wherein the orchestration service operates to receive requests from an application, make requests of providers, receive claims from providers, obtain consent from users, and transfer results signed by a token service back to the application, the orchestration service operating in accordance with a protocol;
      a token service coupled to the orchestration service and operable to receive requests from the orchestration service to create and sign records, create and sign storage access tokens, create tokens for external parties, and verify that orchestration service operations comply with the protocol;
      an encryption service coupled to the orchestration service and operable to generate a unique record encryption key for each record provided by the orchestration service, and which operates to encrypt the record key with a master key, encrypts each record coming from the orchestration service, and decrypts each record going to the orchestration service; and
      a storage service coupled to the encryption service and operable to perform record management operations including create, read, update, and delete on a record stored in a database in the storage service based on authorization instructions in a storage access token signed by the token service, wherein each of the orchestration, token, encryption, and storage services is operated by an entity that is independent of the entity operating a different one of the services, and wherein each of the orchestration, token, encryption, and storage services is implemented as a separate multi-tenant platform.

2. The system of claim 1, wherein each of the orchestration, token, encryption, and storage services is operated by an entity located in an independent jurisdiction.

3. The system of claim 2, wherein each of the independent jurisdictions does not have a data sharing agreement with another of the independent jurisdictions.

4. The system of claim 1, wherein the claim about the user is a statement regarding a characteristic of the user or the user's interactions with the application.

5. The system of claim 1, wherein each of the orchestration, token, encryption, and storage services are configured to be unable to access user data without the assistance of at least one other of the services.

6. The system of claim 1, wherein the orchestration service is operable to permit a user to identify a delegate who is authorized to access to the user's account if the user becomes incapacitated.

7. A system, comprising:
one or more electronic processors configured to execute a set of computer-executable instructions; and
the set of computer-executable instructions, wherein when executed, the instructions cause the one or more electronic processors to implement and operate
an orchestration service operable to interact with a user, one or more applications the user is using, and one or more providers of services processing claims about the user, the orchestration service operable to perform processing and distribution of the claim about the user to one or more services that are part of the system, and wherein the orchestration service operates to receive requests from an application, make requests of providers, receive claims from providers, obtain consent from users, and transfer results signed by a token service back to the application, the orchestration service operating in accordance with a protocol;
a token service coupled to the orchestration service and operable to receive requests from the orchestration service to create and sign records, create and sign storage access tokens, create tokens for external parties, and verify that orchestration service operations comply with the protocol;
an encryption service coupled to the orchestration service and operable to generate a unique record encryption key for each record provided by the orchestration service, and which operates to encrypt the record key with a master key, encrypts each record coming from the orchestration service, and decrypts each record going to the orchestration service; and
a storage service coupled to the encryption service and operable to perform record management operations including create, read, update, and delete on a record stored in a database in the storage service based on authorization instructions in a storage access token signed by the token service, wherein each of the orchestration, token, encryption, and storage services is operated by an entity that is independent of the entity operating a different one of the services, and wherein each of the orchestration, token, encryption, and storage services is implemented as a separate multi-tenant platform.

8. The system of claim 7, wherein each of the orchestration, token, encryption, and storage services is operated by an entity located in an independent jurisdiction.

9. The system of claim 8, wherein each of the independent jurisdictions does not have a data sharing agreement with another of the independent jurisdictions.

10. The system of claim 7, wherein the claim about the user is a statement regarding a characteristic of the user or the user's interactions with the application.

11. The system of claim 7, wherein each of the orchestration, token, encryption, and storage services are configured to be unable to access user data without the assistance of at least one other of the services.

12. The system of claim 7, wherein the orchestration service is operable to permit a user to identify a delegate who is authorized to access to the user's account if the user becomes incapacitated.

13. A set of computer-executable instructions that when executed by one or more programmed electronic processors, cause the processors to implement and operate:
an orchestration service operable to interact with a user, one or more applications the user is using, and one or more providers of services processing claims about the user, the orchestration service operable to perform processing and distribution of the claim about the user to other services of the system, and wherein the orchestration service operates to receive requests from an application, make requests of providers, receive claims from providers, obtain consent from users, and transfer results signed by a token service back to the application, the orchestration service operating in accordance with a protocol;
a token service coupled to the orchestration service and operable to receive requests from the orchestration service to create and sign records, create and sign storage access tokens, create tokens for external parties, and verify that orchestration service operations comply with the protocol;
an encryption service coupled to the orchestration service and operable to generate a unique record encryption key for each record provided by the orchestration service, and which operates to encrypt the record key with a master key, encrypts each record coming from the orchestration service, and decrypts each record going to the orchestration service; and
a storage service coupled to the encryption service and operable to perform record management operations including create, read, update, and delete on a record stored in a database in the storage service based on authorization instructions in a storage access token signed by the token service, wherein each of the orchestration, token, encryption, and storage services is operated by an entity that is independent of the entity operating a different one of the services, and wherein each of the orchestration, token, encryption, and storage services is implemented as a separate multi-tenant platform.

14. The set of computer-executable instructions of claim 13, wherein each of the orchestration, token, encryption, and storage services is operated by an entity located in an independent jurisdiction, and further wherein each of the independent jurisdictions does not have a data sharing agreement with another of the independent jurisdictions.

15. The set of computer-executable instructions of claim 13, wherein the claim about the user is a statement regarding a characteristic of the user or the user's interactions with the application, and further, wherein each of the orchestration, token, encryption, and storage services are configured to be unable to access user data without the assistance of at least one other of the services.

* * * * *